United States Patent
Yamamoto

(10) Patent No.: US 7,369,949 B2
(45) Date of Patent: May 6, 2008

(54) ELECTROMAGNETIC FLOWMETER

(75) Inventor: Tomoshige Yamamoto, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 11/582,474

(22) Filed: Oct. 16, 2006

(65) Prior Publication Data

US 2007/0088511 A1    Apr. 19, 2007

(30) Foreign Application Priority Data

Oct. 17, 2005    (JP) .............................. 2005-301627

(51) Int. Cl.
*G01F 1/00*    (2006.01)
(52) U.S. Cl. .............. 702/45; 38/50; 38/100; 73/861; 73/861.12
(58) Field of Classification Search ............ 702/45, 702/50, 38, 100; 73/861, 861.02, 861.08, 73/861.09, 861.11, 861.12, 861.13; 324/306, 324/307, 309
See application file for complete search history.

(56) References Cited

U.S. PATENT DOCUMENTS

| | | | | | |
|---|---|---|---|---|---|
| 4,059,014 | A | * | 11/1977 | Torimaru | 73/861.16 |
| 5,090,250 | A | * | 2/1992 | Wada | 73/861.12 |
| 5,421,210 | A | * | 6/1995 | Kobayashi et al. | 73/861.12 |
| 5,443,552 | A | * | 8/1995 | Tomita | 73/861.17 |
| 5,487,310 | A | * | 1/1996 | Higuchi | 73/861.17 |
| 5,915,280 | A | * | 6/1999 | Komatsu et al. | 73/861.12 |
| 6,173,616 | B1 | * | 1/2001 | Tomita | 73/861.17 |
| 6,634,238 | B2 | * | 10/2003 | Budmiger | 73/861.17 |
| 6,829,946 | B2 | * | 12/2004 | Yamamoto | 73/861.12 |
| 6,845,330 | B2 | * | 1/2005 | Okuda et al. | 702/38 |
| 6,847,901 | B2 | * | 1/2005 | Suzuki et al. | 702/38 |
| 6,853,928 | B1 | * | 2/2005 | Mitsutake | 702/45 |
| 6,865,956 | B2 | * | 3/2005 | Yamamoto | 73/861.12 |
| 2004/0015302 | A1 | * | 1/2004 | Suzuki et al. | 702/38 |
| 2004/0035180 | A1 | * | 2/2004 | Okuda et al. | 73/8 |

(Continued)

FOREIGN PATENT DOCUMENTS

JP    06-241855 A    9/1994

(Continued)

OTHER PUBLICATIONS

JNMIFH edition, "Flow Rate Measurement form A to Z for Instrumentation Engineers", Kogyo Gijutusha, 1995, pp. 147-148.

*Primary Examiner*—Carol S. W. Tsai
(74) *Attorney, Agent, or Firm*—Blakely Sokoloff Taylor & Zafman

(57) ABSTRACT

An electromagnetic flowmeter includes a measuring tube, an electrode, an exciting unit, a signal conversion unit, and a flow rate calculating unit. The signal conversion unit extracts a $\partial A/\partial t$ component irrelevant to a flow velocity of the fluid and a v×B component originating from the flow velocity of the fluid from a resultant electromotive force of an electromotive force $\partial A/\partial t$, with A, t, v, and B respectively representing a vector potential, a time, a flow velocity, and a magnetic flux density. The flow rate calculating unit extracts a variation component dependent on a parameter from the $\partial A/\partial t$ component, corrects a span which is a coefficient applied to a magnitude V of the flow velocity of the v×B component, and calculates the flow rate of the fluid from the v×B component whose span is corrected.

17 Claims, 26 Drawing Sheets

U.S. PATENT DOCUMENTS

2004/0060366 A1* 4/2004 Yamamoto ............... 73/861.12
2004/0255691 A1* 12/2004 Yamamoto ............... 73/861.12
2005/0021248 A1* 1/2005 Mitsutake .................... 702/45
2005/0268730 A1* 12/2005 Yasumatsu ............... 73/861.12
2007/0088511 A1* 4/2007 Yamamoto .................. 702/45

FOREIGN PATENT DOCUMENTS

WO    WO 03/027614 A    4/2003

* cited by examiner

ELECTROMAGNETIC FLOWMETER

BACKGROUND OF THE INVENTION

The present invention relates to an electromagnetic flowmeter and, more particularly, to an electromagnetic flowmeter which detects a characteristic or state of a fluid or a state in a measuring tube and corrects the flow rate of the fluid.

An electromagnetic flowmeter is a flowmeter which can measure a flow rate with stability owing to its characteristics, and has established a position as a high-accuracy flowmeter. However, a conventional electromagnetic flowmeter is assumed to operate under a condition where the tube is filled with a fluid to be measured, and is generally designed to obtain the flow rate of the fluid by detecting a signal proportional to the flow velocity of the fluid and multiplying the flow velocity by the sectional area of the tube. If, therefore, the tube is not filled with a fluid or air bubbles are mixed in the fluid, an error occurs in flow rate measurement.

For example, as the level of a fluid in the tube varies, the sectional area varies. As a consequence, a span variation occurs in an output from the electromagnetic flowmeter, and a flow rate error occurs. In addition, when air bubbles are mixed in the tube, the volume of the fluid varies. This causes a span variation in an output, resulting in an error in the flow rate to be obtained. For this reason, in order to measure the flow rate of the fluid with high accuracy, it is necessary to perform flow rate correction by measuring a state of the fluid, e.g., the fluid level or the amount of air bubbles mixed by using another sensor. As described above, when a substance other than a fluid to be measured is mixed in the tube, for example, a gas and a liquid or the like constitute a multiphase flow (a fluid level variation can also be regarded as a case wherein air is mixed in the fluid), it is difficult to accurately measure a flow rate by using a general electromagnetic flowmeter. Under the circumstances, demands have arisen for an electromagnetic flowmeter which can accurately measure a flow rate even when a state of a fluid varies.

Against the background described above, an electromagnetic flowmeter for a partially filled tube has been proposed in, for example, reference 1 (Japanese Patent Laid-Open No. 6-241855) and reference 2 (JNMIHF edition, "Flow Rate Measurement from A to Z for Instrumentation Engineers", Kogyo Gijutusha, 1995, pp. 147-148) for the correction of fluid level variations. These references propose a technique of correcting a flow rate by measuring a fluid level as an application of an electromagnetic flowmeter for a partially filled tube. The electromagnetic flowmeter disclosed in references 1 and 2 obtains first a fluid level from the ratio between the signal electromotive force obtained by a pair of electrodes provided on the left and right sides of a channel when exciting coils provided on the upper and lower sides of the channel are simultaneously driven and the signal electromotive force obtained when the exciting coil on the upper side is singly driven, corrects the sensitivity which has been obtained in advance on the basis of the fluid level, and outputs a flow rate.

On the other hand, the present inventor has proposed an electromagnetic flowmeter which solves the problem of a span shift in reference 3 (WO 03/027614). A physical phenomenon necessary for the explanation of reference 3 and the present invention will be described below. When an object moves in a changing magnetic field, electromagnetic induction generates two types of electric fields, namely (a) electric field $E^{(i)} = \partial A/\partial t$ which is generated by a temporal change in magnetic field, and (b) electric field $E^{(v)} = v \times B$ which is generated as the object moves in the magnetic field. In this case, $v \times B$ represents the outer product of v and B, $\partial A/\partial t$ represents the partial differential of A with respect to time. In this case, v, B, and A respectively correspond to the following and are vectors having directions in three dimensions (x, y, and z) (v: flow velocity, B: magnetic flow density, and A: vector potential (whose relationship with the magnetic flux density is represented by B=rotA)). Note, however, that the three-dimensional vectors in this case differ in meaning from vectors on a complex plane. These two types of electric fields generate a potential distribution in the fluid, and electrodes can detect this potential.

Generally known mathematical basic knowledge will be described next. A cosine wave $P \cdot \cos(\omega \cdot t)$ and a sine wave $Q \cdot \sin(\omega \cdot t)$ which have the same frequency but different amplitudes are combined into the following cosine wave. Let P and Q be amplitudes, and $\omega$ be an angular frequency.

$$P \cdot \cos(\omega \cdot t) + Q \cdot \sin(\omega \cdot t) = (P^2 + Q^2)^{1/2} \cdot \cos(\omega \cdot t - \epsilon) \text{ for}$$
$$\epsilon = \tan^{-1}(Q/P) \quad (1)$$

In order to analyze the combining operation in equation (1), it is convenient to perform mapping on a complex coordinate plane so as to plot an amplitude P of cosine wave $P \cdot \cos(\omega \cdot t)$ along a real axis and an amplitude Q of the sine wave $Q \cdot \sin(\omega \cdot t)$ along an imaginary axis. That is, on the complex coordinate plane, a distance $(P^2 + Q^2)^{1/2}$ from the origin gives the amplitude of the combined wave, and an angle $\epsilon = \tan^{-1}(Q/P)$ gives the phase difference between the combined wave and $\omega \cdot t$.

In addition, on the complex coordinate plane, the following relational expression holds.

$$L \cdot \exp(j \cdot \epsilon) = L \cdot \cos(\epsilon) + j \cdot L \cdot \sin(\epsilon) \quad (2)$$

Equation (2) is an expression associated with a complex vector, in which j is an imaginary unit, L gives the length of the complex vector, and e gives the direction of the complex vector. In order to analyze the geometrical relationship on the complex coordinate plane, it is convenient to use conversion to a complex vector.

The following description uses mapping onto a complex coordinate plane like that described above and geometrical analysis using complex vectors to show how an inter-electrode electromotive force behaves and explain how the electromagnetic flowmeter of reference 3 and the present invention use this behavior.

A complex vector arrangement with one coil set and an electrode pair in the electromagnetic flowmeter described in reference 3 will be described next.

FIG. 36 is a block diagram for explaining the principle of the electromagnetic flowmeter in reference 3. This electromagnetic flowmeter includes a measuring tube 101 through which a fluid to be measured flows, a pair of electrodes 102a and 102b which are placed to face each other in the measuring tube 101 so as to be perpendicular to both a magnetic field to be applied to the fluid and an axis PAX of the measuring tube 101 and come into contact with the fluid, and detect the electromotive force generated by the magnetic flow and the flow of the fluid, and an exciting coil 103 which applies, to the fluid, a time-changing magnetic field asymmetric on the front and rear sides of the measuring tube 101 which are bordered on a plane PLN which includes the electrodes 102a and 102b, with the plane PLN serving as a boundary of the measuring tube 101.

Of a magnetic field Ba generated by the exciting coil 103, a magnetic field component (magnetic flux density) B1 orthogonal to both an electrode axis EAX connecting the electrodes 102a and 102b and the measuring tube axis PAX on the electrode axis EAX is given by $$B1 = b1 \cdot \cos(\omega 0 \cdot t - \theta 1) \tag{3}$$

In equation (3), b1 is the amplitude of the magnetic flux density B1, ω0 is an angular frequency, and θ1 is a phase difference (phase lag) from ω0·t. The magnetic flux density B1 will be referred to as the magnetic field B1 hereinafter.

An inter-electrode electromotive force which originates from a change in magnetic field and is irrelevant to the flow velocity of a fluid to be measured will be described first. Since the electromotive force originating from the change in magnetic field depends on a time derivative dB/dt of the magnetic field, and hence the magnetic field B1 generated by the exciting coil 103 is differentiated according to $$dB1/dt = -\omega 0 \cdot b1 \cdot \sin(\omega 0 \cdot t - \theta 1) \tag{4}$$

If the flow velocity of the fluid to be measured is 0, a generated eddy current is only a component originating from a change in magnetic field. An eddy current I due to a change in the magnetic field Ba is directed as shown in FIG. 37. Therefore, an inter-electrode electromotive force E which is generated by a change in the magnetic field Ba and is irrelevant to the flow velocity is directed as shown in FIG. 37 within a plane including the electrode axis EAX and the measuring tube axis PAX. This direction is defined as the negative direction.

At this time, the inter-electrode electromotive force E is the value obtained by multiplying a time derivative −dB1/dt of a magnetic field whose direction is taken into consideration by a coefficient k (a complex number associated with the conductivity and permittivity of the fluidity to be measured and the structure of the measuring tube 101 including the layout of the electrodes 102a and 102b), as indicated by the following equation:

$$E = k \cdot \omega 0 \cdot b1 \cdot \sin(\omega 0 \cdot t - \theta 1) \tag{5}$$

Equation (5) is rewritten to the following equation:

$$\begin{aligned} E &= k \cdot \omega 0 \cdot b1 \cdot \{\sin(-\theta 1)\} \cdot \cos(\omega 0 \cdot t) + \\ &\quad k \cdot \omega 0 \cdot b1 \cdot \{\cos(-\theta 1)\} \cdot \sin(\omega 0 \cdot t) \\ &= k \cdot \omega 0 \cdot b1 \cdot \{-\sin(\theta 1)\} \cdot \cos(\omega 0 \cdot t) + \\ &\quad k \cdot \omega 0 \cdot b1 \cdot \{\cos(\theta 1)\} \cdot \sin(\omega 0 \cdot t) \end{aligned} \tag{6}$$

In this case, if equation (6) is mapped on the complex coordinate plane with reference to ω0·t, a real axis component Ex and an imaginary axis component Ey are given by $$\begin{aligned} Ex &= k \cdot \omega 0 \cdot b1 \cdot \{-\sin(\theta 1)\} \\ &= k \cdot \omega 0 \cdot b1 \cdot \{\cos(\pi/2 + \theta 1)\} \end{aligned} \tag{7}$$

$$\begin{aligned} Ey &= k \cdot \omega 0 \cdot b1 \cdot \{\cos(\theta 1)\} \\ &= k \cdot \omega 0 \cdot b1 \cdot \{\sin(\pi/2 + \theta 1)\} \end{aligned} \tag{8}$$

In addition, Ex and Ey represented by equations (7) and (8) are rewritten to a complex vector Ec represented by $$\begin{aligned} Ec &= Ex + j \cdot Ey \\ &= k \cdot \omega 0 \cdot b1 \cdot \{\cos(\pi/2 + \theta 1)\} + \\ &\quad j \cdot k \cdot \omega 0 \cdot b1 \cdot \{\sin(\pi/2 + \theta 1)\} \\ &= k \cdot \omega 0 \cdot b1 \cdot \{\cos(\pi/2 + \theta 1) + j \cdot \sin(\pi/2 + \theta 1)\} \\ &= k \cdot \omega 0 \cdot b1 \cdot \exp\{j \cdot (\pi/2 + \theta 1)\} \end{aligned} \tag{9}$$

In addition, the coefficient k described above is rewritten to a complex vector to obtain the following equation:

$$\begin{aligned} k &= rk \cdot \cos(\theta 00) + j \cdot rk \cdot \sin(\theta 00) \\ &= rk \cdot \exp(j \cdot \theta 00) \end{aligned} \tag{10}$$

In equation (10), rk is a proportional coefficient, and θ00 is the angle of the vector k with respect to the real axis.

Substituting equation (10) into equation (9) yields an inter-electrode electromotive force Ec (an inter-electrode electromotive force which originates from only a temporal change in magnetic field and is irrelevant to the flow velocity) rewritten to complex coordinates as follows:

$$\begin{aligned} Ec &= rk \cdot \exp(j \cdot \theta 00) \cdot \omega 0 \cdot b1 \cdot \exp\{j \cdot (\pi/2 + \theta 1)\} \\ &= rk \cdot \omega 0 \cdot b1 \cdot \exp\{j \cdot (\pi/2 + \theta 1 + \theta 00)\} \end{aligned} \tag{11}$$

In equation (11), rk·ω0·b1·exp{j·(p/2+θ1+θ00)} is a complex vector having a length rk·ω0·b1 and an angle p/2+θ1+θ00 with respect to the real axis.

An inter-electrode electromotive force originating from the flow velocity of a fluid to be measured will be described next. Letting V (V≠0) be the magnitude of the flow velocity of the fluid, since a component v×Ba originating from a flow velocity vector v of the fluid is generated in a generated eddy current in addition to the eddy current I when the flow velocity is 0, an eddy current Iv generated by the flow velocity vector v and the magnetic field Ba is directed as shown in FIG. 38. Therefore, the direction of an inter-electrode electromotive force Ev generated by the flow velocity vector v and the magnetic field Ba becomes opposite to the direction of the inter-electrode electromotive force E generated by the temporal change, and the direction of Ev is defined as the positive direction.

In this case, as indicated by the following equation, the inter-electrode electromotive force Ev originating from the flow velocity is the value obtained by multiplying the magnetic field B1 by a coefficient kv (a complex number associated with a magnitude V of the flow velocity, the conductivity and permittivity of the fluidity to be measured, and the structure of the measuring tube 101 including the arrangement of the electrodes 102a and 102b):

$$Ev = kv \cdot \{b1 \cdot \cos(\omega 0 \cdot t - \theta 1)\} \tag{12}$$

Equation (12) is rewritten to $$\begin{aligned} Ev &= kv \cdot b1 \cdot \cos(\omega 0 \cdot t) \cdot \cos(-\theta 1) - \\ &\quad kv \cdot b1 \cdot \sin(\omega 0 \cdot t) \cdot \sin(-\theta 1) \\ &= kv \cdot b1 \cdot \{\cos(\theta 1)\} \cdot \cos(\omega 0 \cdot t) + \\ &\quad kv \cdot b1 \cdot \{\sin(\theta 1)\} \cdot \sin(\omega 0 \cdot t) \end{aligned} \tag{13}$$

In this case, when mapping equation (13) on the complex coordinate plane with reference to ω0·t, a real axis component Evx and an imaginary axis component Evy are given by $$Evx = kv \cdot b1 \cdot \{\cos(\theta 1)\} \quad (14)$$

$$Evy = kv \cdot b1 \cdot \{\sin(\theta 1)\} \quad (15)$$

In addition, Evx and Evy represented by equations (14) and (15) are rewritten to a complex vector Evc represented by $$\begin{aligned}
Evc &= Evx + j \cdot Evy \quad (16)\\
&= kv \cdot b1 \cdot \{\cos(\theta 1)\} + j \cdot kv \cdot b1 \cdot \{\sin(\theta 1)\}\\
&= kv \cdot b1 \cdot \{\cos(\theta 1) + j \cdot \sin(\theta 1)\}\\
&= kv \cdot b1 \cdot \exp(j \cdot \theta 1)
\end{aligned}$$

In addition, the coefficient kv described above is rewritten to a complex vector to obtain the following equation:

$$\begin{aligned}
kv &= rkv \cdot \cos(\theta 01) + j \cdot rkv \cdot \sin(\theta 01) \quad (17)\\
&= rkv \cdot \exp(j \cdot \theta 001)
\end{aligned}$$

In equation (17), rkv is a proportional coefficient, and θ01 is the angle of the vector kv with respect to the real axis. In this case, rkv is equivalent to the value obtained by multiplying the proportional coefficient rk (see equation (10)) described above by the magnitude V of the flow velocity and a proportion coefficient γ. That is, the following equation holds:

$$rkv = \gamma \cdot rk \cdot V \quad (18)$$

Substituting equation (17) into equation (16) yields an inter-electrode electromotive force Evc rewritten to complex coordinates as follows:

$$\begin{aligned}
Evc &= kv \cdot b1 \cdot \exp(j \cdot \theta 1) \quad (19)\\
&= rkv \cdot b1 \cdot \exp\{j \cdot (\theta 1 + \theta 01)\}
\end{aligned}$$

In equation (19), rkv·b1·exp{j·(θ1+θ01)} is a complex vector having a length rkv·b1 and an angle θ1+θ01 with respect to the real axis.

An inter-electrode electromotive force Eac as a combination of inter-electrode electromotive force Ec originating from a temporal change in magnetic field and an inter-electrode electromotive force Evc originating from the flow velocity of the fluid is expressed by the following equation according to equations (11) and (19).

$$\begin{aligned}
Eac &= Ec + Evc \quad (20)\\
&= rk \cdot \omega 0 \cdot b1 \cdot \exp\{j \cdot (\pi/2 + \theta 1 + \theta 00)\} +\\
&\quad rkv \cdot b1 \cdot \exp\{j \cdot (\theta 1 + \theta 01)\}
\end{aligned}$$

As is obvious from equation (20), an inter-electrode electromotive force Eac is written by two complex vectors rk·ω0·b1·exp{j·(p/2+θ1+θ00)} and rkv·b1·exp{j·(θ1+θ01)}. The length of the resultant vector obtained by combining the two complex vectors represents the amplitude of the output (the inter-electrode electromotive force Eac), and an angle φ of the resultant vector represents the phase difference (phase delay) of the inter-electrode electromotive force Eac with respect to the phase ω0·t of the input (exciting current).

Under the above principle, the electromagnetic flowmeter described in reference 3 extracts a parameter (asymmetric excitation parameter) free from the influence of a span shift, and outputs a flow rate on the basis of the extracted parameter, thereby solving the problem of the span shift.

A span shift will be described with reference to FIG. 39. Assume that the magnitude V of the flow velocity measured by the electromagnetic flowmeter has changed in spite of the fact that the flow velocity of a fluid to be measured has not changed. In such a case, a span shift can be thought as a cause of this output variation.

Assume that calibration is performed such that when the flow velocity of a fluid to be measured is 0 in an initial state (period T1), the output from the electromagnetic flowmeter becomes 0 (v), and when the flow velocity is 1 (m/sec) (period T2), the output becomes 1 (v). In this case, an output from the electromagnetic flowmeter is a voltage representing the magnitude V of a flow velocity. According to this calibration, if the flow velocity of a fluid to be measured is 1 (m/sec), the output from the electromagnetic flowmeter should be 1 (v). When a given time t1 has elapsed, however, the output from the electromagnetic flowmeter may become 1.2 (v) in spite of the fact that the flow velocity of the fluid to be measured remains 1 (m/sec). A span shift can be thought as a cause of this output variation. A phenomenon called a span shift occurs when, for example, the value of an exciting current flowing in the exciting coil cannot be maintained constant.

According to references 1 and 2, the flow rate of a fluid which flows in the tube in a partially filled state can be measured. The electromagnetic flowmeter disclosed in references 1 and 2 detects a fluid level on the basis of the ratio between the signal electromotive force obtained when the exciting coils on the upper and lower sides are simultaneously driven and the signal electromotive force obtained when the exciting coil on the upper side is separately driven. For this reason, when a signal electromotive force decreases as the flow rate approaches 0, the detected fluid level contains a large error, and the accuracy of sensitivity correction deteriorates, resulting in an flow rate measurement error.

In addition, the electromagnetic flowmeter disclosed in reference 3 can automatically perform span correction. The electromagnetic flowmeter in reference 3 can, however, perform span correction only when a parameter free from the influence of a span shift changes in the same manner as variation in span as a coefficient applied to the flow velocity.

Of the inter-electrode electromotive force detected by electrodes, a v×B component associated with the flow velocity of the fluid is represented by, for example, Ka·B·Cf·V (where Ka is a constant term, B is a term associated with a magnetic field, Cf is a term associated with a characteristic or state of the fluid, and V is the magnitude of the flow velocity), and a ∂A/∂t component associated with the characteristic or state of the fluid can be represented by, for example, Ka·B·Cg·ω (where Ka is the constant term, B is the term associated with the magnetic field, Cg is a term associated with a characteristic or state of the fluid, and X an exciting angular frequency).

The electromagnetic flowmeter in reference 3 is assumed to keep the ratio of Cf/Cg constant. In a strict sense, a ∂A/∂t component and a v×B component change differently with a change in a characteristic or state of a fluid or state in the measuring tube, and hence the ratio of Cf/Cg is not constant. Consequently, as the required flow rate measurement accuracy increases, a flow rate measurement error occurs in the electromagnetic flowmeter in reference 3. This flow rate measurement error becomes conspicuous in particular when measurement is performed by using high-frequency excitation with an exciting current having a high frequency or when a fluid with a low conductivity is measured. Assume that the flow velocity of a fluid is accurately obtained. Even in this case, if the volume (sectional area) of the fluid varies, an error occurs in the flow rate. This may make impossible to accurately measure a flow rate even by applying the principle of reference 3.

SUMMARY OF THE INVENTION

The present invention has been made to solve the above problems, and has as its object to provide an electromagnetic flowmeter which can accurately measure the flow rate of a fluid by accurately detecting a state in which the ratio of variation components dependent on a characteristic or state of a fluid and a state in a measuring tube is not constant between a v×B component dependent on the flow velocity of the fluid and a ∂A/∂t component independent of the flow velocity of the fluid or a state in which the characteristic or state of the fluid or the state in the measuring tube varies and, correcting the flow rate of the fluid.

In order to achieve the above object of the present invention, there is provided an electromagnetic flowmeter comprising a measuring tube through which a fluid to be measured flows, an electrode which is placed in the measuring tube and detects an electromotive force generated by a magnetic field applied to the fluid and a flow of the fluid, an exciting unit which applies, to the fluid, a time-changing magnetic field asymmetrical to a first plane which includes the electrode and is perpendicular to an axial direction of the measuring tube, a signal conversion unit which extracts a ∂A/∂t component irrelevant to a flow velocity of the fluid and a v×B component originating from the flow velocity of the fluid from a resultant electromotive force of an electromotive force based on the ∂A/∂t component and an electromotive force based on the v×B component, with A, t, v, and B respectively representing a vector potential, a time, a flow velocity, and a magnetic flux density, and a flow rate calculating unit which extracts a variation component dependent on a parameter from the ∂A/∂t component extracted by the signal conversion unit, corrects a span which is a coefficient applied to a magnitude V of the flow velocity of the v×B component input from the signal conversion unit on the basis of the variation component, and calculates the flow rate of the fluid from the v×B component whose span is corrected, the parameter being at least one of a characteristic and state of the fluid and a state in the measuring tube which are independent of the flow rate of the fluid.

DESCRIPTION OF THE PREFERRED EMBODIMENTS

Basic Principle

Figure 1:
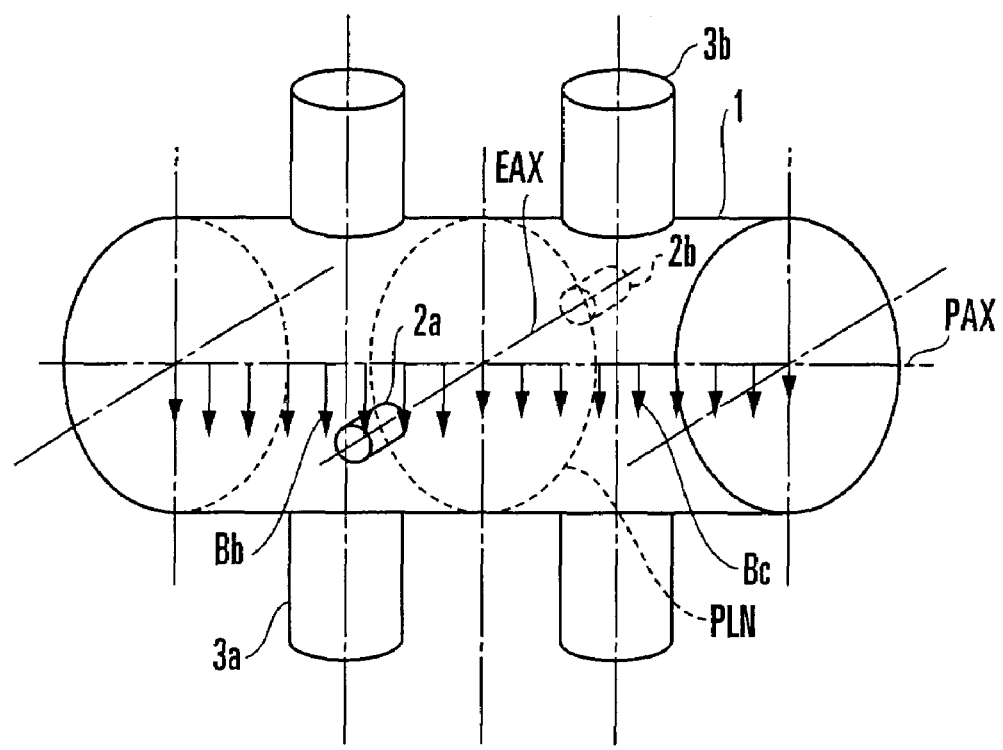
FIG. 1 is a block diagram for explaining the principle of the second arrangement of an electromagnetic flowmeter of the present invention.

As described in the explanation of the physical phenomenon, a potential distribution is generated in a fluid by electric field $E^{(i)} = \partial A/\partial t$ (A: vector potential, t: time) which is generated by a temporal change in magnetic field, and electric field $E^{(v)} = v \times B$ (v: flow velocity, B: magnetic flux density) which is generated as the object moves in the magnetic field, and the potential can be detected by the electrodes of the electromagnetic flowmeter. Consider an eddy current which is generated in a fluid by a ∂A/∂t component irrelevant to the flow velocity. The flow path or current density of the eddy current changes depending on a characteristic or state of the measuring tube including the fluid and the input impedance generated when a potential is extracted. Extracting this change as a potential makes it possible to measure a characteristic or state other than the fluid.

The present invention is configured to apply, to a fluid to be measured, asymmetric magnetic fields on the front and rear sides of a plane including the electrode axis with the plane serving as a boundary of the measuring tube, so as to detect the resultant vector of a v×B component dependent on the flow velocity and ∂A/∂t component independent of the flow velocity and extract the ∂A/∂t component from the resultant vector. The extracted ∂A/∂t component contains a variation component Cg which changes depending on the state of the fluid. Information associated with the characteristic or state of the fluid can be measured from the value of the variation component Cg regardless of the flow rate of the fluid. On the basis of the variation component Cg, of a span as a coefficient applied to the flow velocity of the v×B component contained in the resultant vector, a variation component Cf which varies depending on the characteristic or state of the fluid or a component Cf/Cg obtained by normalizing the variation component Cf with the ∂A/∂t component can be obtained, and the span in the v×B component can be corrected. According to the present invention, this makes it possible to obtain the true flow rate of a target fluid.

First Arrangement

The first arrangement of an electromagnetic flowmeter of the present invention will be described next. The first arrangement with one coil and an electrode pair is the same as that of the conventional electromagnetic flowmeter shown in FIG. 36, and hence the principle of the first arrangement will be described by using the reference numerals in FIG. 36. This electromagnetic flowmeter includes a measuring tube 1 through which a fluid to be measured flows, a pair of electrodes 2a and 2b which are placed to face each other in the measuring tube 1 so as to be perpendicular to both a magnetic field to be applied to the fluid and an axis PAX of the measuring tube 1 and come into contact with the fluid, and detect the electromotive force generated by the magnetic flow and the flow of the fluid, and an exciting coil 3 which applies, to the fluid, a time-changing magnetic field asymmetric on the front and rear sides of the measuring tube 1 which are bordered on a plane PLN which includes the electrodes 2a and 2b, with the plane PLN serving as a boundary of the measuring tube 1. The exciting coil 3 is placed at a position spaced apart by an offset distance d in the axial direction from a plane PLN which is perpendicular to the direction of a measuring tube axis PAX.

Of a magnetic field Ba generated by the exciting coil 3, a magnetic field component (magnetic flux density) B1 orthogonal to both an electrode axis EAX connecting the electrodes 2a and 2b and the measuring tube axis PAX on the electrode axis EAX is given by $$B1 = b1 \cdot \cos(\omega 0 \cdot t - \theta 1) \quad (21)$$

In equation (21), b1 is the amplitude of the magnetic flux density B1, ω0 is an angular frequency, and θ1 is a phase difference (phase lag) between the flux density B1 and ω0·t. The magnetic flux density B1 will be referred to as the magnetic field B1 hereinafter.

An inter-electrode electromotive force which is irrelevant to the flow velocity of a fluid to be measured will be described first. Since the electromotive force originating from the change in magnetic field depends on a time derivative dB/dt of the magnetic field, and hence the magnetic field B1 generated by the exciting coil 3 is differentiated according to $$dB1/dt = -\omega 0 \cdot b1 \cdot \sin(\omega 0 \cdot t - \theta 1) \quad (22)$$

Figure 37:
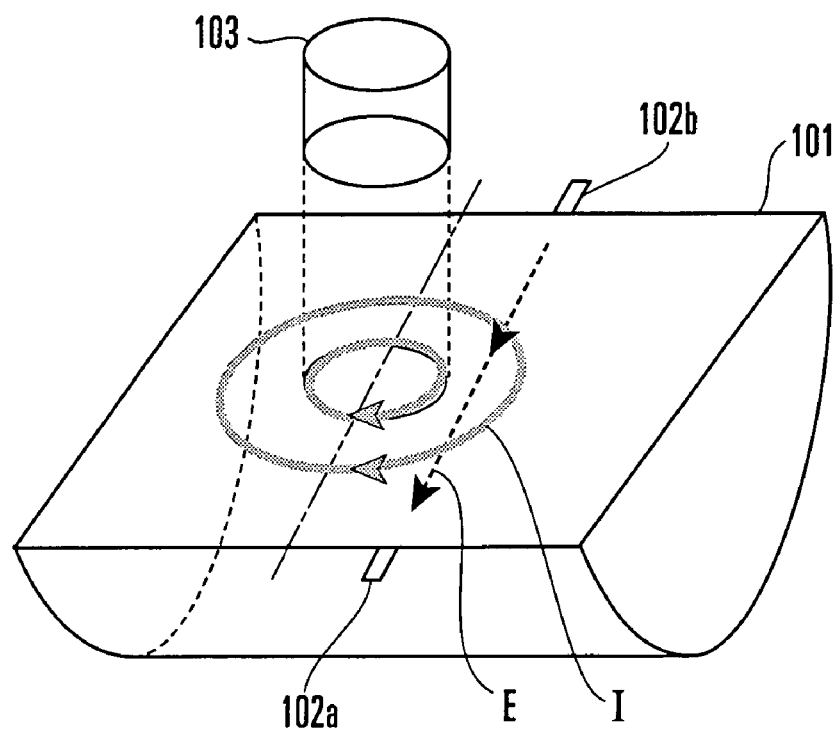
FIG. 37 is a view showing eddy currents and interelectrode electromotive forces when the flow rate of a fluid to be measured is 0 in a conventional electromagnetic flowmeter.

If the flow velocity of the fluid to be measured is 0, a generated eddy current is only a component originating from a change in magnetic field. An eddy current I due to a change in the magnetic field Ba is directed as shown in FIG. 37. Therefore, an inter-electrode electromotive force E which is generated by a change in the magnetic field Ba and is irrelevant to the flow velocity is directed as shown in FIG. 37 within a plane including the electrode axis EAX and the measuring tube axis PAX. This direction is defined as the negative direction.

At this time, the inter-electrode electromotive force E is the value obtained by multiplying a time derivative $-dB1/dt$ of a magnetic field whose direction is taken into consideration by a proportional coefficient rkg, as indicated by the following equation, and substituting the phase difference $\theta 1$ into $\theta 1 + \theta g$. The proportional coefficient rkg is a complex number associated with the characteristics or state of the fluid to be measured and the structure of the measuring tube 1 including the layout of the electrodes 2a and 2b. Similarly, the angle $\theta g$ is related to the characteristics or state of the fluid to be measured and the structure of the measuring tube 1.

$$E = rkg \cdot \omega 0 \cdot b1 \cdot \sin(\omega 0 \cdot t - \theta 1 - \theta g) \quad (23)$$

Equation (23) is rewritten to the following equation:

$$\begin{aligned} E &= rkg \cdot \omega 0 \cdot b1 \cdot \{\sin(-\theta 1 - \theta g)\} \cdot \cos(\omega 0 \cdot t) + \\ &\quad rkg \cdot \omega 0 \cdot b1 \cdot \{\cos(-\theta 1 - \theta g)\} \cdot \sin(\omega 0 \cdot t) \\ &= rkg \cdot \omega 0 \cdot b1 \cdot \{-\sin(\theta 1 + \theta g)\} \cdot \cos(\omega 0 \cdot t) + \\ &\quad rkg \cdot \omega 0 \cdot b1 \cdot \{\cos(\theta 1 + \theta g)\} \cdot \sin(\omega 0 \cdot t) \end{aligned} \quad (24)$$

In this case, if equation (24) is mapped on the complex coordinate plane with reference to $\omega 0 \cdot t$, a real axis component Ex and an imaginary axis component Ey are given by $$\begin{aligned} Ex &= rkg \cdot \omega 0 \cdot b1 \cdot \{-\sin(\theta 1 + \theta g)\} \\ &= rkg \cdot \omega 0 \cdot b1 \cdot \{\cos(\pi/2 + \theta 1 + \theta g)\} \end{aligned} \quad (25)$$

$$\begin{aligned} Ey &= rkg \cdot \omega 0 \cdot b1 \cdot \{\cos(\theta 1 + \theta g)\} \\ &= rkg \cdot \omega 0 \cdot b1 \cdot \{\sin(\pi/2 + \theta 1 + \theta g)\} \end{aligned} \quad (26)$$

In addition, Ex and Ey represented by equations (25) and (26) are rewritten to a complex vector Ec represented by $$\begin{aligned} Ec &= Ex + j \cdot Ey \\ &= rkg \cdot \omega 0 \cdot b1 \cdot \{\cos(\pi/2 + \theta 1 + \theta g)\} + \\ &\quad j \cdot rkg \cdot \omega 0 \cdot b1 \cdot \{\sin(\pi/2 + \theta 1 + \theta g)\} \\ &= rkg \cdot \omega 0 \cdot b1 \cdot \\ &\quad \{\cos(\pi/2 + \theta 1 + \theta g) + j \cdot \sin(\pi/2 + \theta 1 + \theta g)\} \\ &= rkg \cdot \omega 0 \cdot b1 \cdot \exp\{j \cdot (\pi/2 + \theta 1 + \theta g)\} \end{aligned} \quad (27)$$

The inter-electrode electromotive force Ec represented by equation (27) which is transformed into complex coordinates becomes an inter-electrode electromotive force which originates from only a temporal change in magnetic field and is irrelevant to the flow velocity. In equation (27), $rkg \cdot \omega 0 \cdot b1 \cdot \exp\{j \cdot (p/2 + \theta 1 + \theta g)\}$ is a complex vector having a length $rkg \cdot \omega 0 \cdot b1$ and an angle $p/2 + \theta 1 + \theta g$ with respect to the real axis.

In addition, the proportional coefficient rkg and angle $\theta g$ can be represented by the following complex vector kg.

$$\begin{aligned} kg &= rkg \cdot \cos(\theta g) + j \cdot rkg \cdot \sin(\theta g) \\ &= rkg \cdot \exp(j \cdot \theta g) \end{aligned} \quad (28)$$

In equation (28), rkg is the magnitude of the vector kg, and $\theta g$ is the angle of the vector kg with respect to the real axis.

Figure 38:
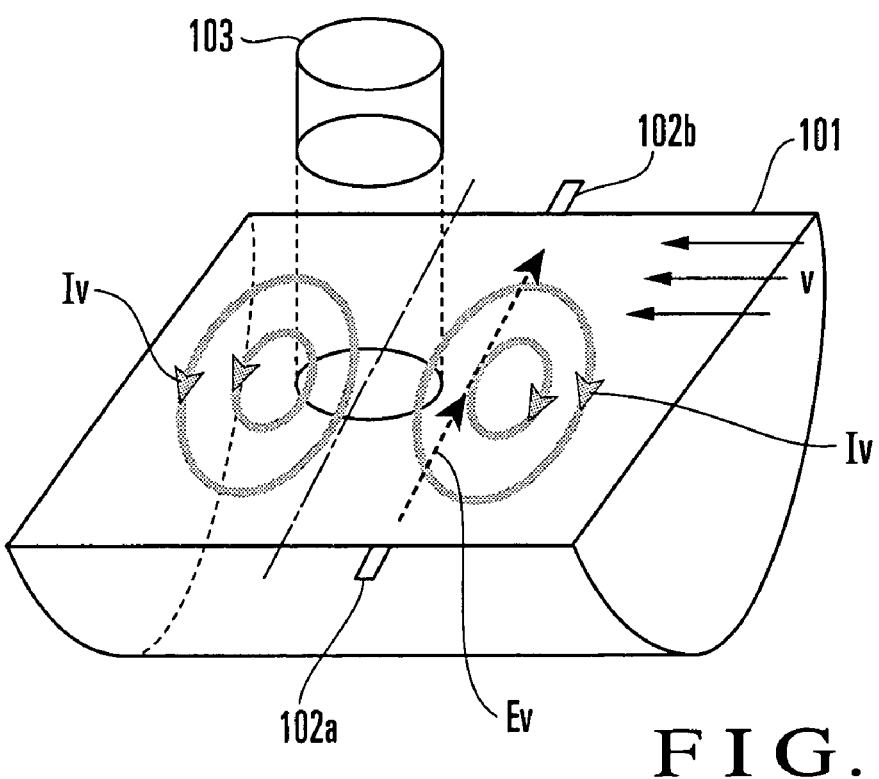
FIG. 38 is a view showing eddy currents and interelectrode electromotive forces when the flow rate of a fluid to be measured is not 0 in the conventional electromagnetic flowmeter.
Figure 39:
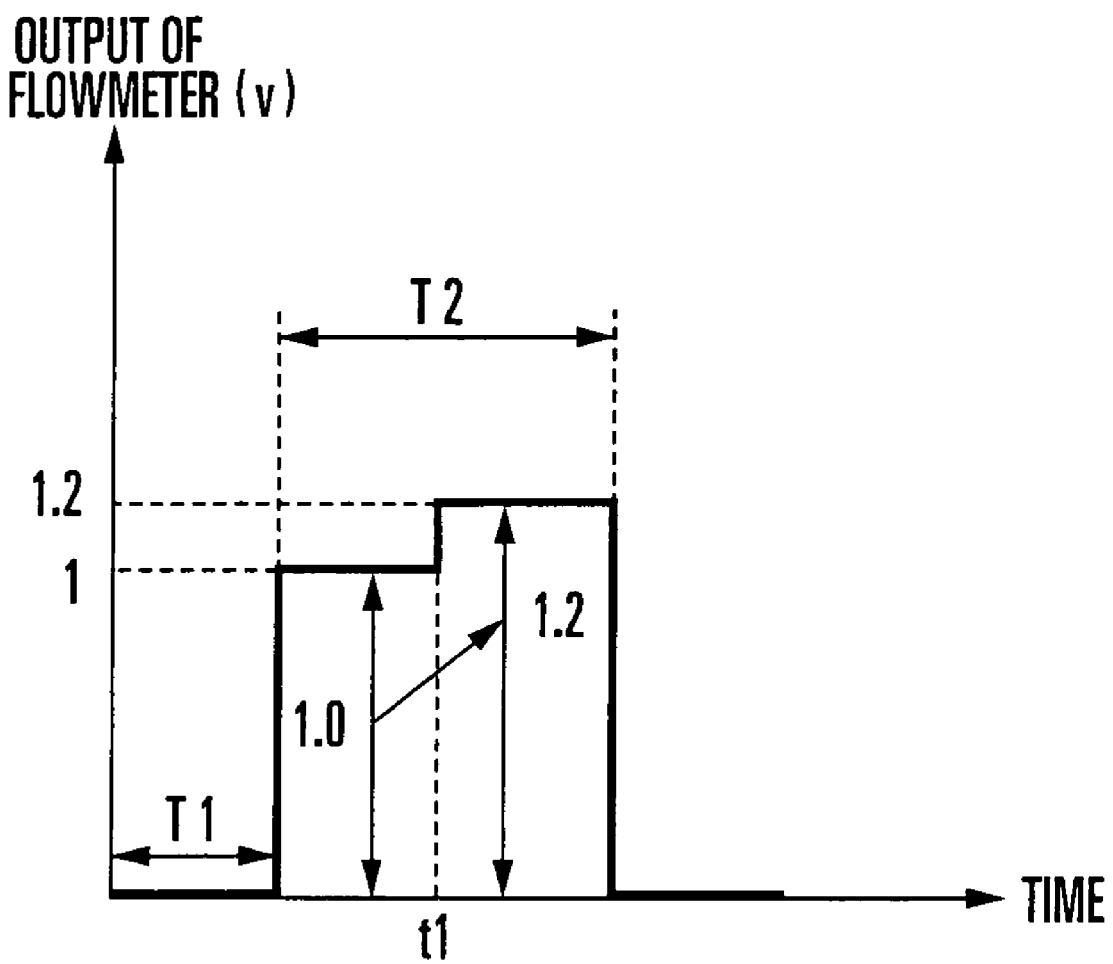
FIG. 39 is a graph for explaining a span shift in the electromagnetic flowmeter.

An inter-electrode electromotive force originating from the flow velocity of a fluid to be measured will be described next. Letting V ($V \neq 0$) be the magnitude of the flow velocity of the fluid, since a component v×Ba originating from a flow velocity vector v of the fluid is generated in a generated eddy current in addition to the eddy current I when the flow velocity is 0, an eddy current Iv generated by the flow velocity vector v and the magnetic field Ba is directed as shown in FIG. 38. Therefore, the direction of an inter-electrode electromotive force Ev generated by the flow velocity vector v and the magnetic field Ba becomes opposite to the direction of the inter-electrode electromotive force E generated by the temporal change, and the direction of Ev is defined as the positive direction.

In this case, as indicated by the following equation, the inter-electrode electromotive force Ev originating from the flow velocity is the value obtained by multiplying the magnetic field B1 by a proportional coefficient rkf and a magnitude V of the flow velocity, and substituting the phase $\theta 1$ into $\theta 1 + \theta f$. The proportional coefficient rkf is a complex number associated with the characteristics or state of the fluid to be measured, and the structure of the measuring tube 1 including the arrangement of the electrodes 2a and 2b. Similarly, the angle $\theta f$ is associated with the characteristics or state of the fluid to be measured, and the structure of the measuring tube 1 including the arrangement of the electrodes 2a and 2b.

$$Ev = rkf \cdot V \cdot \{b1 \cdot \cos(\omega 0 \cdot t - \theta 1 - \theta f)\} \quad (29)$$

Equation (29) is rewritten to $$\begin{aligned} Ev &= rkf \cdot V \cdot b1 \cdot \cos(\omega 0 \cdot t) \cdot \cos(-\theta 1 - \theta f) - \\ &\quad rkf \cdot V \cdot b1 \cdot \sin(\omega 0 \cdot t) \cdot \sin(-\theta 1 - \theta f) \\ &= rkf \cdot V \cdot b1 \cdot \{\cos(\theta 1 + \theta f)\} \cdot \cos(\omega 0 \cdot t) + \\ &\quad rkf \cdot V \cdot b1 \cdot \{\sin(\theta 1 + \theta f)\} \cdot \sin(\omega 0 \cdot t) \end{aligned} \quad (30)$$

In this case, when mapping equation (30) on the complex coordinate plane with reference to $\omega 0 \cdot t$, a real axis component Evx and an imaginary axis component Evy are given by $$Evx = rkf \cdot V \cdot b1 \cdot \{\cos(\theta 1 + \theta f)\} \quad (31)$$

$$Evy = rkf \cdot V \cdot b1 \cdot \{\sin(\theta 1 + \theta f)\} \quad (32)$$

In addition, Evx and Evy represented by equations (31) and (32) are rewritten to a complex vector Evc represented by $$\begin{aligned}
Evc &= Evx + j \cdot Evy \\
&= rkf \cdot V \cdot b1 \cdot \{\cos(\theta 1 + \theta f)\} + \\
&\quad j \cdot rkf \cdot V \cdot b1 \cdot \{\sin(\theta 1 + \theta f)\} \\
&= rkf \cdot V \cdot b1 \cdot \{\cos(\theta 1 + \theta f) + j \cdot \sin(\theta 1 + \theta f)\} \\
&= rkf \cdot V \cdot b1 \cdot \exp(j \cdot \theta 1 + \theta f)
\end{aligned} \quad (33)$$

The inter-electrode electromotive force Evc represented by equation (33) transformed into complex coordinates becomes an inter-electrode electromotive force which originates from the flow velocity of the fluid to be measured. In equation (28), $rkf \cdot V \cdot b1 \cdot \exp\{j \cdot (\theta 1 + \theta f)\}$ is a complex vector having a length $rkf \cdot V \cdot b1$ and an angle $\theta 1 + \theta f$ with respect to the real axis.

In addition, the proportional coefficient rkf and angle $\theta f$ can be represented by the following equation:

$$\begin{aligned}
kf &= rkf \cdot \cos(\theta f) + j \cdot rkf \cdot \sin(\theta f) \\
&= rkf \cdot \exp(j \cdot \theta f)
\end{aligned} \quad (34)$$

In equation (34), rkf is the magnitude of the vector kf, and $\theta f$ is the angle of the vector kf with respect to the real axis.

An inter-electrode electromotive force Ea1c as a combination of inter-electrode electromotive force Ec originating from a temporal change in magnetic field and an inter-electrode electromotive force Evc originating from the flow velocity of the fluid is expressed by the following equation by adding equations (33) and (27).

$$Ea1c = rkg \cdot \omega 0 \cdot b1 \cdot \exp\{j(\pi/2 + \theta 1 + \theta g)\} + \quad (35)$$
$$rkf \cdot V \cdot b1 \cdot \exp\{j \cdot (\theta 1 + \theta f)\}$$

As is obvious from equation (35), an inter-electrode electromotive force Ea1c is written by two complex vectors $rkg \cdot \omega 0 \cdot b1 \cdot \exp\{j \cdot (p/2 + \theta 1 + \theta g)\}$ as a $\partial A/\partial t$ component and $rkf \cdot V \cdot b1 \cdot \exp\{j \cdot (\theta 1 + \theta f)\}$ as a v×B component. The length of the resultant vector obtained by combining the two complex vectors represents the magnitude of the output (the inter-electrode electromotive force Ea1c), and an angle $\phi$ of the resultant vector represents the phase difference (phase delay) of the inter-electrode electromotive force Ea1c with respect to the phase $\omega 0 \cdot t$ of the input (exciting current).

Assuming that the $\partial A/\partial t$ component in the resultant vector represented by equation (35) is given by a product Va10 obtained by multiplying a constant term $Ka = ext(j \cdot p/2)$ in the $\partial A/\partial t$ component, a term $B1c = b1 \cdot \exp\{j \cdot \theta 1\}$ associated with the magnetic field, a term $Cg = rkg \cdot \exp(j \cdot \theta g)$ associated with the characteristics or state of the fluid, and the angular frequency $\omega 0$, the first term of the right side of equation (35) is represented by equation (36).

$$Va10 = Ka \cdot B1c \cdot Cg \cdot \omega 0 \quad (36)$$

Assuming that the v×B component in the resultant vector represented by equation (35) is given by a product Vb10 obtained by multiplying a constant term Kb=1 in the v×B component, a term $B1c = b1 \cdot \exp\{j \cdot \theta 1\}$ associated with the magnetic field, a term $Cf = rkf \cdot \exp(j \cdot \theta f)$ associated with the characteristics or state of the fluid, and the magnitude V of the flow velocity, the second term of the right side of equation (35) is represented by equation (37).

$$Vb10 = Kb \cdot B1c \cdot Cf \cdot V \quad (37)$$

When extracting only Va10 from the resultant vector Va10+Vb10, and extracting the variation component Cg dependent on the characteristics or state of the fluid, a change in characteristics or state of the fluid can be known independently of the flow velocity. A method of extracting the $\partial A/\partial t$ component from the resultant vector will be generally described.

Second Arrangement

The second arrangement of the electromagnetic flowmeter of the present invention will be described next. FIG. 1 explains the principle of the second arrangement. The electromagnetic flowmeter in FIG. 1 includes a measuring tube 1, electrodes 2a and 2b, and first and second exciting coils 3a and 3b which apply, to a fluid to be measured, time-changing magnetic fields asymmetric on the front and rear sides of the measuring tube 1 which are bordered on a plane PLN which is perpendicular to the direction of a measuring tube axis PAX and includes the electrodes 2a and 2b, when the plane PLN serves as a boundary of the measuring tube 1. The first exciting coil 3a is placed at a position spaced apart from the plane PLN by an offset distance d1 to, for example, the downstream side. The second exciting coil 3b is placed at a position spaced apart from the plane PLN by an offset distance d2 to, for example, the upstream side so as to face the first exciting coil 3a through the plane PLN.

The second arrangement is obtained by adding one exciting coil to the electromagnetic flowmeter with the first arrangement. If the second exciting coil 3b to be newly added is placed on the same side as the existing first exciting coil 3a, the resultant arrangement is a redundant arrangement of that shown in FIG. 36. Therefore, the second exciting coil 3b needs to be placed on a side different from that of the first exciting coil 3a through the plane PLN including the electrodes 2a an 2b. With this arrangement, if a v×B component originating from a magnetic field Bb generated from the first exciting coil 3a and the flow velocity and a v×B component originating from a magnetic field Bc generated from the second exciting coil 3b and the flow velocity, which are detected by the electrodes 2a and 2b, are directed in the same direction, a $\partial A/\partial t$ component originating from a change in the magnetic field Bb generated by the first exciting coil 3a and a $\partial A/\partial t$ component originating from a change in the magnetic field Bc generated by the second exciting coil 3b are directed in opposite directions. Using this principle makes it possible to efficiently extract a $\partial A/\partial t$ component.

Of the magnetic field Bb generated from the first exciting coil 3a, a magnetic field component (magnetic flux density) B1 orthogonal to both an electrode axis EAX connecting the electrodes 2a and 2b and the measuring tube axis PAX on the electrode axis EAX, and of the magnetic field Bc generated from the second exciting coil 3b, a magnetic field component (magnetic flux density) B2 orthogonal to both the electrode axis EAX and the measuring tube axis PAX on the electrode axis EAX are given by $$B1 = b1 \cdot \cos(\omega 0 \cdot t - \theta 1) \quad (38)$$

$$B2 = b2 \cdot \cos(\omega 0 \cdot t - \theta 2) \quad (39)$$

In equations (38) and (39), b1 and b2 are the amplitudes of the magnetic flux densities B1 and B2, $\omega 0$ is an angular frequency, and $\theta 1$ and $\theta 2$ are phase differences (phase lags) between the magnetic flux densities B1 and B2 and $\omega 0 \cdot t$. The magnetic flux densities B1 and B2 will be respectively referred to as the magnetic fields B1 and B2 hereinafter.

Since the electromotive force originating from a change in magnetic field depends on a time derivative dB/dt of the magnetic field, the magnetic field B1 generated by the exciting coil 3a and the magnetic field B2 generated by the second exciting coil 3b are differentiated by $$dB1/dt = \omega 0 \cdot \cos(\omega 0 \cdot t) \cdot b1 \cdot \{\sin(\theta 1)\} + \qquad (40)$$
$$\omega 0 \cdot \sin(\omega 0 \cdot t) \cdot b1 \cdot \{-\cos(\theta 1)\}$$

$$dB2/dt = \omega 0 \cdot \cos(\omega 0 \cdot t) \cdot b2 \cdot \{\sin(\theta 2)\} + \qquad (41)$$
$$\omega 0 \cdot \sin(\omega 0 \cdot t) \cdot b2 \cdot \{-\cos(\theta 2)\}$$

Figure 2:
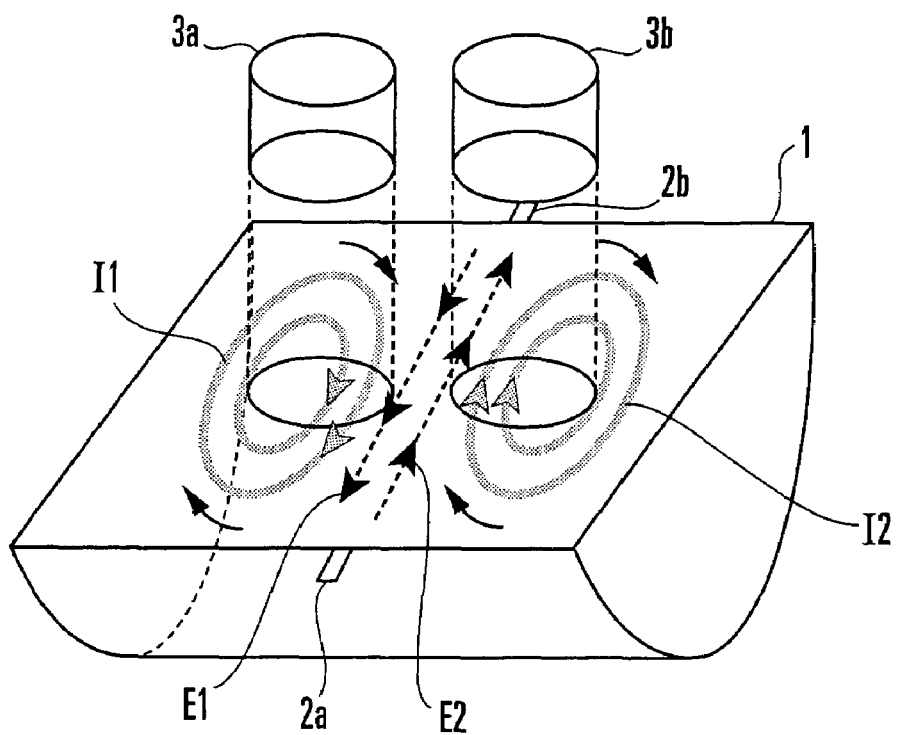
FIG. 2 is a view showing eddy currents and inter-electrode electromotive forces in the electromagnetic flowmeter in FIG. 1 when the flow rate of a fluid to be measured is 0.

If the flow velocity of the fluid to be measured is 0, a generated eddy current is only a component originating from a change in magnetic field. An eddy current I1 based on the magnetic field Bb and an eddy current I2 based on the magnetic field Bc are directed as shown in FIG. 2. Therefore, an inter-electrode electromotive force E1 which is generated by a change in the magnetic field Bb and is irrelevant to the flow velocity and an inter-electrode electromotive force E2 which is generated by a change in the magnetic field Bc and is irrelevant to the flow velocity are directed opposite to each other as shown in FIG. 2 within a plane including the electrode axis EAX and the measuring tube axis PAX.

At this time, an overall inter-electrode electromotive force E as the sum of the inter-electrode electromotive forces E1 and E2 is the value obtained by multiplying the difference $(-dB1/dt+dB2/dt)$ between time derivatives dB1/dt and dB2/dt of a magnetic field by a proportional coefficient rkg and replacing the phase differences $\theta 1$ and $\theta 2$ with $\theta 1+\theta g$ and $\theta 2+\theta g$, respectively (rkg and $\theta g$ are associated with a characteristic or state of the fluid to be measured and the structure of the measuring tube 1 including the positions of the electrodes 2a and 2b) according to the following equation:

$$E = rkg \cdot \omega 0 \cdot \cos(\omega 0 \cdot t) \cdot \qquad (42)$$
$$\{-b1 \cdot \sin(\theta 1 + \theta g) + b2 \cdot \sin(\theta 2 + \theta g)\} +$$
$$rkg \cdot \omega 0 \cdot \sin(\omega 0 \cdot t) \cdot$$
$$\{b1 \cdot \cos(\theta 1 + \theta g) - b2 \cdot \cos(\theta 2 + \theta g)\}$$

Figure 3:
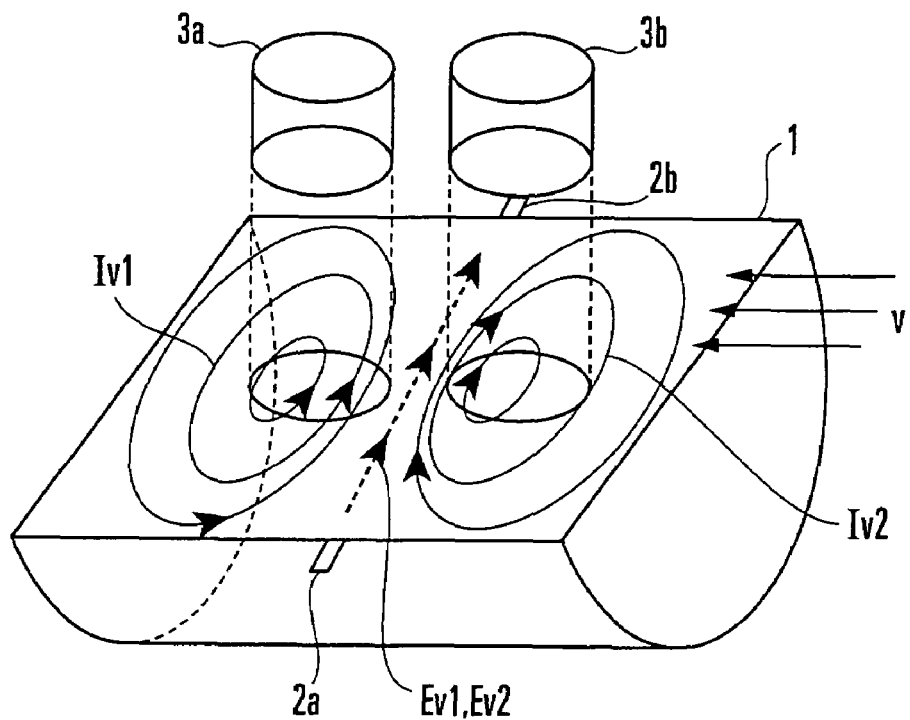
FIG. 3 is a view showing eddy currents and inter-electrode electromotive forces in the electromagnetic flowmeter in FIG. 1 when the flow rate of a fluid to be measured is not 0.

If the magnitude of the flow velocity of the fluid to be measured is V ($V \neq 0$), components $v \times Bb$ and $v \times Bc$ originating from a flow velocity vector v of the fluid to be measured are generated in the generated eddy currents in addition to eddy currents I1 and I2 generated when the flow velocity is 0. For this reason, an eddy current Iv1 originating from the flow velocity vector v and the magnetic field Bb and an eddy current Iv2 originating from the flow velocity vector v and the magnetic field Bc are directed as shown in FIG. 3. Consequently, an inter-electrode electromotive force Ev1 generated by the flow velocity vector v and the magnetic field Bb and an inter-electrode electromotive force Ev2 generated by the flow velocity vector v and the magnetic field Bc are directed in the same direction.

An overall inter-electrode electromotive force Ev obtained by adding the inter-electrode electromotive forces Ev1 and Ev2 is the value obtained by multiplying the sum of the magnetic fields B1 and B2 by a proportional coefficient rkf and a magnitude V of the flow velocity and replacing the phase differences $\theta 1$ and $\theta 2$ with $\theta 1+\theta f$ and $\theta 2+\theta f$, respectively (rkf and $\theta f$ are associated with a characteristic and state of the fluid to be measured and the structure of the measuring tube 1 including the positions of the electrodes 2a and 2b) according to the following equation:

$$Ev = rkf \cdot V \cdot \cos(\omega 0 \cdot t) \cdot \{b1 \cdot \cos(\theta 1 + \theta f) + b2 \cdot \cos(\theta 2 + \theta f)\} + \qquad (43)$$
$$rkf \cdot V \cdot \sin(\omega 0 \cdot t) \cdot \{b1 \cdot \sin(\theta 1 + \theta f) + b2 \cdot \sin(\theta 2 + \theta f)\}$$

Considering the directions of the inter-electrode electromotive forces described with reference to FIGS. 2 and 3, of an overall inter-electrode electromotive force obtained by combining the electromotive force obtained by converting the inter-electrode electromotive force originating from a temporal change in magnetic field into a complex vector and the electromotive force obtained by converting the inter-electrode electromotive force originating from the flow velocity of the fluid to be measured into a complex vector, a component Ea2c with an angular frequency $\omega 0$ is expressed by the following equation according to equations (42) and (43).

$$Ea2c = rkg \cdot \omega 0 \cdot b1 \cdot \exp\{j \cdot (\pi/2 + \theta 1 + \theta g)\} + \qquad (44)$$
$$rkf \cdot V \cdot b1 \cdot \exp\{j \cdot (\theta 1 + \theta f)\} +$$
$$rkg \cdot \omega 0 \cdot b2 \cdot \exp\{j \cdot (-\pi/2 + \theta 2 + \theta g)\} +$$
$$rkf \cdot V \cdot b2 \cdot \exp\{j \cdot (\theta 2 + \theta f)\}$$

Assume that a state wherein $\theta 2=\theta 1+\Delta\theta 2$ represents the relationship between a phase lag $\theta 1$ of the magnetic field B1 with respect to $\omega 0 \cdot t$ and a phase lag $\theta 2$ of the magnetic field B2 with respect to $\omega 0 \cdot t$ is defined as an excitation state ST1. In this case, letting E20 be the inter-electrode electromotive force Ea2c in the excitation state ST1, the inter-electrode electromotive force E20 is given by $$E20 = \qquad (45)$$
$$rkg \cdot \exp\{j \cdot (\theta 1 + \theta g)\} \cdot \exp(j \cdot \pi/2) \cdot \{b1 - b2 \cdot \exp(j \cdot \Delta\theta 2)\} \cdot \omega 0 +$$
$$rkf \cdot \exp\{j \cdot (\theta 1 + \theta f)\} \cdot \{b1 + b2 \cdot \exp(j \cdot \Delta\theta 2)\} \cdot V$$

Assume that a state ($\theta 2=p+\theta 1+\Delta\theta 2$) wherein the phase difference between the magnetic fields B1 and B2 has changed from that in the excitation state ST1 by a constant value p is given as ST2. In this case, letting E20R be the inter-electrode electromotive force Ea2c in the excitation state ST2, the inter-electrode electromotive force E20R is represented by the following equation according to equation (45).

$$E20R = \\ rkg \cdot \exp\{j \cdot (\theta 1 + \theta g)\} \cdot \exp(j \cdot \pi/2) \cdot \{b1 + b2 \cdot \exp(j \cdot \Delta\theta 2)\} \cdot \omega 0 + \\ rkf \cdot \exp\{j \cdot (\theta 1 + \theta f)\} \cdot \{b1 - b2 \cdot \exp(j \cdot \Delta\theta 2)\} \cdot V \quad (46)$$

The sum of the first term of the right side of equation (45) and the first term of the right side of equation (46) represents the overall ∂A/∂t component obtained by combining ∂A/∂t component originating from a change in the magnetic field generated from the first exciting coil 3a and a ∂A/∂t component originating from a change in the magnetic field generated from the second exciting coil 3b. The sum of the second term of the right side of equation (45) and the second term of the right side of equation (46) represents the overall v×B component obtained by combining a v×B component originating from the magnetic field generated from the first exciting coil 3a and the flow velocity of the fluid and a v×B component originating from the magnetic field generated from the first exciting coil 3b and the flow velocity of the fluid.

In this case, if the distance d1 from the plane PLN, which is perpendicular to the measuring tube axis PAX and includes the electrodes 2a and 2b, to the first exciting coil 3a is almost equal to the distance d2 from the plane PLN to the second exciting coil 3b (d1~d2), and the magnetic field generated from the first exciting coil 3a is almost equal to the magnetic field generated from the second exciting coil 3b, b1~b2 and Δθ2~0. In this case, equations (45) and (46) are rewritten as follows:

$$E20 \sim rkf \cdot \exp\{j \cdot (\theta 1 + \theta f)\} \cdot (2 \cdot b1 \cdot V) \quad (47)$$

$$E20R \sim rkg \cdot \exp\{j \cdot (\theta 1 + \theta g)\} \cdot \{2 \cdot b1 \cdot \omega 0 \cdot \exp(j \cdot \pi/2)\} \quad (48)$$

That is, since the inter-electrode electromotive force E20 is almost only the electromotive force based on the v×B component, and the inter-electrode electromotive force E20R is almost only the electromotive force based on the ∂A/∂t component, it is obvious that keeping the phase difference between the magnetic field generated from the first exciting coil 3a and the magnetic field generated from the second exciting coil 3b at almost p makes it possible to efficiently extract a ∂A/∂t component.

Assume that, of the ∂A/∂t component in the resultant vector represented by equation (45), the portion originating from the magnetic field generated from the first exciting coil 3a is represented by a product Va10 of constant term Ka=exp(j·p/2) in the ∂A/∂t component, term B1c=b1·exp(j·θ1) associated with the magnetic field generated from the first exciting coil 3a, term Cg=rkg·exp(j·θg) associated with a characteristic or state of the fluid, and the angular frequency ω0. In this case, Va10 is represented by equation (49), and the ∂A/∂t component in equation (46) is represented by Va10.

$$Va10=Ka \cdot B1c \cdot Cg \cdot \omega 0 \quad (49)$$

Assume that, of the v×B component in the resultant vector represented by equation (45), the portion originating from the magnetic field generated from the first exciting coil 3a is represented by a product Vb10 of constant term Kb=1 in the v×B component, term B1c=b1·exp(j·θ1) associated with the magnetic field generated from the first exciting coil 3a, term Cf=rkf·exp(j·θf) associated with a characteristic or state of the fluid, and the magnitude V of the flow velocity. In this case, Vb10 is represented by equation (50), and the v×B component in equation (46) is represented by Vb10.

$$Vb10=Kb \cdot B1c \cdot Cf \cdot V \quad (50)$$

Assume that, of the ∂A/∂t component in the resultant vector represented by equation (45), the portion originating from the magnetic field generated from the second exciting coil 3b is represented by a product Va20 of constant term −Ka=−exp(j·p/2) in the ∂A/∂t component, term B2c=b2·exp{j·(θ1+Δθ2)} associated with the magnetic field generated from the second exciting coil 3b, term Cg=rkg·exp(j·θg) associated with a characteristic or state of the fluid, and the angular frequency ω0. In this case, Va20 is represented by equation (51).

$$Va20=-Ka \cdot B2c \cdot Cg \cdot \omega 0 \quad (51)$$

Since the excitation state ST2 represented by equation (46) shifts in the phase of the magnetic field from the excitation state ST1 represented by equation (45) by p, the direction of the magnetic field reverses, and the term associated with the magnetic field generated from the second exciting coil 3b becomes −B2c=−b2·exp{j·(θ1+Δθ2)}. If, therefore, the portion originating from the magnetic field generated from the second exciting coil 3b, of the ∂A/∂t component in the resultant vector represented by equation (46), is represented by a product Va20R of constant term −Ka in the ∂A/∂t component, term −B2c associated with the magnetic field generated from the second exciting coil 3b, term Cg associated with a characteristic or state of the fluid, and the angular frequency ω0, Va20R is represented by equation (52).

$$Va20R=-Ka \cdot (-B2c) \cdot Cg \cdot \omega 0 \quad (52)$$

Assume that, of the v×B component in the resultant vector represented by equation (45), the portion originating from the magnetic field generated from the second exciting coil 3b is represented by a product Vb20 of constant term Kb=1 in the v×B component, term B2c=b2·exp{j·(θ1+Δθ2)} associated with the magnetic field generated from the second exciting coil 3b, term Cf=rkf·exp(j·θf) associated with a characteristic or state of the fluid, and the magnitude V of the flow velocity. In this case, Vb20 is represented by equation (53).

$$Vb20=Kb \cdot B2c \cdot Cf \cdot V \quad (53)$$

Since the excitation state ST2 shifts in the phase of the magnetic field from the excitation state ST1 by p, a term associated with the magnetic field generated from the second exciting coil 3b becomes −B2c=−b2·exp{j·(θ1+Δθ2)}. If, therefore, the portion originating from the magnetic field generated from the second exciting coil 3b, of the v×B component in the resultant vector represented by equation (46), is represented by a product Vb20R of constant term Kb in the v×B component, term −B2c associated with the magnetic field generated from the second exciting coil 3b, term Cf associated with a characteristic or state of the fluid, and the magnitude V of the flow velocity, Vb20R is represented by equation (54).

$$Vb20R=Kb \cdot (-B2c) \cdot Cf \cdot V \quad (54)$$

According to equations (49), (50), (52), and (54), ∂A/∂t component Va10+Va20R (the first term of the right side of equation (46)) and a v×B component Vb10+Vb20R (the second term of the right side of equation (46)) which are detected by the electrodes 2a and 2b in the excitation state ST2 are given by $$Va10 + Va20R = Ka \cdot (B1c + B2c) \cdot Cg \cdot \omega 0 \quad (55)$$

$$Vb10 + Vb20R = Kb \cdot (B1c - B2c) \cdot Cf \cdot V \quad (56)$$

Extracting only the ∂A/∂t component Va10+Va20R from the resultant vector E20R (=(Va10+Va20R)+(Vb10+Vb20R)) of the ∂A/∂t component and v×B component and extracting the variation component Cg due to a characteristic or state of the fluid make it possible to know a change in the characteristic or state of the fluid independently of the flow velocity. A method of extracting a ∂A/∂t component from a resultant vector will be generalized and described later.

Third Arrangement

Figure 4:
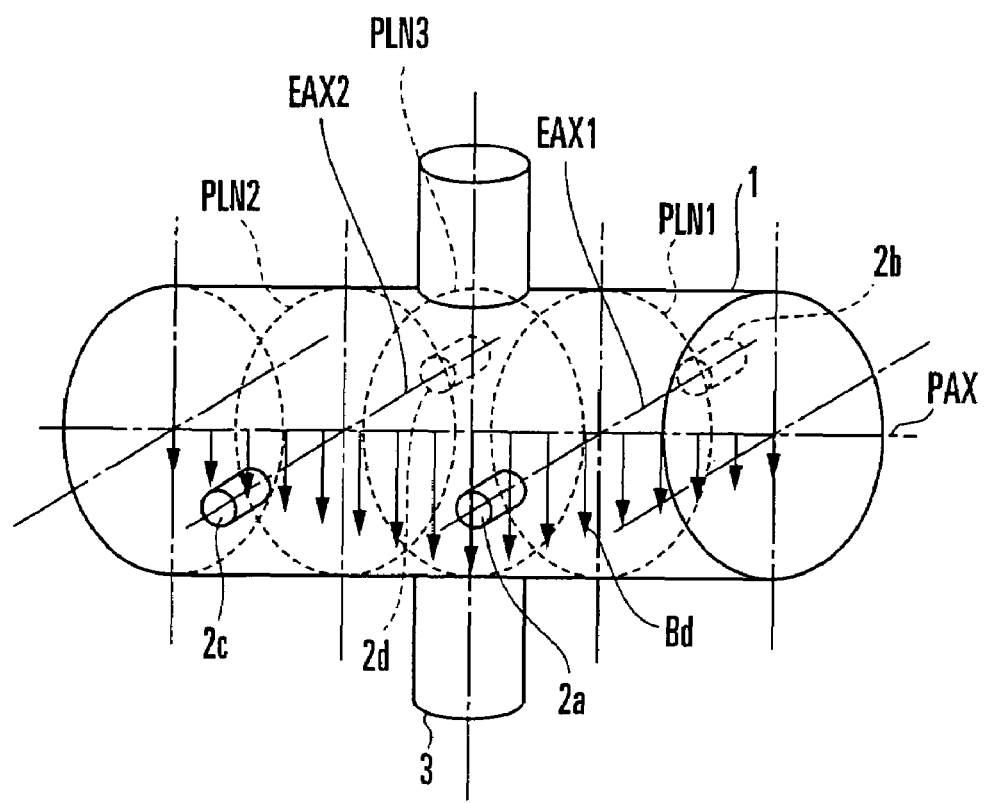
FIG. 4 is a block diagram for explaining the principle of the third arrangement of the electromagnetic flowmeter of the present invention.

The third arrangement of the electromagnetic flowmeter of the present invention will be described next. FIG. 4 explains the principle of the third arrangement. The electromagnetic flowmeter in FIG. 4 includes a measuring tube 1, first electrodes 2a and 2b and second electrodes 2c and 2d which are arranged in the measuring tube 1 to be perpendicular to both a magnetic field applied to a fluid to be measured and a measuring tube axis PAX and face each other so as to be come into contact with the fluid to be measured, and detect the electromotive force generated by the magnetic field and the flow of the fluid to be measured, and an exciting coil 3 which applies, to the fluid to be measured, a time-changing magnetic field which is asymmetric on the front and rear sides of the measuring tube 1 which are bordered on a plane PLN1 and a time-changing magnetic field which is asymmetric on the front and rear sides of the measuring tube 1 which are bordered on a plane PLN2, when a plane which is perpendicular to the measuring tube axis PAX and includes the first electrodes 2a and 2b serving as the plane PLN1 and a plane which is perpendicular to the measuring tube axis PAX and includes the second electrodes 2c and 2d serves as the plane PLN2. The first electrodes 2a and 2b are placed at a position spaced apart from a plane PLN3 which includes the axis of the exciting coil 3 and is perpendicular to the direction of the measuring tube axis PAX by an offset distance d3 to, for example, the upstream side. The second electrodes 2c and 2d are placed at a position spaced apart from the plane PLN3 by an offset distance d4 to, for example, the downstream side so as to face the first electrodes 2a and 2b through the plane PLN 3.

The third arrangement is obtained by adding one pair of electrodes to the electromagnetic flowmeter with the first arrangement. If the second electrodes 2c and 2d to be newly added are placed on the same side as the first electrodes 2a and 2b, the resultant arrangement is a redundant arrangement of that shown in FIG. 36. Therefore, the second electrodes 2c and 2d need to be placed on a side different from that of the first electrodes 2a and 2b through the exciting coil 3. With this arrangement, a v×B component originating from the magnetic field generated from the exciting coil 3 and the flow velocity and detected by the first electrodes 2a and 2b and a v×B component originating from the magnetic field generated from the exciting coil 3 and the flow velocity and detected by the second electrodes 2c and 2d are directed in the same direction. In contrast, a ∂A/∂t component originating from a change in the magnetic field generated from the exciting coil 3, which is detected by the first electrodes 2a and 2b, and a ∂A/∂t component originating from a change in the magnetic field generated by the exciting coil 3, which is detected by the second electrodes 2c and 2d, are directed in opposite directions. Using this principle makes it possible to efficiently extract a ∂A/∂t component.

Of a magnetic field Bd generated from the first exciting coil 3, a magnetic field component (magnetic flux density) B3 orthogonal to both an electrode axis EAX1 connecting the electrodes 2a and 2b and the measuring tube axis PAX on the electrode axis EAX1, and of the magnetic field Bd generated from the exciting coil 3, a magnetic field component (magnetic flux density) B4 orthogonal to both an electrode axis EAX2 and the measuring tube axis PAX on the electrode axis EAX2 are given by $$B3 = b3 \cdot \cos(\omega 0 \cdot t - \theta 3) \quad (57)$$

$$B4 = b4 \cdot \cos(\omega 0 \cdot t - \theta 4) \quad (58)$$

Note, however, that since B3 and B4 are generated from the single exciting coil 3, b3 and b4, and θ3 and θ4 have some relationships with each other and are not independent variables. In equations (57) and (58), b3 and b4 are the amplitudes of the magnetic flux densities B3 and B4, ω0 is an angular frequency, and θ3 and θ4 are phase differences (phase lags) between the magnetic flux densities B3 and B4 and ω0·t. The magnetic flux densities B3 and B4 will be respectively referred to as the magnetic fields B3 and B4 hereinafter.

Since the electromotive force originating from a change in magnetic field depends on a time derivative dB/dt of the magnetic field, the magnetic fields B3 and B4 of the magnetic field Bd generated from the exciting coil 3 are differentiated according to $$dB3/dt = \omega 0 \cdot \cos(\omega 0 \cdot t) \cdot b3 \cdot \{\sin(\theta 3)\} + \omega 0 \cdot \sin(\omega 0 \cdot t) \cdot b3 \cdot \{-\cos(\theta 3)\} \quad (59)$$

$$dB4/dt = \omega 0 \cdot \cos(\omega 0 \cdot t) \cdot b4 \cdot \{\sin(\theta 4)\} + \omega 0 \cdot \sin(\omega 0 \cdot t) \cdot b4 \cdot \{-\cos(\theta 4)\} \quad (60)$$

Figure 5:
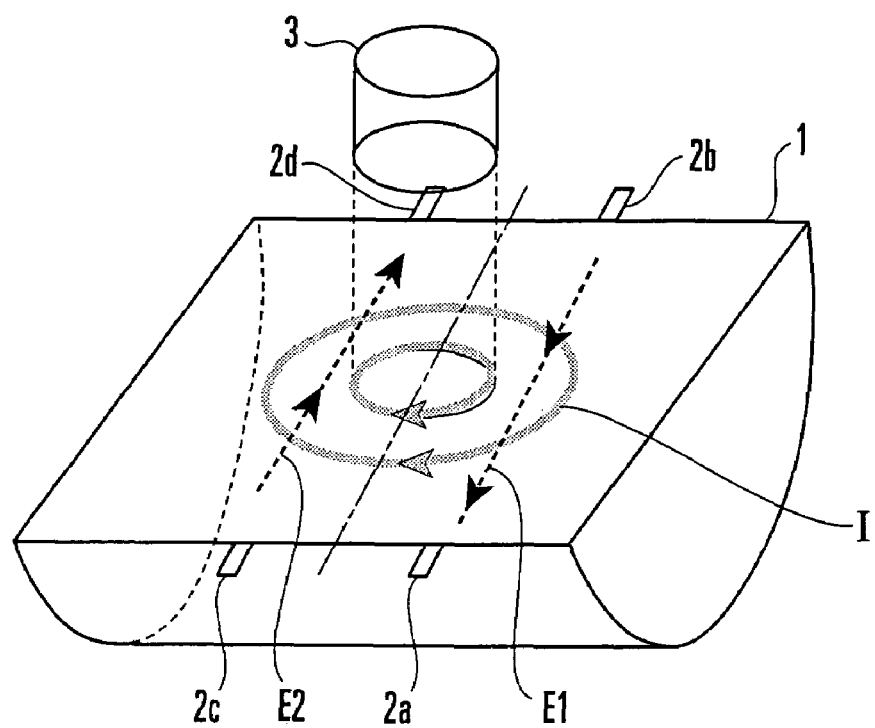
FIG. 5 is a view showing eddy currents and inter-electrode electromotive forces in the electromagnetic flowmeter in FIG. 4 when the flow rate of a fluid to be measured is 0.

If the flow velocity of the fluid to be measured is 0, a generated eddy current is only a component originating from a change in magnetic field. An eddy current I due to a change in the magnetic field Bd is directed as shown in FIG. 5. Therefore, a first inter-electrode electromotive force E1 which is generated between the electrodes 2a and 2b by a change in the magnetic field Bd and is irrelevant to the flow velocity within a plane including the electrode axis EAX1 and the measuring tube axis PAX and a second inter-electrode electromotive force E2 which is generated between the electrodes 2c and 2d by a change in the magnetic field Bd and is irrelevant to the flow velocity within a plane including the electrode axis EAX2 and the measuring tube axis PAX are directed opposite to each other as shown in FIG. 5.

At this time, the first and second inter-electrode electromotive forces E1 and E2 are the values obtained such that time derivatives (−dB3/dt and dB4/dt) of magnetic fields to which the directions of electromotive forces are added are multiplied by a proportional coefficient rkg and the phase differences θ3 and θ4 are replaced with θ3+θg and θ4+θg, respectively (rkg and θg are associated with a characteristic and state of the fluid to be measured and the structure of the measuring tube 1 including the positions of the electrodes 2a, 2b, 2c, and 2d) according to the following equations:

$$E1 = rkg \cdot \omega 0 \cdot \cos(\omega 0 \cdot t) \cdot b3 \cdot \{-\sin(\theta 3 + \theta g)\} + \qquad (61)$$
$$rkg \cdot \omega 0 \cdot \sin(\omega 0 \cdot t) \cdot b3 \cdot \{\cos(\theta 3 + \theta g)\}$$

$$E2 = rkg \cdot \omega 0 \cdot \cos(\omega 0 \cdot t) \cdot b4 \cdot \{\sin(\theta 4 + \theta g)\} + \qquad (62)$$
$$rkg \cdot \omega 0 \cdot \sin(\omega 0 \cdot t) \cdot b4 \cdot \{-\cos(\theta 4 + \theta g)\}$$

Figure 6:
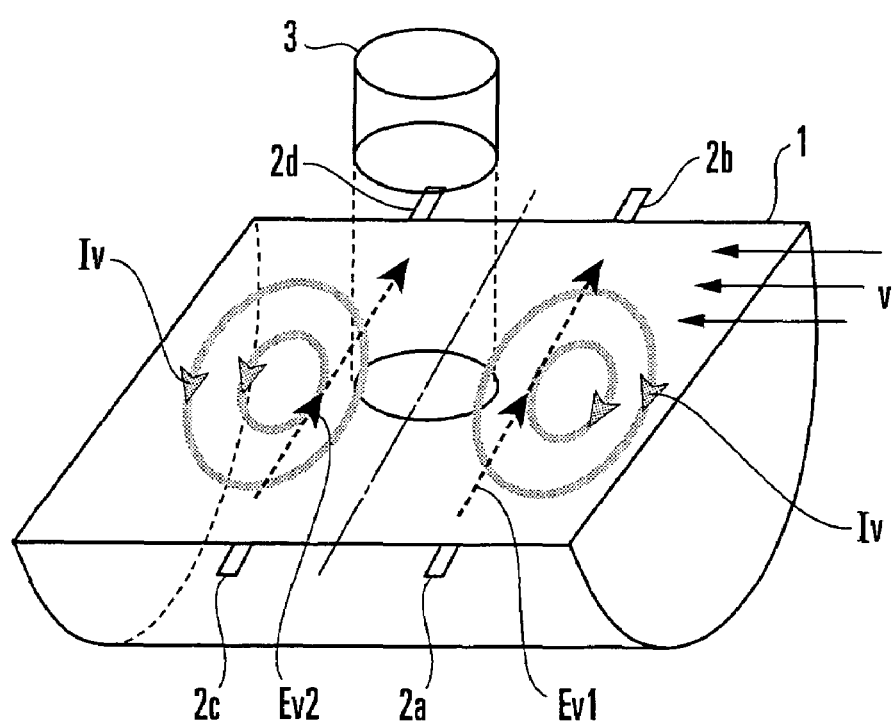
FIG. 6 is a view showing eddy currents and inter-electrode electromotive forces in the electromagnetic flowmeter in FIG. 4 when the flow rate of a fluid to be measured is not 0.

If the magnitude of the flow velocity of the fluid to be measured is V (V≠0), a component v×Bd originating from a flow velocity vector v of the fluid to be measured is generated in the generated eddy current in addition to an eddy currents I generated when the flow velocity is 0. For this reason, an eddy current Iv originating from the flow velocity vector v and the magnetic field Bd is directed as shown in FIG. 6. Consequently, a first inter-electrode electromotive force Ev1 generated by the flow velocity vector v and the magnetic field Bd and a second inter-electrode electromotive force Ev2 generated by the flow velocity vector v and the magnetic field Bd are directed in the same direction.

At this time, the first and second inter-electrode electromotive forces Ev1 and Ev2 are the values obtained such that magnetic fields (B3 and B4) to which the directions of electromotive forces are added are multiplied by a proportional coefficient rkf and the magnitude V of the flow velocity and the phase differences θ3 and θ4 are replaced with θ3+θf and θ4+θf, respectively (rkf and θf are associated with a characteristic and state of the fluid to be measured and the structure of the measuring tube 1 including the positions of the electrodes 2*a*, 2*b*, 2*c*, and 2*d*) according to the following equation:

$$Ev1 = rkf \cdot V \cdot \cos(\omega 0 \cdot t) \cdot b3 \cdot \cos(\theta 3 + \theta f) + \qquad (63)$$
$$rkf \cdot V \cdot \sin(\omega 0 \cdot t) \cdot b3 \cdot \sin(\theta 3 + \theta f)$$

$$Ev2 = rkf \cdot V \cdot \cos(\omega 0 \cdot t) \cdot b4 \cdot \cos(\theta 4 + \theta f) + \qquad (64)$$
$$rkf \cdot V \cdot \sin(\omega 0 \cdot t) \cdot b4 \cdot \sin(\theta 4 + \theta f)$$

Considering the directions of the inter-electrode electromotive forces described with reference to FIGS. 5 and 6, a first inter-electrode electromotive force Ea3*c* between the electrodes 2*a* and 2*b* which is obtained by combining the electromotive force obtained by converting the inter-electrode electromotive force originating from a temporal change in magnetic field into a complex vector and the electromotive force obtained by converting the inter-electrode electromotive force originating from the flow velocity of the fluid to be measured into a complex vector is represented by the following equation according to equation (35).

$$Ea3c = \qquad (65)$$
$$rkg \cdot \omega 0 \cdot b3 \cdot \exp\{j \cdot (\pi/2 + \theta 3 + \theta g)\} + rkf \cdot V \cdot b3 \cdot \exp\{j \cdot (\theta 3 + \theta f)\}$$

In addition, a second inter-electrode electromotive force Ea4*c* between the electrodes 2*c* and 2*d* which is obtained by combining the electromotive force obtained by converting the inter-electrode electromotive force originating from a temporal change in magnetic field into a complex vector and the electromotive force obtained by converting the inter-electrode electromotive force originating from the flow velocity of the fluid to be measured into a complex vector is represented by the following equation according to equation (35).

$$Ea4c = rkg \cdot \omega 0 \cdot b4 \cdot \exp\{j \cdot (-\pi/2 + \theta 4 + \theta g)\} + \qquad (66)$$
$$rkf \cdot V \cdot b4 \cdot \exp\{j \cdot (\theta 4 + \theta f)\}$$

Assume that θ4=θ3+Δθ4 represents the relationship between a phase lag θ3 of the magnetic field B3 with respect to ω0·t and a phase lag θ4 of the magnetic field B4 with respect to ω0·t. If the first inter-electrode electromotive force Ea3*c* given by equation (65) is directly represented by E301, and the value obtained by substituting θ4=θ3+Δθ4 into the second inter-electrode electromotive force Ea4*c* is represented by E302, the first and second inter-electrode electromotive forces E301 and E302 are represented as follows:

$$E301 = \qquad (67)$$
$$rkg \cdot \omega 0 \cdot b3 \cdot \exp\{j \cdot (\pi/2 + \theta 3 + \theta g)\} + rkf \cdot V \cdot b3 \cdot \exp\{j \cdot (\theta 3 + \theta f)\}$$

$$E302 = rkg \cdot \omega 0 \cdot b4 \cdot \exp\{j \cdot (-\pi/2 + \theta 3 + \Delta\theta 4 + \theta g)\} + \qquad (68)$$
$$rkf \cdot V \cdot b4 \cdot \exp\{j \cdot (\theta 3 + \Delta\theta 4 + \theta f)\}$$

A sum E30*s* and a difference E30*d* of the first and second inter-electrode electromotive forces E301 and E302 are represented by $$E30s = E301 + E302 \qquad (69)$$
$$= rkg \cdot \exp\{j \cdot (\theta 3 + \theta g)\} \cdot \exp(j \cdot \pi/2) \cdot$$
$$\{b3 - b4 \cdot \exp(j \cdot \Delta\theta 4)\} \cdot \omega 0 +$$
$$rkf \cdot \exp\{j \cdot (\theta 3 + \theta f)\} \cdot$$
$$\{b3 + b4 \cdot \exp(j \cdot \Delta\theta 4)\} \cdot V$$

$$E30d = E301 - E302 \qquad (70)$$
$$= rkg \cdot \exp\{j \cdot (\theta 3 + \theta g)\} \cdot \exp(j \cdot \pi/2) \cdot$$
$$\{b3 + b4 \cdot \exp(j \cdot \Delta\theta 4)\} \cdot \omega 0 +$$
$$rkf \cdot \exp\{j \cdot (\theta 3 + \theta f)\} \cdot$$
$$\{b3 - b4 \cdot \exp(j \cdot \Delta\theta 4)\} \cdot V$$

The first term of the right side of equation (69) represents a ∂A/∂t component in the sum of the electromotive force detected by the first electrodes 2*a* and 2*b* and the electromotive force detected by the second electrodes 2*c* and 2*d*. The second term of the right side of equation (69) represents a v×B component in the sum of the electromotive force detected by the first electrodes 2*a* and 2*b* and the electromotive force detected by the second electrodes 2*c* and 2*d*. The first term of the right side of equation (70) represents a ∂A/∂t component in the difference between the electromotive force detected by the first electrodes 2*a* and 2*b* and the electromotive force detected by the second electrodes 2*c* and 2*d*. The second term of the right side of equation (70) represents a v×B component in the difference between the electromotive force detected by the first electrodes 2*a* and 2*b* and the electromotive force detected by the second electrodes 2*c* and 2*d*.

In this case, if the distance d3 from the plane PLN3 including the axis of the exciting coil 3 to the electrode axis EAX1 connecting the electrodes 2*a* and 2*b* is almost equal to the distance d4 from the plane PLN3 to the electrode axis EAX2 connecting the electrodes $2c$ and $2d$ (d3~d4), then b3~b4 and $\Delta\theta 4$~0. In this case, equations (69) and (70) are rewritten as follows:

$$E30s \sim rkf \cdot \exp\{j \cdot (\theta 3 + \theta f)\} \cdot (2 \cdot b3 \cdot V) \tag{71}$$

$$E30d \sim rkg \cdot \exp\{j \cdot (\theta 3 + \theta g)\} \cdot \{2 \cdot b3 \cdot \omega 0 \cdot \exp(j \cdot \pi/2)\} \tag{72}$$

That is, since the sum E30$s$ of first and second inter-electrode electromotive forces is almost only the electromotive force based on the v×B component, and the difference E30$d$ between the first and second inter-electrode electromotive forces is almost only the electromotive force based on the $\partial A/\partial t$ component, it is obvious that obtaining the difference between the first and second inter-electrode electromotive forces makes it possible to efficiently extract a $\partial A/\partial t$ component.

Assume that a $\partial A/\partial t$ component in the resultant vector of the first inter-electrode electromotive force E301 of equation (67) is represented by a product Va30 of constant term Ka=exp(j·p/2) in the $\partial A/\partial t$ component, term Bc3=b3·exp(j·$\theta 3$) associated with the magnetic field generated from the exciting coil 3, term Cg=rkg·exp(j·$\theta g$) associated with a characteristic or state of the fluid, and the angular frequency $\omega 0$. In this case, Va30 is represented by equation (73).

$$Va30 = Ka \cdot Bc3 \cdot Cg \cdot \omega 0 \tag{73}$$

Assume that a v×B component in the resultant vector of the first inter-electrode electromotive force E301 of equation (67) is represented by a product Vb30 of constant term Kb=1 in the v×B component, term Bc3=b3·exp(j·$\theta 3$) associated with the magnetic field generated from the exciting coil 3, term Cf=rkf·exp(j·$\theta f$) associated with a characteristic or state of the fluid, and the magnitude V of the flow velocity. In this case, Vb30 is represented by equation (74).

$$Vb30 = Kb \cdot Bc3 \cdot Cf \cdot V \tag{74}$$

Assume that a $\partial A/\partial t$ component in the resultant vector of the second inter-electrode electromotive force E302 of equation (68) is represented by a product Va40 of constant term −Ka=−exp(j·p/2) in the $\partial A/\partial t$ component, term Bc4=b4·exp{j·($\theta 3 + \Delta\theta 4$)} associated with the magnetic field generated from the exciting coil 3, term Cg=rkg·exp·(j·$\theta g$) associated with the characteristics or state of the fluid, and the angular frequency $\omega 0$. In this case, Va40 is represented by equation (75).

$$Va40 = -Ka \cdot Bc4 \cdot Cg \cdot \omega 0 \tag{75}$$

Considering that (E301-E302) when the difference between the first inter-electrode electromotive force E301 and the second inter-electrode electromotive force E302 is to be obtained, the equation obtained by reversing the sign of Va40 of equation (75) is defined as Va40R (Va40R=−Va40) represented by equation (76):

$$Va40R = Ka \cdot Bc4 \cdot Cg\omega 0 \tag{76}$$

Assume that a v×B component in the resultant vector of the second inter-electrode electromotive force E302 of equation (68) is represented by a product Vb40 of constant term Kb=1 in the v×B component, term Bc4=b4·exp{j·($\theta 3 + \Delta\theta 4$)} associated with the magnetic field generated from the exciting coil 3, term Cf=rkf·exp(j·$\theta f$) associated with a characteristic or state of the fluid, and the magnitude V of the flow velocity. In this case, Vb40 is represented by equation (77).

$$Vb40 = Kb \cdot Bc4 \cdot Cf \cdot V \tag{77}$$

Considering that (E301-E302) when the difference between the first inter-electrode electromotive force E301 and the second inter-electrode electromotive force E302 is to be obtained, the equation obtained by reversing the sign of Vb40 of equation (77) is defined as Vb40R (Vb40R=−Vb40) represented by equation (78):

$$Vb40R = -Kb \cdot Bc4 \cdot Cf \cdot V \tag{78}$$

According to equations (73), (74), (76), and (78), in the electromotive force difference E30$d$ represented by equation (70), a $\partial A/\partial t$ component Va30+Va40R (the first term of the right side of equation (70)) originating from a change in the magnetic field generated from the exciting coil 3 and a v×B component Vb30+Vb40R (the second term of the right side of equation (70)) originating from the magnetic field generated from the exciting coil 3 and the flow velocity are given by $$Va30 + Va40R = Ka \cdot (Bc3 + Bc4) \cdot Cg \cdot \omega 0 \tag{79}$$

$$Vb30 + Vb40R = Kb \cdot (Bc3 - Bc4) \cdot Cf \cdot V \tag{80}$$

Extracting only the $\partial A/\partial t$ component Va30+Va40R from the resultant vector E30R (=(Va30+Va40R)+(Vb30+Vb40R)) of the $\partial A/\partial t$ component and v×B component and extracting the variation component Cg due to a characteristic or state of the fluid make it possible to know a change in the characteristic or state of the fluid independently of the flow velocity.

A method of extracting a v×B component and a $\partial A/\partial t$ component from a resultant vector will be described next. A characteristic or state of a fluid to be detected and a state in a measuring tube will be referred to as parameters hereinafter. For example, parameters include the level or sectional area of a fluid, a fluid impedance, the conductivity or dielectric constant of the fluid, and the deposition state of a substance in the measuring tube. One or a combination of two or more of the characteristics or state of a fluid and a state in the measuring tube can be selected as parameters.

First Extraction Method

As an extraction method which can be applied to either of the first arrangement shown in FIG. 36, the second arrangement shown in FIG. 1, and the third arrangement shown in FIG. 4, the first extraction method will be described. The first extraction method is a method using the phenomenon that although a $\partial A/\partial t$ component varies depending on the frequency, a v×B component does not vary.

Figure 36:
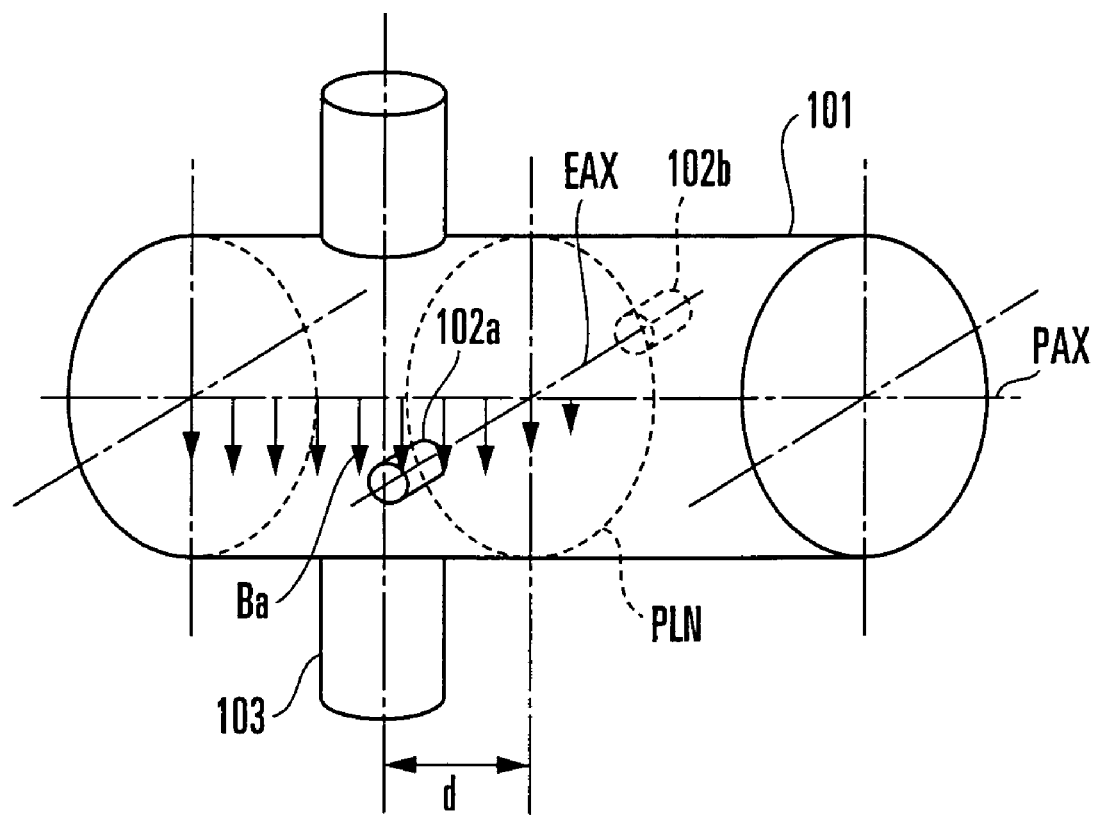
FIG. 36 is a block diagram for explaining the principle of a conventional electromagnetic flowmeter.

First of all, in the first arrangement shown in FIG. 36, when an exciting current with the angular frequency $\omega 0$ is supplied to the exciting coil 3, the electromotive force detected by the electrodes $2a$ and $2b$ corresponds to the resultant vector Va10+Vb10 of the vector Va10 of the $\partial A/\partial t$ component given by equation (81) and the vector Vb10 of the v×B component given by equation (82).

$$Va10 = Ka \cdot B1c \cdot Cg \cdot \omega 0 \tag{81}$$

$$Vb10 = Kb \cdot B1c \cdot Cf \cdot V \tag{82}$$

In consideration of the fact that a $\partial A/\partial t$ component is a vector irrelevant to the magnitude V of the flow velocity and a v×B component is a vector which changes in magnitude in proportion to the magnitude V of the flow velocity, taking the difference between a resultant vector obtained with an exciting angular frequency $\omega 2$ different from $\omega 0$ and a resultant vector obtained with the exciting angular frequency $\omega 0$ cancels out the v×B component. As a consequence, the $\partial A/\partial t$ component is left.

A v×B component Vb12 obtained with the exciting angular frequency ω2 is equal to the right side of equation (82). A ∂A/∂t component Va12 obtained with the exciting angular frequency 2 is given by the equation obtained by replacing·ω0 with 2 in equation (81) as follows:

$$Va12 = Ka \cdot B1c \cdot Cg \cdot \omega 2 \tag{83}$$

Subtracting the resultant vector obtained with the exciting angular frequency ω2 from the resultant vector obtained with the exciting angular frequency ω0 cancels out the v×B component. The value obtained by multiplying this difference by ω0/(ω0−ω2) becomes equal to Va10. The ∂A/∂t component Va10 in the resultant vector Va10+Vb10 can therefore be extracted by using the output difference between different frequency components. A v×B component as a span correction target is Vb10 or Vb12.

In the second arrangement shown in FIG. 1, as described above, keeping the phase difference between the magnetic field generated from the first exciting coil 3a and the magnetic field generated from the second exciting coil 3b at almost p makes it possible to efficiently extract a ∂A/∂t component. Assume that the first exciting current having the angular frequency ω0 is supplied to the first exciting coil 3a, and the second exciting current having the angular frequency ω0 with a phase difference Δθ2+p with respect to the first exciting current is supplied to the second exciting coil 3b. In this case, letting Vas0R be the ∂A/∂t component Va10+Va20R of equation (55) and Vbs0R be the v×B component Vb10+Vb20R of equation (56), the electromotive force detected by the electrodes 2a and 2b corresponds to a resultant vector Vas0R+Vbs0R given below:

$$Vas0R = Ka \cdot (B1c+B2c) \cdot Cg \cdot \omega 0 \tag{84}$$

$$Vbs0R = Kb \cdot (B1c-B2c) \cdot Cf \cdot V \tag{85}$$

As in the first arrangement, a v×B component Vbs2R obtained when the exciting angular frequency is set to ω2 becomes equal to the right side of equation (85). In addition, a ∂A/∂t component Vas2R obtained when the exciting angular frequency is set to ω2 becomes equal to the value obtained by replacing ω0 with ω2 in equation (84) according to the following equation:

$$Vas2R = Ka \cdot (B1c+B2c) \cdot Cg \cdot \omega 2 \tag{86}$$

Subtracting the resultant vector obtained with the exciting angular frequency ω2 from the resultant vector obtained with the exciting angular frequency ω0 cancels out the v×B component. The value obtained by multiplying this difference by ω0/(ω0−ω2) becomes equal to Vas0R. The ∂A/∂t component Vas0R in the resultant vector Vas0R+Vbs0R can therefore be extracted by using the output difference between different frequency components.

Although a v×B component as a span correction target may include Vbs0R or Vbs2R, the value of Vbs0R or Vbs2R may become very small. A v×B component in a state wherein the phase difference between the magnetic field generated from the first exciting coil 3a and the magnetic field generated from the second exciting coil 3b is almost 0 is preferable in terms of efficiency. Assume that the first exciting current having the angular frequency ω0 is supplied to the first exciting coil 3a, and the second exciting current having the angular frequency ω0 with an almost zero phase difference with respect to the first exciting current is supplied to the second exciting coil 3b. In this case, letting Vas0 be a ∂A/∂t component Va10+Va20 and Vbs0 be a v×B component Vb10+Vb20, the electromotive force detected by the electrodes 2a and 2b corresponds to a resultant vector Vas0+Vbs0 given below:

$$Vas0 = Ka \cdot (B1c-B2c) \cdot Cg \cdot \omega 0 \tag{87}$$

$$Vbs0 = Kb \cdot (B1c+B2c) \cdot Cf \cdot V \tag{88}$$

Assume that the first exciting current having the angular frequency ω2 is supplied to the first exciting coil 3a, and the second exciting current having the angular frequency ω2 with an almost zero phase difference with respect to the first exciting current is supplied to the second exciting coil 3b. In this case, letting Vbs2 be a v×B component in the electromotive force detected by the electrodes 2a and 2b, the v×B component Vbs2 becomes equal to the right side of equation (88). In this case, therefore, the v×B component Vbs0 or Vbs2 is preferably handled as a span correction target.

In the third arrangement shown in FIG. 4, the method of extracting a ∂A/∂t component from a resultant vector is the same as that in the second arrangement. The first extraction method described in the case of the second arrangement may be made to correspond to the electromagnetic flowmeter with the third arrangement by replacing the electromotive force originating from the influence of the magnetic field generated from the first exciting coil 3a with the electromotive force detected by the first electrodes 2a and 2b, replacing the electromotive force originating from the influence of the magnetic field generated from the second exciting coil 3b with the electromotive force detected by the second electrodes 2c and 2d, replacing the electromotive force detected in the excitation state ST1 with an electromotive force sum, and replacing the electromotive force detected in the excitation state ST2 with an electromotive force difference.

As in the second arrangement, this makes it possible to extract the ∂A/∂t component Vas0R in the resultant vector Vas0R+Vbs0R by using the output difference between different frequency components. In the case of the third arrangement, the v×B component Vbs0 or Vbs2 in the electromotive force sum is preferably selected as a span correction target.

Second Extraction Method

The second extraction method will be described as an extraction method which can be applied to the second and third arrangements shown in FIGS. 1 and 4 of the three arrangements including the first arrangement shown in FIG. 36, the second arrangement, and the third arrangement. The second extraction method is a method of canceling v×B components by using the phenomenon that v×B components are directed in the same direction on the front and rear sides in the tube axis direction with respect to a plane which includes the exciting coil and is perpendicular to the tube axis direction, but ∂A/∂t components are directed in opposite directions.

In the case of the second arrangement shown in FIG. 1, as described above, keeping the phase difference between the magnetic field generated from the first exciting coil 3a and the magnetic field generated from the second exciting coil 3b at almost p makes it possible to efficiently extract a ∂A/∂t component. The ∂A/∂t component Vas0R is extracted from the resultant vector Vas0R+Vbs0R in the same manner as in the first extraction method. If Vas0R>>Vbs0R, then Vbs0R~0, thus approximately extracting the ∂A/∂t component Vas0R.

In the initial state (at the time of calibration), if the magnetic field B1 generated from the first exciting coil 3a and the magnetic field B2 generated from the second exciting coil 3b are set to be equal in advance, the differences between the magnetic fields B1 and B2 and those in the initial state decrease. As a consequence, the condition represented by the following expression holds.

$$|b1+b2 \cdot \exp(j \cdot \Delta\theta 2)| \gg |b1-b2 \cdot \exp(j \cdot \Delta\theta 2)| \tag{89}$$

Since $rkg \cdot \omega 0 > rkf \cdot V$ holds, the following condition holds for the inter-electrode electromotive force E20R given by equation (46) in consideration of the condition represented by equation (87).

$$|rkg \cdot \omega 0 \cdot \{b1 + b2 \cdot \exp(j \cdot \Delta\theta 2)\}| \gg \tag{90}$$
$$|rkf \cdot V \cdot \{b1 - b2 \cdot \exp(j \cdot \Delta\theta 2)\}|$$

Letting Vas0R' be the electromotive force obtained by approximating the inter-electrode electromotive force E20R given by equation (46) by using the condition represented by expression (90), the inter-electrode electromotive force Vas0R' is represented by $$Vas0R' \sim Vas0R + Vbs0R \tag{91}$$

$$Vas0R' = rkg \cdot \exp\{j \cdot (\theta 1 + \theta g)\} \cdot \omega 0 \cdot \exp(j \cdot \pi/2) \cdot \tag{92}$$
$$\{b1 + b2 \cdot \exp(j \cdot \Delta\theta 2)\}$$
$$= Vas0R$$

Obviously, therefore, using the phase difference between the magnetic field generated from the first exciting coil 3a and the magnetic field generated from the second exciting coil 3b makes it possible to extract the ∂A/∂t component Vas0R in the resultant vector Vas0R+Vbs0R.

Although Vbs0R may be used as a v×B component as a span correction target, the value of Vbs0R may be very small. For this reason, a v×B component in a state wherein the phase difference between the magnetic field generated from the first exciting coil 3a and the magnetic field generated from the second exciting coil 3b is almost 0 is preferable in terms of efficiency. Assume that the first exciting current having the angular frequency ω0 is supplied to the first exciting coil 3a, and the second exciting current having the angular frequency ω0 with an almost zero phase difference with respect to the first exciting current is supplied to the second exciting coil 3b. In this case, the electromotive force detected by the electrodes 2a and 2b corresponds to the resultant vector Vas0+Vbs0 of the ∂A/∂t component represented by equation (87) and the v×B component Vbs0 represented by equation (88). In this case, therefore, the v×B component Vbs0 is preferably handled as a span correction target.

In the case of the third arrangement shown in FIG. 4, the method of extracting a ∂A/∂t component from a resultant vector is the same as that in the case of the second arrangement. To make the second extraction method described in the case of the second arrangement correspond to the electromagnetic flowmeter with the third arrangement, the electromotive force originating from the influence of the magnetic field generated from the first exciting coil 3a is replaced with the electromotive force detected by the first electrodes 2a and 2b, the electromotive force originating from the influence of the magnetic field generated from the second exciting coil 3b is replaced with the electromotive force detected by the second electrodes 2c and 2d, the electromotive force detected in the excitation state ST1 is replaced with an electromotive force sum, and the electromotive force detected in the excitation state ST2 is replaced with an electromotive force difference.

As in the second arrangement, this makes it possible to extract the ∂A/∂t component Vas0R in the resultant vector Vas0R+Vbs0R by using the electromotive force difference. In the case of the third arrangement, the v×B component Vbs0 in the electromotive force sum is preferably selected as a span correction target.

Parameter Extraction Method

A method of extracting a parameter (a characteristic or state of a fluid) other than a flow rate from an extracted ∂A/∂t component will be described next.

The ∂A/∂t component extracted by the first arrangement shown in FIG. 36 is represented by Va10 represented by equation (36). The ∂A/∂t component extracted by the second arrangement shown in FIG. 1 is represented by Vas0R represented by equation (84). A variation component which changes depending on a parameter in equations (36) and (84) is represented by $Cg=rkg \cdot \exp(j \cdot \theta g)$.

The variation component Cg, the magnitude rkg of the variation component Cg, and the angle θg of the variation component Cg with respect to the real axis are rewritten to equation (93) by expressing them in the form of functions like Cg[p], rkg[p], and θg[p] as the functions of a parameter p, and the ∂A/∂t components Va10 and Vas0R are respectively rewritten to equations (94) and (95).

$$Cg[p]=rkg[p] \cdot \exp(j \cdot \theta g[p]) \tag{93}$$

$$Va10=Ka \cdot B1c \cdot Cg[p] \cdot \omega 0 \tag{94}$$

$$Vas0R=Ka \cdot (B1c+B2c) \cdot Cg[p] \cdot \omega 0 \tag{95}$$

Since the extracted ∂A/∂t component is irrelevant to the magnitude V of the flow velocity, a state of the fluid or a state in the measuring tube, other than the flow velocity, can be measured by using the ∂A/∂t component. Since it is possible to extract the parameter p in either of the ∂A/∂t components Va10 and Vas0R by the same method as described above, a case wherein the parameter p is extracted from the ∂A/∂t component Vas0R will be exemplified.

According to equation (95), the variation component Cg[p] which changes depending on the parameter p is expressed by $$Cg[p]=Vas0R/\{Ka \cdot (B1c+B2c) \cdot \omega 0\} \tag{96}$$

In this case, when a magnetic field whose amplitude or phase does not vary is to be generated by using a proper exciting coil, terms B1c and B2c associated with the magnetic field in a ∂A/∂t component become values which can be checked at the time of calibration, and the magnitude of $Vas0R/\{Ka \cdot (B1c+B2c) \cdot \omega 0\}$ and the angle of $Vas0R/\{Ka \cdot (B1c+B2c) \cdot \omega 0\}$ with respect to the real axis are respectively represented by rkg[p] and θg[p]. Therefore, storing the relationship between the parameter p and the magnitude rkg[p] of the variation component Cg[p] or the relationship between the parameter p and the angle θg[p] of the variation component Cg[p] in advance at the time of calibration makes it possible to obtain the parameter p by calculating the magnitude or phase of $Vas0R/\{Ka \cdot (B1c+B2c) \cdot \omega 0\}$.

Points of Concern Regarding Implementation

Points of concern to be raised at the time of implementation will be described next. In order to obtain the value of the parameter p from the magnitude rkg[p] of the variation component Cg[p] obtained from a measured value, it is necessary to generate a table for inversion in advance. There are two methods of generating a table for inversion, i.e., a method (to be referred to as the first generating method hereinafter) of generating a table by interpolation from a measurement result at the time of calibration, and a method (to be referred to as the second generating method hereinafter) of directly generating a table from a theoretical formula. The magnitude rkg[p] and angle θg[p] of the variation component Cg[p] will be representatively expressed by a function f[p], and inversion and a table will be described.

Figure 7:
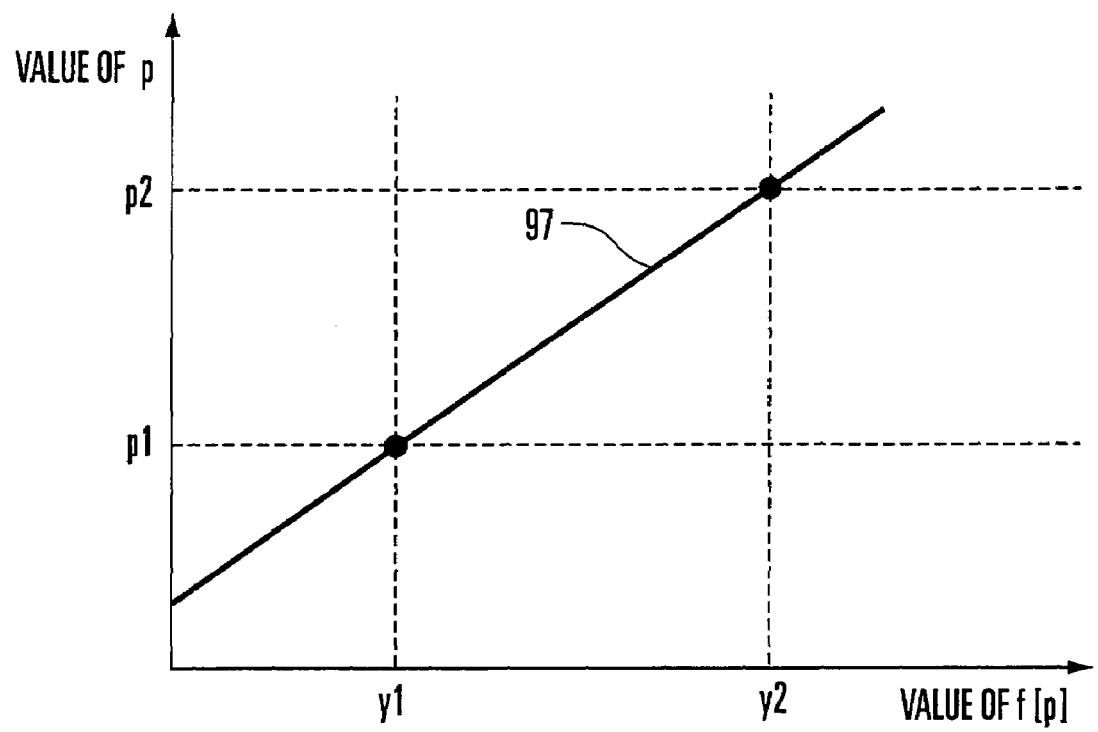
FIG. 7 is a graph for explaining a method of generating a table in the electromagnetic flowmeter of the present invention.

The first generating method for a table for the extraction of the parameter p will be described first. As shown in FIG. 7, assuming that f[p1]=y1 was obtained as a measurement result when the value of the parameter was p1 at the time of calibration, and f[p2]=y2 was obtained as a measurement result when the value of the parameter was p2, the parameter P is represented by the following equation by linear approximation between two points:

$$p=(p2-p1)/(y2-y1)\cdot(f[p]-y1)+p1 \quad (97)$$

A table can be generated by equation (97). Using this table makes it possible to obtain the parameter p from the function f[p] (the magnitude rkg[p] or angle θg[p] of the variation component Cg[p]) obtained at the time of actual measurement after calibration. Although the linear approximation has been exemplified, a polynomial also allows inversion in the same manner as described above.

The second generating method for a table will be described next. If the relationship between the parameter p and y=f[p] is obtained as a theoretical formula at the time of design, and there is an inverse function $f^{-1}(y)$, the parameter p is represented by $$p=f^{-1}(f[p]) \quad (98)$$

Figure 8:
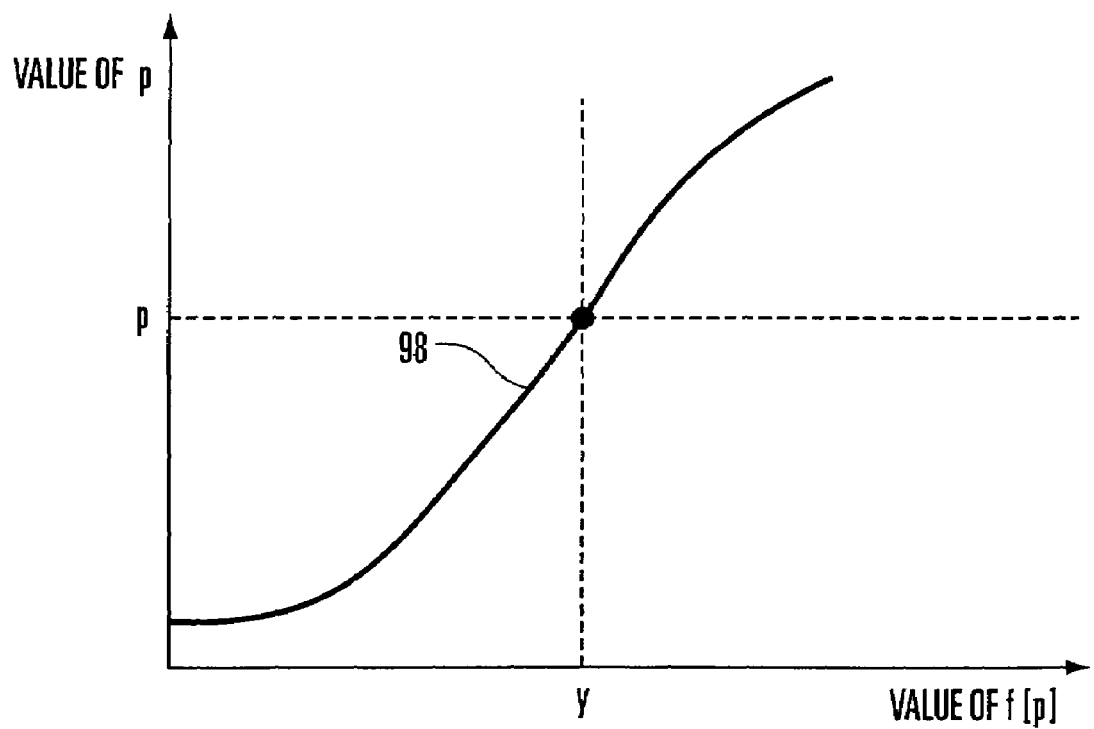
FIG. 8 is a graph for explaining another method of generating a table in the electromagnetic flowmeter of the present invention.

FIG. 8 shows the relationship represented by equation (98). Storing equation (98) as a table in advance makes it possible to obtain the parameter p from the function f[p] obtained at the time of actual measurement after calibration.

Influence of Parameter in v×B Component

The influence of the parameter p in a v×B component will be described next. Assume that as the parameter p changes, both ∂A/∂t component and a v×B component change in different manners, i.e., Cf/Cg is not a constant term. In this case, it is necessary to grasp the relationship between a change in the parameter p and an output in a v×B component as a span correction target.

The v×B component as the span correction target in the first arrangement shown in FIG. 36 is represented by Vb10 represented by equation (37), and the v×B component as the span correction target in the second arrangement shown in FIG. 1 is represented by Vbs0 represented by equation (88). In equations (37) and (88), a variation component which changes depending on the parameter p as a target is represented by Cf=rkf·exp(j·θf).

If the variation component Cf, the magnitude rkf of the variation component Cf, and the angle θf of the variation component Cf with respect to the real axis of are rewritten to equation (99) by expressing them in the form of functions like Cf[p], rkf[p], and θf[p] as the functions of the parameter p, the v×B components Vb10 and Vbs0 are respectively represented by equations (100) and (101).

$$Cf[p]=rkf[p]\cdot\exp(j\cdot\theta f[p]) \quad (99)$$

$$Vb10=Kb\cdot B1c\cdot Cf[p]\cdot V \quad (100)$$

$$Vbs0=Kb\cdot(B1c+B2c)\cdot Cf[p]\cdot V \quad (101)$$

Flow Rate Correction Method

If a parameter which changes is irrelevant to the volume of a fluid, the flow rate of the fluid is obtained by multiplying the flow velocity by the sectional area of the measuring tube. For this reason, at calibration in an initial state, there is a one-to-one relationship between a flow velocity and a flow rate, and hence obtaining a flow velocity amounts to obtaining a flow rate.

When a parameter associated with the volume of a fluid, e.g., the level of the fluid or the amount of air bubbles mixed, it is necessary to consider that the flow velocity of the fluid differs from the flow rate. Letting q be a parameter associated with the volume of the fluid, the sectional area of the fluid can be expressed as S[q] as a function of the parameter q. In addition, a variation component which changes depending on the parameter q can be expressed as Cf[q]. Since the flow rate of a fluid is obtained by multiplying the flow velocity of the fluid by the average sectional area of the fluid (which can be calculated as an average sectional area even if air bubbles are mixed), an equation for a flow velocity can be rewritten to an equation for a flow rate by using relationship Q=S[q]·V between the magnitude V of the fluid, the average sectional area S[q], and a flow rate Q.

If an equation for a flow velocity in the case of the first arrangement shown in FIG. 36 is rewritten to an equation for a flow rate, the v×B component Vb10 represented by equation (100) is represented by $$Vb10=Kb\cdot B1c\cdot Cf[q]/S[q]\cdot Q \quad (102)$$

Cf[q]/S[q] is replaced with Cf2[q] represented by $$Cf2[q]=rkf2[q]\cdot\exp(j\cdot\theta f2[q]) \quad (103)$$

According to equation (103), the v×B component Vb10 can be rewritten as $$Vb10=Kb\cdot B1c\cdot Cf2[q]\cdot Q \quad (104)$$

The relationship between the variation component Cf2[q] and the parameter q which is to be obtained at the time of calibration can be easily obtained with reference to a flow rate. Using a relational expression associated with the flow rate Q makes it possible to use the same formula regardless of whether the parameter q is associated with the volume of the fluid or not. If a parameter q' which is not associated with the volume is selected, i.e., the measuring tube is filled with the fluid, it suffices to perform calculation considering that S[q']=S (S is a constant value), and Cf2[q']=Cf[q']/S. The following description will be made assuming that the parameters which are associated and not associated with the volume of the fluid are collectively referred to as a parameter h.

In the case of the first arrangement shown in FIG. 36, a ∂A/∂t component to be extracted is represented by Va10, and a v×B component as a span correction target is represented by Vb10.

There are two methods for flow rate correction, i.e., a method (to be referred to as the first correction method hereinafter) of performing flow rate correction without normalizing a v×B component, and a method (to be referred to as the second correction method hereinafter) of performing flow rate correction after normalizing a v×B component with a ∂A/∂t component.

According to the first correction method of performing flow rate correction without normalizing a v×B component, the v×B component Vb10 given by equation (104) can be extracted by erasing the ∂A/∂t component Va10 from the resultant vector Va10+Vb10. Since the parameter h can be obtained from the ∂A/∂t component, a variation component Cf2[h] in the v×B component can be obtained from the parameter h.

Referring to equation (104) makes it possible to express a magnitude Q of the flow rate by the following equation according to constant term Kb=1 in the v×B component and variation component Cf2[h]=rkf2[h] exp(j·θf2[h]) associated with a characteristic or state of the fluid.

$$Q = |Vb10/(Kb \cdot B1c \cdot Cf2[h])| \qquad (105)$$
$$= |Vb10|/(|B1c| \cdot rkf2[h])$$

Since the flow rate Q and the term $B1c$ associated with a magnetic field become values which can be checked at the time of calibration, storing the relationship between the parameter h and the magnitude rkf2[h] of the variation component Cf2[h] in advance makes it possible to obtain the magnitude Q of the flow rate from the v×B component Vb10.

According to the second correction method of performing flow rate correction after normalizing the v×B component Vb10 with the ∂A/∂t component Va10 in the first arrangement shown in FIG. 36, the v×B component Vb10 given by equation (104) can be extracted by erasing the ∂A/∂t component Va10 from the resultant vector Va10+Vb10. Assume that a normalized component Vn10 is obtained by normalizing the v×B component vb10 given by equation (104) with the ∂A/∂t component Va10 and multiplying the resultant value by ω0.

The normalized component Vn10 is represented by the following equation according to constant term Ka=exp(j·p/2) in the ∂A/∂t component, constant terminal Kb=1 in the v×B component, and variation component Cf2[h]=rkf2[h]·exp(j·θf2[h]) associated with a characteristic or state of the fluid.

$$Vn10 = (Vb10/Va10) \cdot \omega 0 \qquad (106)$$
$$= (Ka \cdot B1c \cdot Cf2[h] \cdot Q)/(Ka \cdot B1c \cdot Cg[h] \cdot \omega 0) \cdot \omega 0$$
$$= (Kb/Ka) \cdot (Cf2[h]/Cg[h]) \cdot Q$$
$$= (rkf2[h]/rkg[h]) \cdot \exp\{j \cdot (\theta f - \theta g - \pi/2)\} \cdot Q$$

According to equation (106), the magnitude Q of the flow rate is expressed by $$Q = |(Vb10/Va10)|/\{(Cf2[h]/Cg[h]) \cdot (Ka/Kb)\}| \qquad (107)$$
$$= |Vb10/Va10|/(rkf2[h]/rkg[h])$$

Since the flow rate Q becomes a value which can be checked at the time of calibration, storing the relationship between the parameter h and a ratio rkf2[h]/rkg[h] of the variation component in advance makes it possible to obtain the magnitude Q of the flow rate from the normalized component Vn10.

In the case of the second arrangement shown in FIG. 1, a ∂A/∂t component to be extracted is represented by Vas0R, and a v×B component as a span correction target is represented by Vbs0.

Referring to equation (102), the v×B component Vbs0 given by equation (101) is represented by $$Vbs0 = Kb \cdot (B1c + B2c) \cdot Cf[h]/S[h] \cdot Q \qquad (108)$$

Collectively replacing Cf[h]/S[h] with Cf2[h]=rkf2[h]·exp(j·θf2[h]) makes it possible to rewrite the v×B component Vbs0 into $$Vbs0 = Kb \cdot (B1c + B2c) \cdot Cf2[h] \cdot Q \qquad (109)$$

According to the first correction method of performing flow rate correction without normalizing a v×B component, the v×B component Vbs0 given by equation (109) can be extracted by erasing the ∂A/∂t component Vas0 from the resultant vector Vas0+Vbs0. Since the parameter h can be obtained from the ∂A/∂t component, the variation component Cf2[h] in the v×B component can be obtained from the parameter h. In addition, according to constant term Kb=1 in the v×B component and variation component Cf2[h]=rkf2[h]·exp(j·θf2[h]) associated with a characteristic or state of the fluid, the magnitude Q of the flow rate is represented by $$Q = |Vbs0/\{Kb \cdot (B1c + B2c) \cdot Cf2[h]\}| \qquad (110)$$
$$= |Vbs0|/\{|(B1c + B2c)| \cdot rkf2[h]\}$$

Since the flow rate Q and the terms $B1c$ and $B2c$ associated with a magnetic field become values which can be checked at the time of calibration, storing the relationship between the parameter h and the magnitude rkf2[h] of the variation component Cf2[h] in advance makes it possible to obtain the magnitude Q of the flow rate from the v×B component Vbs0.

According to the second correction method of performing flow rate correction after normalizing the v×B component Vbs0 with the ∂A/∂t component Vas0R in the second arrangement shown in FIG. 1, the v×B component Vbs0 given by equation (109) can be extracted by erasing the ∂A/∂t component Vas0 from the resultant vector Vas0+Vbs0. Assume that a normalized component Vns0 is obtained by normalizing the v×B component vbs0 given by equation (109) with the ∂A/∂t component Vas0R and multiplying the resultant value by ω0.

The normalized component Vns0 is represented by the following equation according to constant term Ka=exp(j·p/2) in the ∂A/∂t component, constant terminal Kb=1 in the v×B component, and variation component Cf2[h]=rkf2[h]·exp(j·θf2[h]) associated with a characteristic or state of the fluid.

$$Vns0 = (Vbs0/Vas0R) \cdot \omega 0 \qquad (111)$$
$$= \{Ka \cdot (B1c + B2c) \cdot Cf2[h] \cdot Q\}/$$
$$(Ka \cdot (B1c + B2c) \cdot Cg[h] \cdot \omega 0) \cdot \omega 0$$
$$= (Kb/Ka) \cdot (Cf2[h]/Cg[h]) \cdot Q$$
$$= (rkf2[h]/rkg[h]) \cdot \exp\{j \cdot (\theta f - \theta g - \pi/2)\} \cdot Q$$

According to equation (111), the magnitude Q of the flow rate is expressed by $$Q = |Vns0|/(rkf2[h]/rkg[h]) \qquad (112)$$

Since the flow rate Q becomes a value which can be checked at the time of calibration, storing the relationship between the parameter h and a ratio rkf2[h]/rkg[h] of the variation component in advance makes it possible to obtain the magnitude Q of the flow rate from the normalized component Vns0.

Since the third arrangement shown in FIG. 4 uses the same formula for the flow rate Q as that in the second arrangement, a description thereof will be omitted.

First Embodiment

The first embodiment of the present invention will be described in detail next. This embodiment uses the first arrangement described above. An electromagnetic flowmeter according to this embodiment includes one exciting coil and a pair of electrodes, and has the same arrangement as that of the electromagnetic flowmeter shown in FIG. 36 except for the signal processing system. The principle of this embodiment will therefore be described by using reference numerals in FIG. 36. This embodiment uses the first extraction method as a method of extracting a ∂A/∂t component from a resultant vector, and the first correction method as a flow rate correction method.

When an exciting current with an angular frequency ω0 is supplied to an exciting coil 3, and a parameter h1 is provided, an inter-electrode electromotive force E110 is represented by the following equation according to equations (35), (93), and (99).

$$E110 = rkg[h1] \cdot \omega 0 \cdot b1 \cdot \exp\{j \cdot (\pi/2 + \theta 1 + \theta g[h1])\} + \quad (113)$$
$$rkf[h1] \cdot V \cdot b1 \cdot \exp\{j \cdot (\theta 1 + \theta f[h1])\}$$

When an exciting current with an angular frequency ω2 is supplied to the exciting coil 3, and the parameter h1 is provided, an inter-electrode electromotive force E112 is represented by the following equation according to equations (35), (93), and (99).

$$E112 = rkg[h1] \cdot \omega 2 \cdot b1 \cdot \exp\{j \cdot (\pi/2 + \theta 1 + \theta g[h1])\} + \quad (114)$$
$$rkf[h1] \cdot V \cdot b1 \cdot \exp\{j \cdot (\theta 1 + \theta f[h1])\}$$

Letting EdA1 be the result obtained by obtaining the difference between the inter-electrode electromotive forces E110 and E112 and multiplying the obtained difference by ω0/(ω0−ω2), the electromotive force difference EdA1 is given by $$EdA1 = (E110 - E112) \cdot \omega 0 / (\omega 0 - \omega 2) \quad (115)$$
$$= rkg[h1] \cdot \exp(j \cdot \theta g[h1]) \cdot$$
$$b1 \cdot \omega 0 \cdot \exp\{j \cdot (\pi/2 + \theta 1)\}$$

According to equation (115), it is obvious that a ∂A/∂t component in a resultant vector can be extracted by using the output difference between different frequency components. Equation (115) is irrelevant to a magnitude V of the flow velocity, and hence is only the component generated by ∂A/∂t. Using the electromotive force difference EdA1, therefore, makes it possible to measure a state of the fluid or a state in the measuring tube other than the flow velocity.

A variation component dependent on the parameter h1 in the ∂A/∂t component is represented by Cg[h1]=rkg[h1]·exp (j·θg[h1]), and the remaining portion of the ∂A/∂t component is a constant which is provided at the time of calibration. The variation component Cg[h1] is represented by equation (115).

$$Cg[h1] = EdA1/[b1 \cdot \omega 0 \cdot \exp\{j \cdot (\pi/2 + \theta 1)\}] \quad (116)$$

According to equation (116), a magnitude rkg[h1] of the variation component Cg[h1] and an angle $$rkg[h1] = |EdA1|/(b1 \cdot \omega 0) \quad (117)$$

$$\theta g[h1] = \angle EdA1 - (\pi/2 + \theta 1) \quad (118)$$

The parameter h1 can be obtained from the relationship between the parameter h1 and the variation component Cg[h1], which is checked in advance by measurement or the like at the time of calibration, or the relationship between the parameter h1 and the angle θg[h1] of the variation component Cg[h1]. A span as a coefficient applied to the magnitude V of the flow velocity of the v×B component is corrected by using the obtained parameter h1.

Removing the electromotive force difference EdA1 from the inter-electrode electromotive force E110 makes it possible to extract an electromotive force EvB1 of the v×B component in the inter-electrode electromotive force E110 according to the following equation:

$$EvB1 = E110 - EdA1 \quad (119)$$
$$= rkf[h1] \cdot V \cdot b1 \cdot \exp\{j \cdot (\theta 1 + \theta f[h1])\}$$

The magnitude V of the flow velocity of the fluid to be measured can be expressed by the following equation according to equation (119).

$$V = |Evb1|/(rkf[h1] \cdot b1) \quad (120)$$

When a parameter associated with the volume of a fluid, e.g., the level of the fluid or the amount of air bubbles mixed, is used as the parameter h1, the sectional area of the fluid is represented as a function S[h1] of the parameter h1. At this time, equation (120) is rewritten to an equation for a flow rate Q as follows:

$$Q = |Evb1|/(rkf[h1]/S[h1] \cdot b1) \quad (121)$$

Note that when a parameter irrelevant to the volume of a fluid is used as the parameter h1, the sectional area S[h1] of the fluid is a constant value.

Replacing rkf[h1]/S[h1] with one function rkf2[h1] allows to rewrite equation (121) to the following equation:

$$Q = |Evb1|/(rkf2[h1] \cdot b1) \quad (122)$$

Since the relationship between the parameter h1 and the magnitude rkf2[h1] of a variation component Cf2[h1] can be checked at the time of calibration, the magnitude rkf2[h1] of the variation component Cf2[h1] can be obtained from the value of the parameter h1. That is, a span variation component can be corrected. In addition, since an amplitude b1 of the magnetic field is a known value, the magnitude Q of the flow rate can be obtained from the magnitude of an electromotive force Evb1 of a v×B component.

Figure 9:
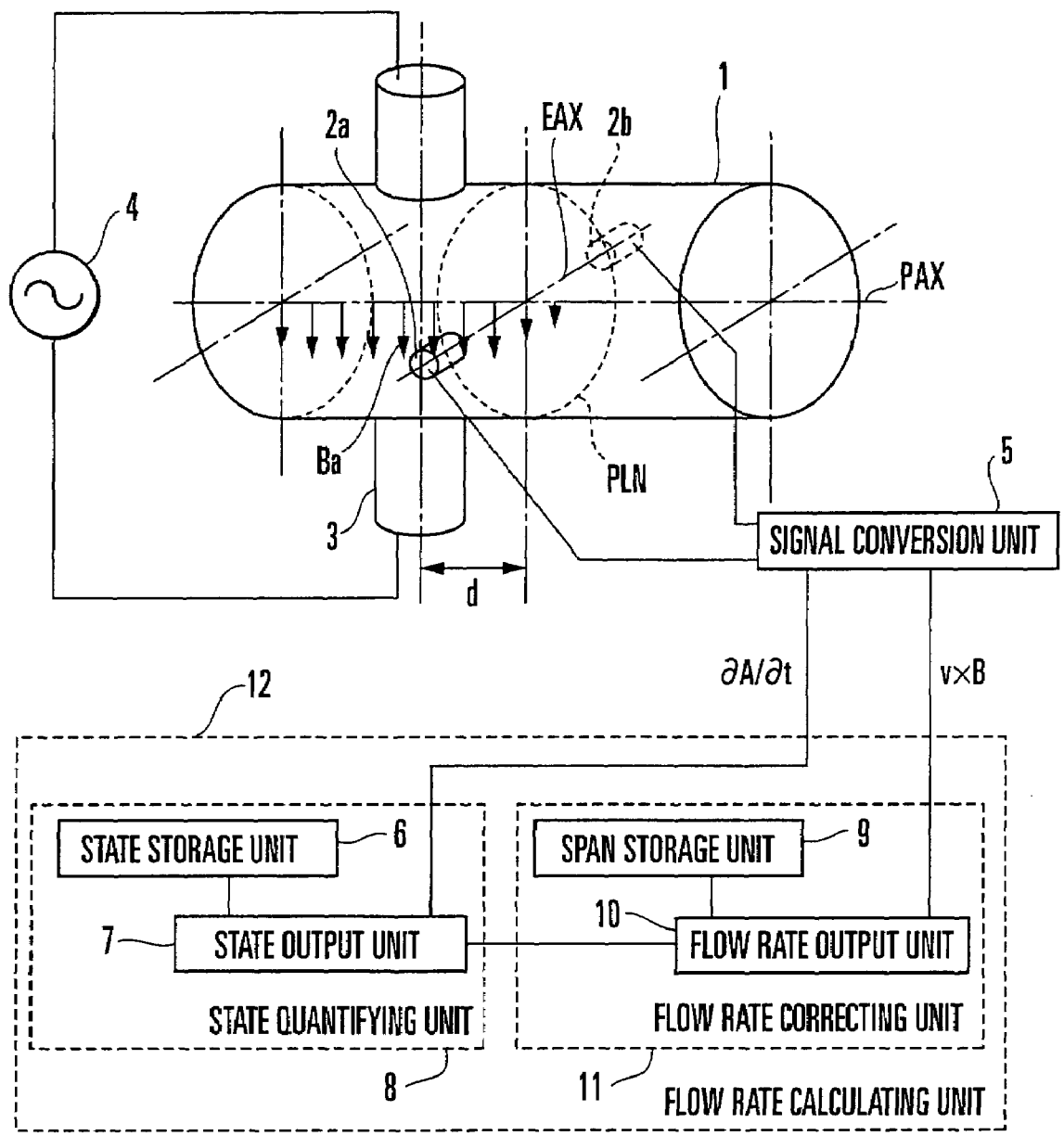
FIG. 9 is a block diagram showing the arrangement of an electromagnetic flowmeter according to the first embodiment of the present invention.

The specific arrangement and operation of the electromagnetic flowmeter according to this embodiment will be described next. FIG. 9 shows the arrangement of the electromagnetic flowmeter according to this embodiment. The same reference numerals as in FIG. 9 denote the same components in FIG. 36. The electromagnetic flowmeter of this embodiment includes a measuring tube 1, electrodes 2a and 2b, the exciting coil 3 placed at a position spaced apart by an offset distance d in the axial direction from a plane PLN which includes the electrodes 2a and 2b and is perpendicular to the direction of a measuring tube axis PAX, a power supply unit 4 which supplies an exciting current to the exciting coil 3, a signal conversion unit 5 which extracts, as a ∂A/∂t component, the electromotive force difference between two frequency components with the first and second frequencies of the resultant electromotive force detected by the electrodes 2a and 2b, and extracts a v×B component by removing the ∂A/∂t component from the first frequency component of the resultant electromotive force, and a flow rate calculating unit 12.

The exciting coil 3 and the power supply unit 4 constitute an exciting unit which applies a time-changing magnetic field asymmetric to the plane PLN to the fluid to be measured.

The flow rate calculating unit 12 comprises a state quantifying unit 8 and a flow rate correcting unit 11. The state quantifying unit 8 includes a state storage unit 6 which stores in advance the relationship between the magnitude or phase of a variation component dependent on a parameter and the parameter, and a state output unit 7 which extracts the magnitude or phase of a variation component dependent on a parameter from an extracted ∂A/∂t component, and obtains a parameter corresponding to the magnitude or phase of the variation component on the basis of the relationship stored in the state storage unit 6. The flow rate correcting unit 11 includes a span storage unit 9 which stores in advance the relationship between a parameter and the magnitude of a span variation component of a v×B component, and a flow rate output unit 10 which obtains the magnitude of a span variation component corresponding to a parameter obtained by the state output unit 7 on the basis of the relationship stored in the span storage unit 9, corrects the span of a v×B component to be corrected, on the basis of the magnitude of the span variation component, and calculates the flow rate of the fluid from the corrected v×B component.

The power supply unit 4 repeats, in a T-sec cycle, the operation of continuing the first excitation state for T1 sec in which an exciting current with a first angular frequency ω0 is supplied to the exciting coil 3 and then continuing the second excitation state for T2 sec in which an exciting current with a second angular frequency ω2 is supplied to the exciting coil 3. That is, T=T1+T2.

Figure 10:
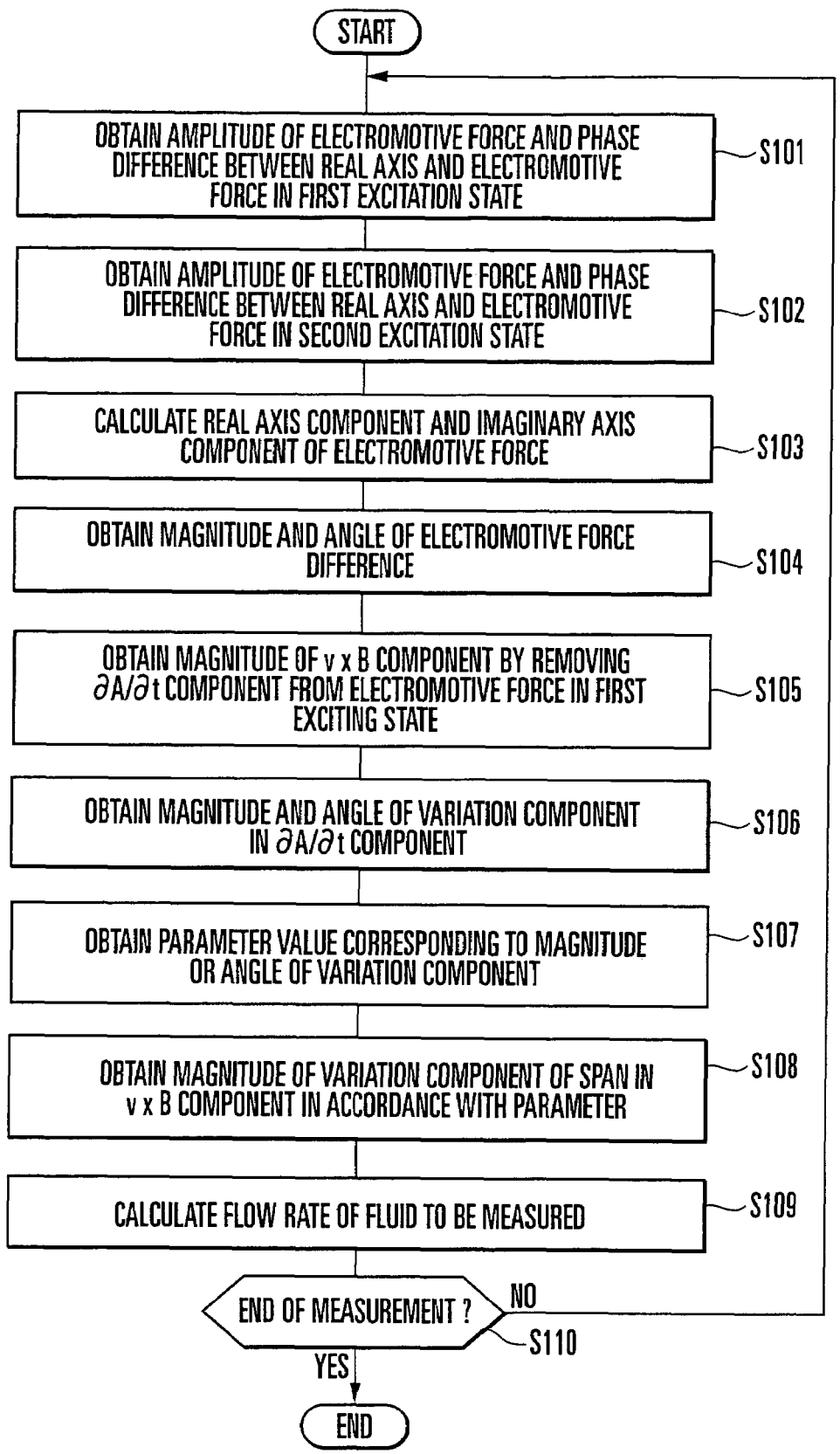
FIG. 10 is a flowchart showing the operations of a signal conversion unit and flow rate calculating unit in the first embodiment of the present invention.

FIG. 10 shows the operations of the signal conversion unit 5 and flow rate calculating unit 12. First of all, the signal conversion unit 5 obtains an amplitude r110 of the electromotive force E110 of a component with the angular frequency ω0 of the electromotive force between the electrodes 2a and 2b, and also obtains a phase difference p110 between the real axis and the electromotive force E110 by using a phase detector (not shown) (step S101 in FIG. 10).

Subsequently, in the second excitation state, the signal conversion unit 5 obtains an amplitude r112 of the electromotive force E112 of a component with the angular frequency ω2 of the electromotive force between the electrodes 2a and 2b, and also obtains a phase difference p112 between the real axis and the electromotive force E112 by using the phase detector (step S102).

The signal conversion unit 5 then calculates a real axis component E110x and imaginary axis component E110y of the inter-electrode electromotive force E110, and a real axis component E112x and imaginary axis component E112y of the inter-electrode electromotive force E112 according to the following equations (step S103):

$$E110x = r110 \cdot \cos(\phi 110) \tag{123}$$

$$E110y = r110 \cdot \sin(\phi 110) \tag{124}$$

$$E112x = r112 \cdot \cos(\phi 112) \tag{125}$$

$$E112x = r112 \cdot \sin(\phi 112) \tag{126}$$

After the calculation of equations (123) to (126), the signal conversion unit 5 obtains the magnitude and angle of the electromotive force difference EdA1 between the inter-electrode electromotive forces E110 and E112 (step S104). The processing in step S104 corresponds to the processing of obtaining a ∂A/∂t component, and is equivalent to the calculation of equation (115). The signal conversion unit 5 calculates a magnitude |EdA1| of the electromotive force difference EdA1 according to the following equation:

$$|EdA1| = \{(E110x - E112x)^2 + (E110y - E112y)^2\}^{1/2} \cdot \omega 0 / (\omega 0 - \omega 2) \tag{127}$$

The signal conversion unit 5 then calculates an angle ∠EdA1 of the electromotive force difference EdA1 with respect to the real axis according to the following equation:

$$\angle EdA1 = \tan^{-1}\{(E110y - E112y)/(E110x - E112x)\} \tag{128}$$

The signal conversion unit 5 then calculates a real axis component EdA1x and imaginary axis component EdA1y of the electromotive force difference EdA1 according to the following equations:

$$EdA1x = |EdA1| \cdot \cos(\angle EdA1) \tag{129}$$

$$EdA1y = |EdA1| \cdot \sin(\angle EdA1) \tag{130}$$

With the above operation, the processing in step S104 is complete.

Subsequently, the signal conversion unit 5 obtains an electromotive force EvB1 of the v×B component in the electromotive force E110 by removing a ∂A/∂t component (electromotive force difference EdA1) from the electromotive force E110 (step S105). The processing in step S105 is equivalent to the calculation of equation (119). The signal conversion unit 5 calculates a magnitude |EvB1| of the electromotive force EvB1 based on a v×B component according to the following equation:

$$|EvB1| = \{(E110x - EdA1x)^2 + (E110y - EdA1y)^2\}^{1/2} \tag{131}$$

The state output unit 7 then extracts the magnitude rkg[h1] of the variation component Cg[h1] dependent on the parameter h1 and the angle θg[h1] with respect to the real axis from the electromotive force difference EdA1 according to the following equations (step S106):

$$rkg[h1] = |EdA1|/(b1 \cdot \omega 0) \tag{132}$$

$$\theta g[h1] = \angle EdA1 - (\pi/2 + \theta 1) \tag{133}$$

The amplitude b1 of the magnetic field B1 generated from the exciting coil 3 and the phase difference θ1 between the magnetic field B1 and ω0·t are constants which can be obtained in advance by calibration or the like.

The relationship between the parameter h1 and the magnitude rkg[h1] of the variation component Cg[h1] in the ∂A/∂t component or the relationship between the parameter h1 and the angle θg[h1] of the variation component Cg[h1] is registered in advance in the state storage unit 6 in the form of a mathematical expression or table. The relationship between h1 and rkg[h1] or between h1 and θg[h1] can be obtained at the time of calibration.

The state output unit 7 calculates the value of the parameter h1 corresponding to rkg[h1] or θg[h1] by referring to the state storage unit 6 on the basis of the magnitude rkg[h1] or angle θg[h1] of the variation component Cg[h1] extracted in step S106 or acquires it from the state storage unit 6 (step S107).

The relationship between the parameter h1 and the magnitude rkf2[h1] of the variation component Cf2[h1] in the v×B component is registered in advance in the span storage unit 9 in the form of a mathematical expression or table. The relationship between h1 and rkf2[h1] can be obtained at the time of calibration.

The flow rate output unit 10 calculates the magnitude rkf2[h1] of the variation component Cf2[h1] corresponding to the parameter h1 by referring to the span storage unit 9 on the basis of the parameter h1 obtained by the state output unit 7 or acquires it from the span storage unit 9 (step S108).

Finally, the flow rate output unit 10 calculates the magnitude Q of the flow rate of the fluid to be measured according to the following equation (step S109):

$$Q = |Evb1|/(rkf2[h1] \cdot b1) \tag{134}$$

The flow rate calculating unit 12 performs the processing in steps S101 to S109 described above in a cycle T until, for example, the operator designates the end of the measurement (YES in step S110). Note that the processing in steps S102 to S110 is performed in the second excitation state for a duration of T2 sec.

As described above, this embodiment is configured to extract the electromotive force difference EdA1 (the ∂A/∂t component) from the inter-electrode electromotive forces E110 and E112 in the two excitation states with different exciting frequencies, extract the electromotive force EvB1 (the v×B component) by removing the electromotive force difference EdA1 from the inter-electrode electromotive force E110, extract the magnitude or phase of the variation component Cg[h1] dependent on the parameter h1 from the electromotive force difference EdA1, obtain the parameter h1 corresponding to the magnitude or phase of the variation component Cg[h1], and obtain the magnitude of the span variation component Cf2[h1] of the v×B component corresponding to the parameter h1, thereby correcting the span of the v×B component on the basis of the magnitude of the variation component Cf2[h1] of the span and calculating the flow rate of the fluid. Even if, therefore, the ratio of Cf2[h1]/Cg[h1] is not constant or the parameter h1 varies, the parameter h1 can be accurately detected regardless of the flow velocity of the fluid, and the flow rate of the fluid is corrected. This makes it possible to measure a flow rate with high accuracy.

Figure 11:
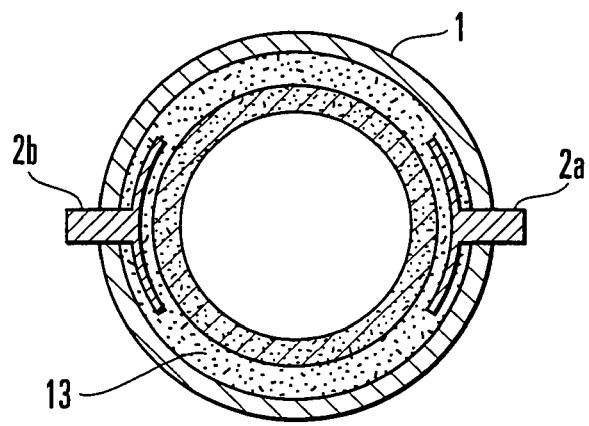
FIG. 11 is a sectional view showing an example of an electrode used in the electromagnetic flowmeter according to the first embodiment of the present invention.
Figure 12:
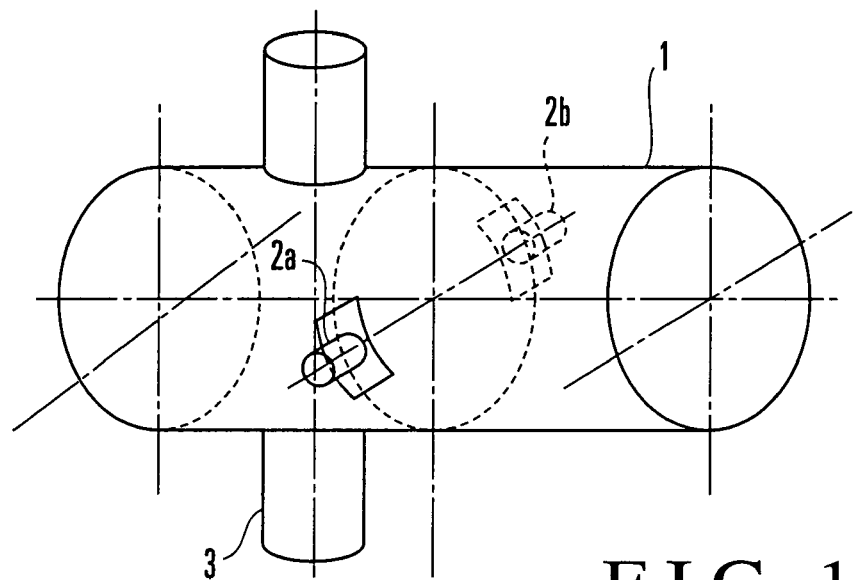
FIG. 12 is a perspective view showing an example of an electrode used in the electromagnetic flowmeter according to the first embodiment of the present invention.

The following description will explain a specific example of the electromagnetic flowmeter of this embodiment which corrects the flow rate of a fluid on the basis of the deposited state of a substance in the measuring tube with the deposited state (a change in the inner diameter of the measuring tube) being the parameter h1. As shown in FIGS. 11 and 12, this example uses capacitive coupling type electrodes which do not come into contact with a fluid to be measured in consideration of the deposition of a substance in the measuring tube 1. When the electrodes 2a and 2b are of the capacitive coupling type, they are coated with a lining 13 made of ceramic, Teflon, or the like formed on the inner wall of the measuring tube 1.

Figure 13:
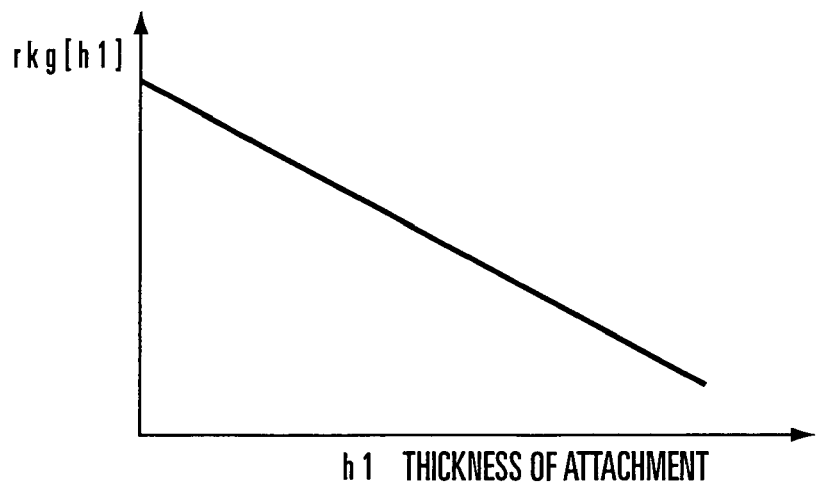
FIG. 13 is a graph showing an example of the relationship between the thickness of a substance adhering to the inside of a measuring tube and the magnitude of a variation component in a ∂A/∂t component in the first embodiment of the present invention.

As shown in FIG. 11, as a substance 15 is deposited on the inner wall of the measuring tube 1, the inner diameter of the measuring tube 1 changes, and the value of the magnitude rkg[h1] of the variation component Cg[h1] varies. FIG. 13 shows an example of the relationship between the thickness (parameter h1) of the substance 15 and the magnitude rkg[h1] of the variation component Cg[h1]. Obtaining this relationship by a theoretical formula at the time of design or by measurement at the time of calibration and storing it in the state storage unit 6 in advance can obtain the thickness of the substance 15 in step S107 on the basis of the magnitude rkg[h1] of the variation component Cg[h1] obtained in step S106 in FIG. 10. This makes it possible to correct the flow rate of the fluid in steps S108 and S109 on the basis of the thickness of the substance 15.

Second Embodiment

The second embodiment of the present invention will be described next. This embodiment uses the first arrangement like the first embodiment. The second embodiment uses the first extraction method as a method of extracting a ∂A/∂t component from a resultant vector, and the second correction method as a flow rate correction method. Since the principle of this embodiment is the same as that of the first embodiment up to the point where the parameter h1 is obtained, only the difference after the parameter h1 is obtained will be described.

A normalized electromotive force EvBn1 obtained by normalizing an electromotive force EvB1 of a v×B component with an electromotive force difference EdA1 and multiplying the resultant value by ω0 is represented by the following equation by referring to equation (100).

$$EvBn1 = EvB1/EdA1 \cdot \omega 0 \tag{135}$$
$$= (rkf[h1]/rkg[h1]) \cdot V \cdot$$
$$\exp\{j \cdot (\theta f[h1] - \theta g[h1] - \pi/2)\}$$

The reason why the result obtained by normalizing the electromotive force EvB1 of the v×B component with the electromotive force difference EdA1 is multiplied by ω0 is to erase the exciting angular frequency ω0 from coefficients applied to a magnitude V of the flow velocity.

According to equation (135), the magnitude V of the flow velocity of the fluid to be measured can be represented by $$V = |Evbn1|/(rkf[h1]/rkg[h1]) \tag{136}$$

When a parameter associated with the volume of the fluid to be measured is used as h1, the sectional area of the fluid to be measured is represented as a function S[h1] of the parameter h1. At this time, equation (136) is rewritten to an equation for a flow rate as follows:

$$Q = |Evbn1|/\{(rkf[h1]/S[h1])/rkg[h1]\} \tag{137}$$

Replacing rkf[h1]/S[h1] with one function rkf2[h1] makes it possible to rewrite equation (137) to the following equation:

$$Q = |Evbn1|/(rkf2[h1]/rkg[h1]) \tag{138}$$

Since the relationship between the parameter h1 and a ratio rkf2[h1]/rkg[h1] of a variation component can be checked at the time of calibration, the value of the ratio rkf2[h1]/rkg[h1] of the variation component can be obtained from the value of the parameter h1. That is, the variation component of the span is corrected, and a magnitude Q of the flow rate can be obtained from the magnitude of an electromotive force EvBn1 of the v×B component.

Figure 14:
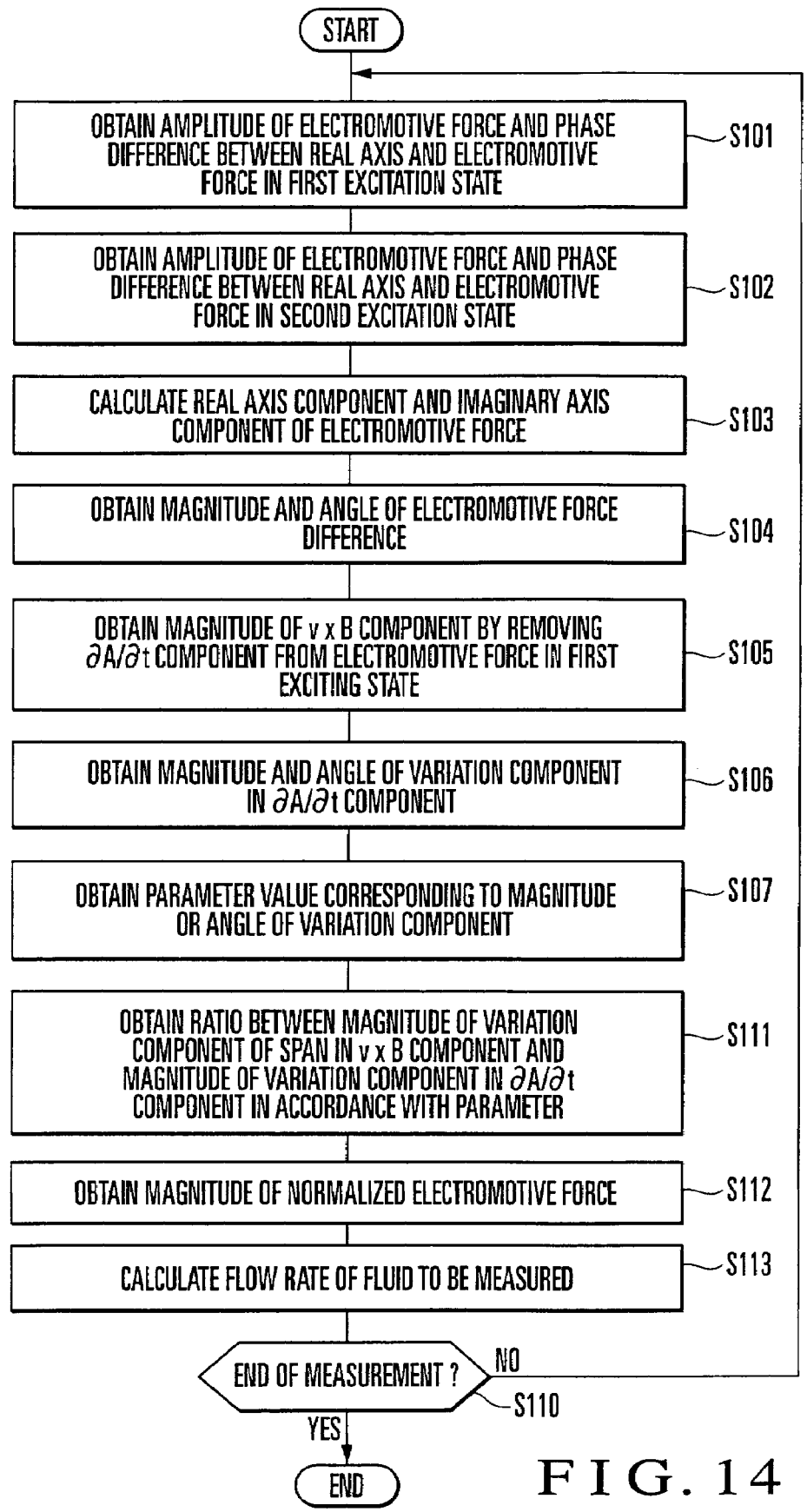
FIG. 14 is a flowchart showing the operations of a signal conversion unit and flow rate calculating unit in the second embodiment of the present invention.

A specific arrangement and operation of the electromagnetic flowmeter of this embodiment will be described next. The arrangement of the electromagnetic flowmeter of this embodiment is the same as in the first embodiment, and hence will be described with reference to the reference numerals in FIG. 9. The operation of a power supply unit 4 is the same as that in the first embodiment. FIG. 14 shows the operations of a signal conversion unit 5 and flow rate calculating unit 12 according to this embodiment. The same reference numerals as in FIG. 14 denote the same processes in FIG. 10.

The processing in steps S101 to S107 is the same as that in the first embodiment. The relationship between the parameter h1 and the ratio rkf2[h1]/rkg[h1] of a variation component is registered in advance in a span storage unit 9 in the form of a mathematical expression or table. The relationship between h1 and rkf2[h1]/rkg[h1] can be obtained at the time of calibration.

A flow rate output unit 10 calculates the ratio rkf2[h1]/rkg[h1] of the variation component corresponding to the parameter h1 by referring to the span storage unit 9 on the basis of the parameter h1 obtained by a state output unit 7 or acquires it from the span storage unit 9 (step S111).

The signal conversion unit 5 obtains a magnitude |EvBn1| of the normalized electromotive force EvBn1 obtained by normalizing the electromotive force EvB1 of the v×B component with the electromotive force difference EdA1 according to the following equation (step S112). The processing in step S112 is equivalent to the calculation of equation (135).

$$|EvBn1|=|EvB1|/|EdA1|\cdot\omega 0 \quad (139)$$

Finally, the flow rate output unit 10 calculates the magnitude Q of the flow rate of the fluid to be measured according to the following equation (step S113):

$$Q=|Evbn1|/(rkf2[h1]/rkg[h1]) \quad (140)$$

The flow rate calculating unit 12 performs the processing in steps S101 to S107 and S111 to S113 described above in a cycle T until, for example, the operator designates the end of the measurement (YES in step S110). Note that the processing in steps S102 to S107, S111 to S113, and S110 is performed in the second excitation state for a duration of T2 sec.

In the above manner, this embodiment can obtain the same effects as those of the first embodiment.

This embodiment is configured to directly obtain the value of the ratio rkf2[h1]/rkg[h1] of the variation component corresponding to the parameter h1. However, it suffices to register the relationship between the parameter h1 and the magnitude rkg[h1] of the variation component Cg[h1] and the relationship between the parameter h1 and the magnitude rkf2[h1] of the variation component Cf2[h1] in the span storage unit 9 in advance, obtain the values of rkg[h1] and rkf2[h1] corresponding to the parameter h1 by referring to the span storage unit 9, and obtain the ratio rkf2[h1]/rkg[h1] of the variation component from the obtained values.

Note that the first and second embodiments having a plurality of exciting coils provided on the same side as the exciting coil 3 with respect to the plane PLN perpendicular to the direction of the measuring tube axis PAX are redundant examples of the first and second embodiments. In addition, the first and second embodiments having a plurality of electrodes on the same side as that of the electrodes 2a and 2b with respect to the plane perpendicular to the direction of the measuring tube axis PAX are redundant examples of the first and second embodiments.

In addition, the first and second embodiments have exemplified the case wherein the exciting angular frequency is switched to ω0 or ω2. However, performing excitation using exciting currents containing components with the angular frequencies ω0 and ω2 makes it unnecessary to switch the exciting frequencies. This can calculate the magnitude of the flow rate Q at higher speed. For example, it suffices to use the magnetic field represented by the following equation instead of equation (21).

$$B1=b1\cdot\cos(\omega 0\cdot t-\theta 1)+b1\cdot\cos(\omega 2\cdot t-\theta 1) \quad (141)$$

In the first and second embodiments, it suffices to extract either the magnitude rkg[h1] or angle θg[h1] of the variation component Cg[h1] from the electromotive force difference EdA1. However, the parameter h1 can be obtained by extracting both the magnitude and angle of the component. In this case, it suffices to select either the magnitude rkg[h1] or the angle θg[h1] which has a higher sensitivity and obtain the parameter h1 on the basis of the selected magnitude or angle. This makes it possible to improve the detection sensitivity.

Third Embodiment

The third embodiment of the present invention will be described next. This embodiment uses the second arrangement described above. An electromagnetic flowmeter according to this embodiment includes two exciting coils and a pair of electrodes, and has the same arrangement as that of the electromagnetic flowmeter shown in FIG. 1 except for the signal processing system. The principle of this embodiment will therefore be described by using reference numerals in FIG. 1. This embodiment uses the first extraction method as a method of extracting a ∂A/∂t component from a resultant vector, and the first correction method as a flow rate correction method.

Assume that the first exciting current having an angular frequency ω0 is supplied to a first exciting coil 3a, the second exciting current having the angular frequency ω0 with a phase difference Δθ2 with respect to the first exciting current is supplied to a second exciting coil 3b (i.e., an excitation state ST1), and a parameter h2 is provided. In this case, an inter-electrode electromotive force E220 is represented by the following equation according to equations (45), (93), and (99).

$$E220 = rkg[h2]\cdot\exp\{j\cdot(\theta 1 + \theta g[h2])\}\cdot \quad (142)$$
$$\exp(j\cdot\pi/2)\cdot\{b1-b2\cdot\exp(j\cdot\Delta\theta 2)\}\cdot\omega 0 +$$
$$rkf[h2]\cdot\exp(j\cdot(\theta 1 + \theta f[h2]))\cdot\{b1+b2\cdot\exp(j\cdot\Delta\theta 2)\}\cdot V$$

Assume that the first exciting current having an angular frequency ω2 is supplied to the first exciting coil 3a, the second exciting current having the angular frequency ω2 with the phase difference Δθ2 with respect to the first exciting current is supplied to the second exciting coil 3b (the excitation state ST1), and the parameter h2 is provided. In this case, an inter-electrode electromotive force E222 is represented by the following equation according to equations (45), (93), and (99).

$$E222 = rkg[h2] \cdot \exp\{j \cdot (\theta 1 + \theta g[h2])\} \cdot \qquad (143)$$
$$\exp(j \cdot \pi/2) \cdot \{b1 - b2 \cdot \exp(j \cdot \Delta\theta 2)\} \cdot \omega 2 +$$
$$rkf[h2] \cdot \exp\{j \cdot (\theta 1 + \theta f[h2])\} \cdot \{b1 + b2 \cdot \exp(j \cdot \Delta\theta 2)\} \cdot V$$

Assume that the first exciting current having the angular frequency $\omega 0$ is supplied to the first exciting coil 3a, the second exciting current having the angular frequency $\omega 0$ with a phase difference $\Delta\theta 2 + p$ with respect to the first exciting current is supplied to the second exciting coil 3b (i.e., an excitation state ST2), and the parameter h2 is provided. In this case, an inter-electrode electromotive force E220R is represented by the following equation according to equations (46), (93), and (99).

$$E220R = rkg[h2] \cdot \exp\{j \cdot (\theta 1 + \theta g[h2])\} \cdot \qquad (144)$$
$$\exp(j \cdot \pi/2) \cdot \{b1 + b2 \cdot \exp(j \cdot \Delta\theta 2)\} \cdot \omega 0 +$$
$$rkf[h2] \cdot \exp\{j \cdot (\theta 1 + \theta f[h2])\} \cdot$$
$$\{b1 - b2 \cdot \exp(j \cdot \Delta\theta 2)\} \cdot V$$

Assume that the first exciting current having the angular frequency $\omega 2$ is supplied to the first exciting coil 3a, the second exciting current having the angular frequency $\omega 2$ with a phase difference 8θ2+p with respect to the first exciting current is supplied to the second exciting coil 3b (the excitation state ST2), and the parameter h2 is provided. In this case, an inter-electrode electromotive force E222R is represented by the following equation according to equations (46), (93), and (99).

$$E222R = rkg[h2] \cdot \exp\{j \cdot (\theta 1 + \theta g[h2])\} \cdot \qquad (145)$$
$$\exp(j \cdot \pi/2) \cdot \{b1 + b2 \cdot \exp(j \cdot \Delta\theta 2)\} \cdot \omega 2 +$$
$$rkf[h2] \cdot \exp\{j \cdot (\theta 1 + \theta f[h2])\} \cdot$$
$$\{b1 - b2 \cdot \exp(j \cdot \Delta\theta 2)\} \cdot V$$

In this case, if a distance d1 from a plane PLN, which is perpendicular to a measuring tube axis PAX and includes electrodes 2a and 2b, to the first exciting coil 3a is almost equal to a distance d2 from the plane PLN to a second exciting coil 3b (d1~d2), then b1~b2 and $\Delta\theta 2$~0. In this case, equations (142) to (145) are rewritten as follows:

$$E220 \sim rkf[h2] \cdot \exp\{j \cdot (\theta 1 + \theta f[h2])\} \cdot (2 \cdot b1 \cdot V) \qquad (146)$$
$$E222 \sim rkf[h2] \cdot \exp\{j \cdot (\theta 1 + \theta f[h2])\} \cdot (2 \cdot b1 \cdot V) \qquad (147)$$
$$E220R \sim rkg[h2] \cdot \exp\{j \cdot (\theta 1 + \theta g[h2])\} \cdot \exp(j \cdot \pi/2) \cdot \{2 \cdot b1 \cdot \omega 0\} \qquad (148)$$
$$E222R \sim rkg[h2] \cdot \exp\{j \cdot (\theta 1 + \theta g[h2])\} \cdot \exp(j \cdot \pi/2) \cdot \{2 \cdot b1 \cdot \omega 2\} \qquad (149)$$

That is, since the inter-electrode electromotive forces E220 and E222 are almost only the electromotive forces based on the v×B components, and the inter-electrode electromotive forces E220R and E222R are almost only the electromotive forces based on the $\partial A/\partial t$ components, computation errors in the extraction of a $\partial A/\partial t$ component and a v×B component can be reduced. This point is a difference in terms of technical significance between the first and second embodiments. Note, however, that the subsequent theoretical development will be made assuming that b1≠b2 and $\Delta\theta 2 \neq 0$.

Letting EdA21 be the result obtained by obtaining the difference between the inter-electrode electromotive forces E220R and E222R and multiplying the obtained difference by $\omega 0/(\omega 0 - \omega 2)$, the electromotive force difference EdA21 is given by $$EdA21 = (E220R - E222R) \cdot \omega 0 / (\omega 0 - \omega 2) \qquad (150)$$
$$= rkg[h2] \cdot \exp(j \cdot \theta g[h2]) \cdot$$
$$\exp\{j \cdot (\pi/2 + \theta 1)\} \cdot$$
$$\{b1 + b2 \cdot \exp(j \cdot \Delta\theta 2)\} \cdot \omega 0$$

According to equation (150), it is obvious that a $\partial A/\partial t$ component in a resultant vector can be extracted by using the output difference between different frequency components. Equation (150) is irrelevant to a magnitude V of the flow velocity, and hence is only the component generated by $\partial A/\partial t$. Using the electromotive force difference EdA21, therefore, makes it possible to measure a state of the fluid or a state in the measuring tube other than the flow velocity.

A variation component dependent on the parameter h2 in the $\partial A/\partial t$ component is represented by Cg[h2]=rkg[h2]·exp (j·θg[h2]), and the remaining portion of the $\partial A/\partial t$ component is a constant which is provided at the time of calibration. The variation component Cg[h2] is represented by the following equation according to equation (144).

$$Cg[h2] = EdA21 / [\exp\{j \cdot (\pi/2 + \theta 1)\} \cdot \qquad (151)$$
$$\{b1 + b2 \cdot \exp(j \cdot \Delta\theta 2)\} \cdot \omega 0]$$

Letting m2b and θ2b be the magnitude and angle of $[\exp\{j \cdot (p/2+\theta 1)\} \cdot \{b1+b2 \cdot \exp(j \cdot \Delta\theta 2)\}]$ in equation (151), m2b and θ2b are represented by $$m2b = \{b1^2 + b2^2 + 2 \cdot b1 \cdot b2 \cdot \cos(\Delta\theta 2)\}^{1/2} \qquad (152)$$
$$\theta 2b = \tan^{-1}[\{b2 \cdot \sin(\Delta\theta 2)\} / \{b1 + b2 \cdot \cos(\Delta\theta 2)\}] + (\pi/2 + \theta 1) \qquad (153)$$

According to equations (151) to (153), the magnitude rkg[h2] of the variation component Cg[h2] and the angle θg[h2] with respect to the real axis are represented by $$rkg[h2] = |EdA21|/(m2b \cdot \omega 0) \qquad (154)$$
$$\theta g[h2] = \angle EdA21 - \theta 2b \qquad (155)$$

The parameter h2 can be obtained from the relationship between the parameter h2 and the variation component Cg[h2], which is checked in advance by measurement or the like at the time of calibration, or the relationship between the parameter h2 and the angle θg[h2] of the variation component Cg[h2]. A span as a coefficient applied to the magnitude V of the flow velocity of the v×B component is corrected by using the obtained parameter h2.

As described above, although the excitation state ST2 is more favorable for the acquisition of the parameter h2 by extracting a ∂A/∂t component, the excitation state ST1 is more favorable for the acquisition of a v×B component.

Letting EdA22 be the result obtained by obtaining the difference between the inter-electrode electromotive forces E220 and E222 and multiplying the obtained difference by ω0/(ω0−ω2), the electromotive force difference EdA22 is given by $$EdA22 = (E220 - E222) \cdot \omega0 / (\omega0 - \omega2) \quad (156)$$
$$= rkg[h2] \cdot \exp(j \cdot \theta g[h2]) \cdot$$
$$\exp\{j \cdot (\pi/2 + \theta1)\} \cdot$$
$$\{b1 - b2 \cdot \exp(j \cdot \Delta\theta2)\} \cdot \omega0$$

Removing the electromotive force EdA22 from the inter-electrode electromotive force E220 makes it possible to extract an electromotive force EvB2 of the v×B component in the inter-electrode electromotive force E220 according to the following equation:

$$EvB2 = E220 - EdA22 \quad (157)$$
$$= rkf[h2] \cdot \exp\{j \cdot (\theta1 + \theta f[h2])\} \cdot$$
$$\{b1 + b2 \cdot \exp(j \cdot \Delta\theta2)\} \cdot V$$

The magnitude V of the flow velocity of the fluid to be measured can be represented by the following equation according to equation (157) using m2b of equation (152).

$$V = |Evb2|/(rkf[h2] \cdot m2b) \quad (158)$$

When a parameter associated with the volume of a fluid, e.g., the level of the fluid or the amount of air bubbles mixed, is used as the parameter h2, the sectional area of the fluid is represented as a function S[h2] of the parameter h2. At this time, equation (158) is rewritten to an equation for a flow rate Q as follows:

$$Q = |Evb2|/\{rkf[h2]/S[h2] \cdot m2b\} \quad (159)$$

Note that when a parameter irrelevant to the volume of a fluid is used as the parameter h2, the sectional area S[h2] of the fluid is a constant value.

Replacing rkf[h2]/S[h2] with one function rkf2[h2] makes it possible to rewrite equation (159) to the following equation:

$$Q = |Evb2|/(rkf[h2] \cdot m2b) \quad (160)$$

Since the relationship between the parameter h2 and the magnitude rkf2[h2] of a variation component Cf2[h2] can be checked at the time of calibration, the magnitude rkf2[h2] of the variation component Cf2[h2] can be obtained from the value of the parameter h2. That is, a span variation component can be corrected. In addition, since m2b is a known value, the magnitude Q of the flow rate can be obtained from the magnitude of an electromotive force Evb2 of a v×B component.

Figure 15:
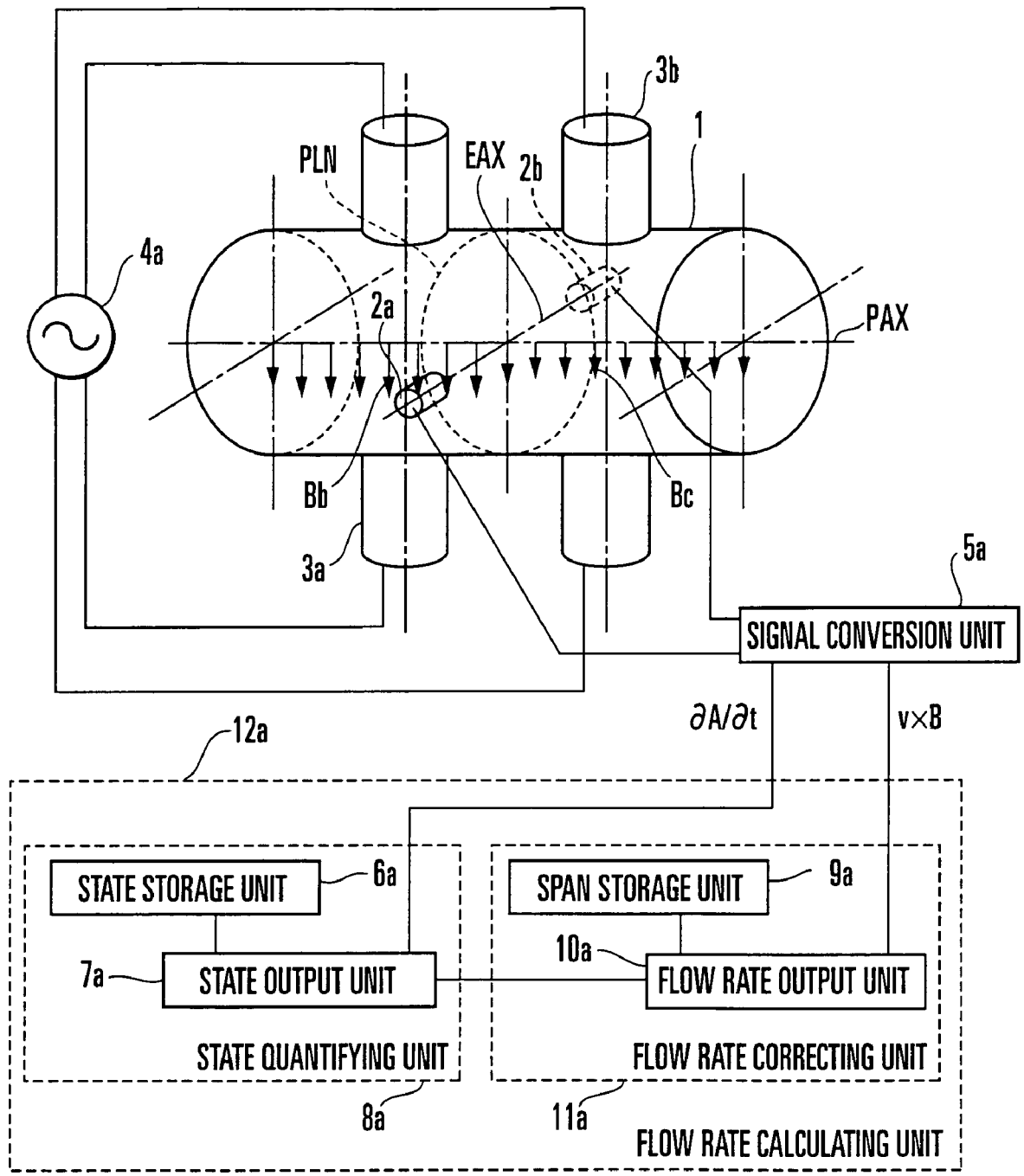
FIG. 15 is a block diagram showing the arrangement of an electromagnetic flowmeter according to the third embodiment of the present invention.

The specific arrangement and operation of the electromagnetic flowmeter according to this embodiment will be described next. FIG. 15 shows the arrangement of the electromagnetic flowmeter according to this embodiment. The same reference numerals as in FIG. 1 denote the same components in FIG. 15. The electromagnetic flowmeter of this embodiment includes a measuring tube 1, electrodes 2a and 2b, first and second exciting coils 3a and 3b, a power supply unit 4a which supplies exciting currents to the first and second exciting coils 3a and 3b, a signal conversion unit 5a which extracts, as the first ∂A/∂t component, the electromotive force difference between two frequency components with the first and second frequencies of the resultant electromotive force detected by the electrodes 2a and 2b in the excitation state ST2, extracts the electromotive force difference between two frequency components in the excitation state ST1 as the second ∂A/∂t component, and extracts a v×B component as a correction target by removing the second ∂A/∂t component from the first frequency component of the resultant electromotive force detected by the electrodes 2a and 2b in the excitation state ST1, and a flow rate calculating unit 12a.

The first and second exciting coils 3a and 3b and the power supply unit 4a constitute an exciting unit which applies a time-changing magnetic field asymmetric to the plane PLN to the fluid to be measured.

The flow rate calculating unit 12a comprises a state quantifying unit 8a and a flow rate correcting unit 11a. The state quantifying unit 8a includes a state storage unit 6a which stores in advance the relationship between the magnitude or phase of a variation component dependent on a parameter and the parameter, and a state output unit 7a which extracts the magnitude or phase of a variation component dependent on a parameter from the extracted first ∂A/∂t component, and obtains a parameter corresponding to the magnitude or phase of the extracted variation component on the basis of the relationship stored in the state storage unit 6a. The flow rate correcting unit 11a includes a span storage unit 9a which stores in advance the relationship between a parameter and the magnitude of a span variation component of a v×B component, and a flow rate output unit 10a which obtains the magnitude of a span variation component corresponding to a parameter obtained by the state output unit 7a, corrects the span of a v×B component to be corrected, and calculates the flow rate of the fluid from the corrected v×B component.

The power supply unit 4a repeats, in a T-sec cycle, the operation of continuing the first excitation state (excitation state ST1) for T1 sec in which the first exciting current with the first angular frequency ω0 is supplied to the first exciting coil 3a and at the same time the second exciting current with a phase difference Δθ2 with respect to the first exciting current and the angular frequency ω0 is supplied to the second exciting coil 3b, continuing the second excitation state (excitation state ST1) for T2 sec in which the exciting angular frequency has been changed with respect to the first excitation state from ω0 to 62, continuing the third excitation state (excitation state ST2) for T3 sec in which the phase difference between the first and second exciting currents in the first excitation state has been changed to A82+p, and continuing the fourth excitation state (excitation state ST2) for T4 sec in which the exciting angular frequency has been changed with respect to the third excitation state from ω0 to ω2. That is, T=T1+T2+T3+T4. In the first and second excitation states, the phase difference between the magnetic field generated from the first exciting coil 3a and the magnetic field generated from the second exciting coil 3b is made almost zero (Δθ2~0). In the third and fourth excitation states, the phase difference between the magnetic fields is made almost p.

Figure 16:
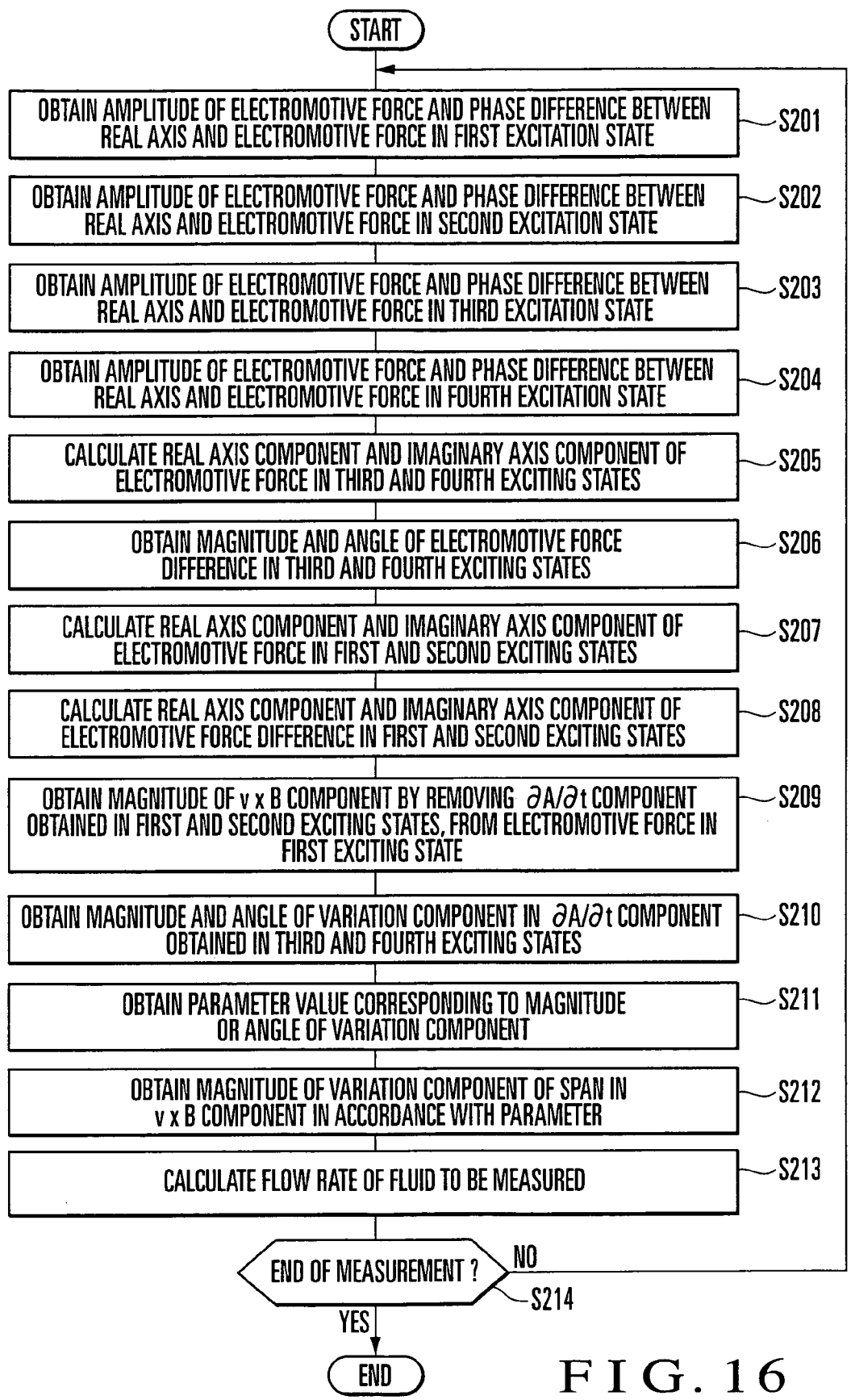
FIG. 16 is a flowchart showing the operations of a signal conversion unit and flow rate calculating unit in the third embodiment of the present invention.

FIG. 16 shows the operations of the signal conversion unit 5a and flow rate output unit 12a. First of all, the signal conversion unit 5a obtains an amplitude r220 of the electromotive force E220 of a component with the angular frequency ω0 of the electromotive force between the electrodes 2a and 2b in the first excitation state, and obtains a phase difference φ220 between the real axis and the inter-electrode electromotive force E220 by using a phase detector (not shown) (step S201 in FIG. 16). The signal conversion unit 5a then obtains an amplitude r222 of the electromotive force E222 of a component with the angular frequency ω2 of the electromotive force between the electrodes 2a and 2b in the second excitation state, and obtains a phase difference φ222 between the real axis and the inter-electrode electromotive force E222 by using the phase detector (step S202).

In addition, the signal conversion unit 5a then obtains an amplitude r222R of the electromotive force E222R of a component with the angular frequency ω0 of the electromotive force between the electrodes 2a and 2b in the third excitation state, and obtains a phase difference φ222R between the real axis and the inter-electrode electromotive force E220R by using the phase detector (step S203). The signal conversion unit 5a then obtains an amplitude r222R of the electromotive force E222R of a component with the angular frequency ω2 of the electromotive force between the electrodes 2a and 2b in the fourth excitation state, and obtains a phase difference φ222R between the real axis and the inter-electrode electromotive force E222R by using the phase detector (step S204).

The signal conversion unit 5a then calculates a real axis component E220Rx and imaginary axis component E220Ry of the inter-electrode electromotive force E220R, and a real axis component E222Rx and imaginary axis component E222Ry of the inter-electrode electromotive force E222R according to the following equations (step S205):

$$E220Rx = r220R \cdot \cos(\phi 220R) \quad (161)$$

$$E220Ry = r220R \cdot \sin(\phi 220R) \quad (162)$$

$$E222Rx = r222R \cdot \cos(\phi 222R) \quad (163)$$

$$E222Ry = r222R \cdot \sin(\phi 222R) \quad (164)$$

After the calculation of equations (161) to (164), the signal conversion unit 5a obtains the magnitude and angle of the electromotive force difference EdA21 between the inter-electrode electromotive forces E220R and E222R (step S206). The processing in step S206 corresponds to the processing of obtaining a ∂A/∂t component, and is equivalent to the calculation of equation (150). The signal conversion unit 5a calculates a magnitude |EdA21| of the electromotive force difference EdA21 according to the following equation:

$$|EdA21| = \{(E220Rx - E222Rx)^2 + (E220Ry - E222Ry)^2\}^{1/2} \cdot \omega 0/(\omega 0 - \omega 2) \quad (165)$$

The signal conversion unit 5a then calculates an angle ∠EdA21 of the electromotive force difference EdA21 with respect to the real axis according to the following equation:

$$\angle EdA21 = \tan^{-1}\{(E220Ry - E222Ry)/(E220Rx - E222Rx)\} \quad (166)$$

With the above operation, the processing in step S206 is complete.

The signal conversion unit 5a then calculates a real axis component E220x and imaginary axis component E220y of the electromotive force difference E220, and a real axis component E222x and imaginary axis component E222y of the electromotive force difference E222 according to the following equations (step S207):

$$E220x = r220 \cdot \cos(\phi 220) \quad (167)$$

$$E220y = r220 \cdot \sin(\phi 220) \quad (168)$$

$$E222x = r222 \cdot \cos(\phi 222) \quad (169)$$

$$E222y = r222 \cdot \sin(\phi 222) \quad (170)$$

The signal conversion unit 5a calculates a real axis component EdA22x and imaginary axis component EdA22y of the electromotive force difference EdA22 between the inter-electrode electromotive forces E220 and E222 according to the following equations (step S208):

$$EdA22x = (E220x - E222x) \cdot \omega 0/(\omega 0 - \omega 2) \quad (171)$$

$$EdA22y = (E220y - E222y) \cdot \omega 0/(\omega 0 - \omega 2) \quad (172)$$

Subsequently, the signal conversion unit 5a obtains an electromotive force EvB2 of the v×B component in the electromotive force E220 by removing a ∂A/∂t component (electromotive force difference EdA22) from the electromotive force E220 (step S209). The processing in step S209 is equivalent to the calculation of equation (157). The signal conversion unit 5a calculates a magnitude |EvB2| of the electromotive force EvB2 based on a v×B component according to the following equation:

$$|EvB2| = \{(E220x - EdA22x)^2 + (E220y - EdA22y)^2\}^{1/2} \quad (173)$$

The state output unit 7a then extracts the magnitude rkg[h2] of the variation component Cg[h2] dependent on the parameter h2 and the angle θg[h2] with respect to the real axis from the electromotive force difference EdA21 according to the following equations (step S210):

$$rkg[h2] = |EdA21|/(m2b \cdot \omega 0) \quad (174)$$

$$\theta g[h2] = \angle EdA21 - \theta 2b \quad (175)$$

Note that m2b and θ2b (the amplitude b1 of the magnetic field B1 generated from the first exciting coil 3a, the amplitude b2 of the magnetic field B2 generated from the first exciting coil 3b, and the phase difference θ1 between the magnetic field B1 and ω0·t, and θΔ) are constants which can be obtained in advance by calibration or the like.

The relationship between the parameter h2 and the magnitude rkg[h2] of the variation component Cg[h2] in the ∂A/∂t component or the relationship between the parameter h2 and the angle θg[h2] of the variation component Cg[h2] is registered in advance in the state storage unit 6a in the form of a mathematical expression or table. The relationship between h2 and rkg[h2] or between h2 and θg[h2] can be obtained at the time of calibration.

The state output unit 7a calculates the value of the parameter h2 corresponding to rkg[h2] or θg[h2] by referring to the state storage unit 6a on the basis of the magnitude rkg[h2] or angle θg[h2] of the variation component Cg[h2] extracted in step S210 or acquires it from the state storage unit 6a (step S211).

The relationship between the parameter h2 and the magnitude rkf2[h2] of the span variation component Cf2[h2] in the v×B component is registered in advance in the span storage unit 9a in the form of a mathematical expression or table. The relationship between h2 and rkf2[h2] can be obtained at the time of calibration.

The flow rate output unit 10a calculates the magnitude rkf2[h2] of the variation component Cf2[h2] corresponding to the parameter h2 by referring to the span storage unit 9a on the basis of the parameter h2 obtained by the state output unit 7a or acquires it from the span storage unit 9a (step S212).

Finally, the flow rate output unit 10a calculates the magnitude Q of the flow rate of the fluid to be measured according to the following equation (step S213):

$$Q=|Evb2|/(rkf2[h2] \cdot m2b) \tag{176}$$

The flow rate calculating unit 12a performs the processing in steps S201 to S213 described above in a cycle T until, for example, the operator designates the end of the measurement (YES in step S214). Note that the processing in steps S204 to S214 is performed in the fourth excitation state for a duration of T4 sec.

As described above, this embodiment is configured to obtain the inter-electrode electromotive forces E220 and E222 in the excitation state ST1 in which the phase difference between magnetic fields is almost 0, obtain the inter-electrode electromotive forces E220R and E222R in the excitation state ST2 in which the phase difference between magnetic fields is almost p, extract the electromotive force difference EdA21 (the first ∂A/∂t component) from the inter-electrode electromotive forces E220R and E222R, extract the electromotive force difference EdA22 (the second ∂A/∂t component) from the inter-electrode electromotive forces E220 and E222, extract the electromotive force EvB2 (the v×B component) by removing the electromotive force difference EdA22 from the inter-electrode electromotive force E220, extract the magnitude or phase of the variation component Cg[h2] dependent on the parameter h2 from the electromotive force difference EdA21, obtain the parameter h2 corresponding to the magnitude or phase of the variation component Cg[h2], and obtain the magnitude of the variation component Cf2[h2] of the v×B component corresponding to the parameter h2, thereby correcting the span of the v×B component on the basis of the magnitude of the variation component Cf2[h2] of the span and calculating the flow rate of the fluid. Even if, therefore, the ratio of Cf2[h2]/Cg[h2] is not constant or the parameter h2 varies, the parameter h2 can be accurately detected regardless of the flow velocity of the fluid, and the flow rate of the fluid is corrected. This makes it possible to measure a flow rate with high accuracy.

In this embodiment, adjusting the distance d1 from the plane PLN including the first electrodes 2a and 2b to the first exciting coil 3a and the distance d2 from the plane PLN to the second exciting coil 3b allows the inter-electrode electromotive forces E220 and E220 to be almost only electromotive forces based on v×B components, and also allows the inter-electrode electromotive forces E220R and E220R to be almost only electromotive forces based on ∂A/∂t components. With this processing, this embodiment can extract a v×B component and a ∂A/∂t component more effectively, and can reduce computation errors more than the first and second embodiments.

Figure 17:
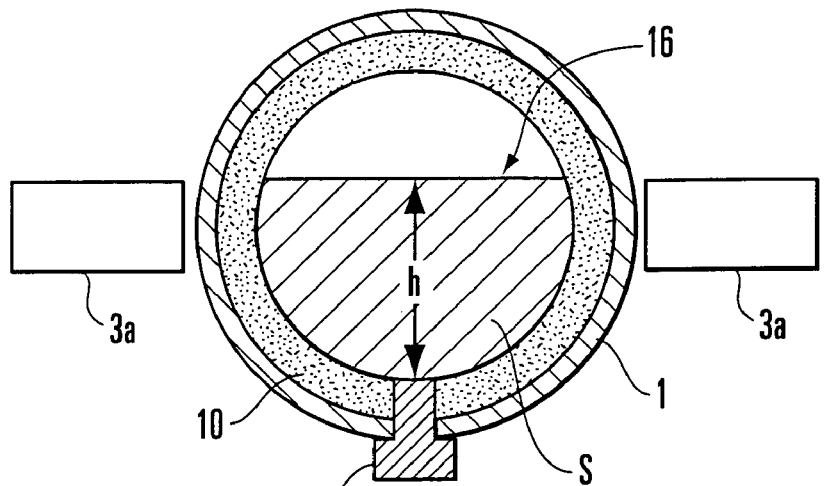
FIG. 17 is a sectional view showing an example of the arrangement of exciting coils and electrodes used in the electromagnetic flowmeter according to the third embodiment of the present invention.
Figure 18:
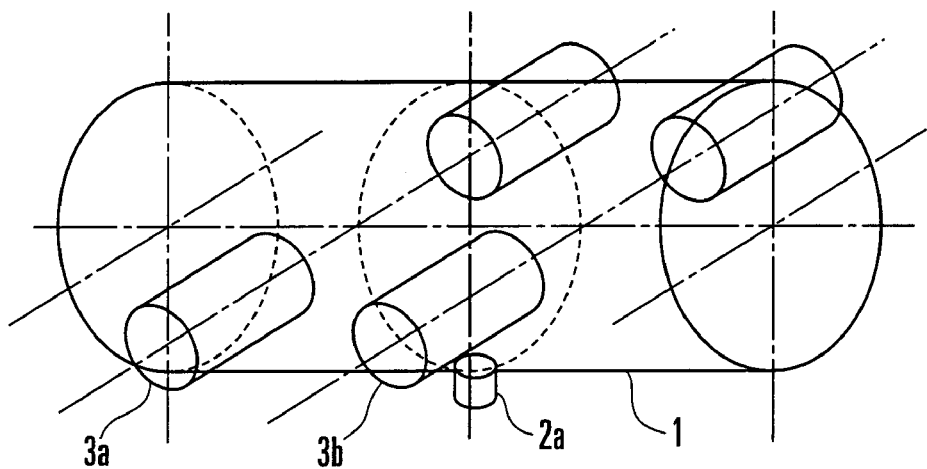
FIG. 18 is a perspective view showing an example of the arrangement of exciting coils and electrodes used in the electromagnetic flowmeter according to the third embodiment of the present invention.

The following description will explain a specific example of the electromagnetic flowmeter of this embodiment which corrects the flow rate of a fluid 16 on the basis of a level h or sectional area S of the fluid 16 with the level h or sectional area S of the fluid 16 being the parameter h2. In this case, considering that the level h varies, as shown in FIGS. 17 and 18, the first and second exciting coils 3a and 3b are arranged in a direction horizontal to the measuring tube 1, and the electrode 2a is placed under the measuring tube 1. When only one electrode is to be used in this manner, it suffices if an earth ring (not shown) for grounding the potential of the fluid 16 is provided on the measuring tube 1, and an electromotive force (a potential difference from the ground potential) generated at the electrode 2a is detected by the signal conversion unit 5a.

Figure 19:
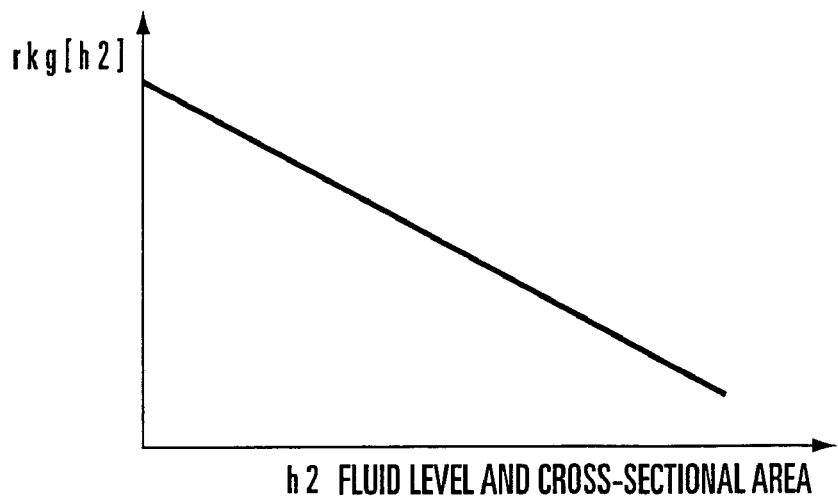
FIG. 19 is a graph showing an example of the relationship between the level or sectional area of a fluid and the magnitude of a variation component in a ∂A/∂t component in the third embodiment of the present invention.

As the level h or sectional area S of the fluid 16 varies, the value of the magnitude rkg[h2] of the variation component Cg[h2] in a ∂A/∂t component also varies. FIG. 19 shows an example of the relationship between the level h or sectional area S (parameter h2) of the fluid 16 and the magnitude rkg[h2] of the variation component Cg[h2]. The relationship shown in FIG. 19 changes depending on the shape or the like of the measuring tube 1. Therefore, obtaining this relationship by a theoretical formula at the time of design or measurement at the time of calibration and storing it in the state storage unit 6a in advance make it possible to obtain the level h or sectional area S of the fluid 16 in step S211 on the basis of the magnitude rkg[h2] of the variation component Cg[h2] obtained in step S210 and to correct the flow rate of the fluid 16 in steps S212 and S213 on the basis of the level h or sectional area S of the fluid 16.

The value of the magnitude rkg[h2] of the variation component Cg[h2] is irrelevant to the flow velocity and is larger when the level of the fluid is low than when the measuring tube is filled with the fluid. This property prevents a signal from becoming small when the level of a fluid becomes low as in a conventional electromagnetic flowmeter, and can ensure the high accuracy of flow rate measurement even when the level of the fluid becomes low.

Fourth Embodiment

The fourth embodiment of the present invention will be described next. This embodiment uses the second arrangement like the third embodiment. The fourth embodiment uses the first extraction method as a method of extracting a ∂A/∂t component from a resultant vector, and the second correction method as a flow rate correction method. Since the principle of this embodiment is the same as that of the third embodiment up to the point where the parameter h2 is obtained, only the difference after the parameter h2 is obtained will be described.

A normalized electromotive force EvBn2 obtained by normalizing an electromotive force EvB2 of a v×B component with an electromotive force difference EdA21 and multiplying the resultant value by ω0 is represented by the following equation.

$$\begin{aligned} EvBn2 &= EvB2/EdA21 \cdot \omega 0 \\ &= (rkf[h2]/rkg[h2]) \cdot V \cdot \exp\{j \cdot (\theta f[h2] - \theta g[h2] - \pi/2)\} \end{aligned} \tag{177}$$

The reason why the result obtained by normalizing the electromotive force EvB2 of the v×B component with the electromotive force difference EdA21 is multiplied by ω0 is to erase the exciting angular frequency ω0 from coefficients applied to a magnitude V of the flow velocity.

According to equation (177), the magnitude V of the flow velocity of the fluid to be measured can be represented by $$V=|Evbn2|/(rkf[h2]/rkg[h2]) \tag{178}$$

When a parameter associated with the volume of the fluid to be measured is used as h2, the sectional area of the fluid to be measured is represented as a function S[h2] of the parameter h2. At this time, equation (178) is rewritten to an equation for a flow rate as follows:

$$Q=|EvBn2|/\{(rkf[h2]/S[h2])/rkg[h2]\}, \qquad (179)$$

Replacing rkf[h2]/S[h2] with one function rkf2[h2] makes it possible to rewrite equation (179) to the following equation:

$$Q=|EvBn2|/(rkf2[h2]/rkg[h2]) \qquad (180)$$

Since the relationship between the parameter h2 and a ratio rkf2[h2]/rkg[h2] of a variation component can be checked at the time of calibration, the value of the ratio rkf2[h2]/rkg[h2] of the variation component can be obtained from the value of the parameter h2. That is, the variation component of the span is corrected, and a magnitude Q of the flow rate can be obtained from the magnitude of a normalized electromotive force EvBn2.

Figure 20:
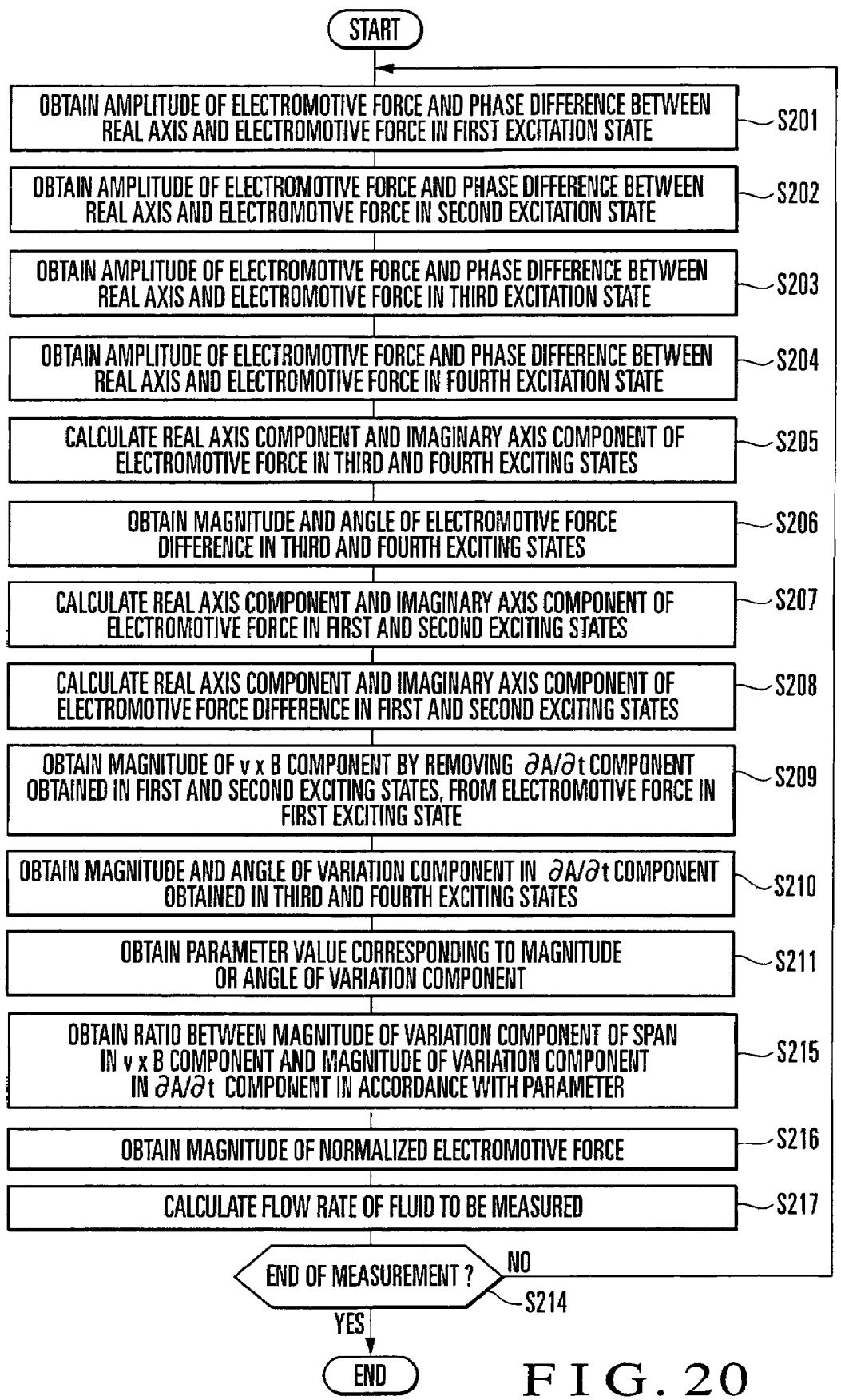
FIG. 20 is a flowchart showing the operations of a signal conversion unit and flow rate calculating unit in the fourth embodiment of the present invention.

A specific arrangement and operation of the electromagnetic flowmeter of this embodiment will be described next. The arrangement of the electromagnetic flowmeter of this embodiment is the same as in the third embodiment, and hence will be described with reference to the reference numerals in FIG. 15. The operation of a power supply unit 4a is the same as that in the third embodiment. FIG. 20 shows the operations of a signal conversion unit 5a and flow rate calculating unit 12a according to this embodiment. The same reference numerals as in FIG. 20 denote the same processes in FIG. 16.

The processing in steps S201 to S211 is the same as that in the third embodiment. The relationship between the parameter h2 and the ratio rkf2[h2]/rkg[h2] of a variation component is registered in advance in a span storage unit 9a in the form of a mathematical expression or table. The relationship between h2 and rkf2[h2]/rkg[h2] can be obtained at the time of calibration. In this case, rkg[h2] corresponds to both the ∂A/∂t component (electromotive force difference EdA22) obtained in the first and second excitation states, and the ∂A/∂t component (electromotive force difference EdA21) obtained in the third and fourth excitation state.

A flow rate output unit 10a calculates the ratio rkf2[h2]/rkg[h2] of the variation component corresponding to the parameter h2 by referring to the span storage unit 9a on the basis of the parameter h2 obtained by a state output unit 7a or acquires it from the span storage unit 9a (step S215 in FIG. 20).

The signal conversion unit 5a obtains a magnitude |EvBn2| of the normalized electromotive force EvBn2 obtained by normalizing the electromotive force EvB2 of the v×B component with the electromotive force difference EdA21 according to the following equation (step S216). The processing in step S216 is equivalent to the calculation of equation (177).

$$|EvBn2|=|EvB2|/EdA21|\cdot\omega0 \qquad (181)$$

Finally, the flow rate output unit 10a calculates the magnitude Q of the flow rate of the fluid to be measured according to the following equation (step S217):

$$Q=|EvBn2|/(rkf2[h2]/rkg[h2]) \qquad (182)$$

The flow rate calculating unit 12a performs the processing in steps S201 to S211 and S215 to S217 described above in a cycle T until, for example, the operator designates the end of the measurement (YES in step S214). Note that the processing in steps S204 to S211, S215 to S217, and S214 is performed in the fourth excitation state for a duration of T4 sec.

In the above manner, this embodiment can obtain the same effects as those of the third embodiment.

This embodiment is configured to directly obtain the value of the ratio rkf2[h2]/rkg[h2] of the variation component corresponding to the parameter h2. However, it suffices to register the relationship between the parameter h2 and the magnitude rkg[h2] of the variation component Cg[h2] and the relationship between the parameter h2 and the magnitude rkf2[h2] of the variation component Cf2[h2] in the span storage unit 9a in advance, obtain the values of rkg[h2] and rkf2[h2] corresponding to the parameter h2 by referring to the span storage unit 9a, and obtain the ratio rkf2[h2]/rkg[h2] of the variation component from the obtained values.

In addition, the third and fourth embodiments have exemplified the case wherein the exciting angular frequency is switched to ω0 or ω2, and the phase difference between the magnetic fields generated from the first and second exciting coils 3a and 3b is switched to almost zero or p. However, performing excitation using exciting currents containing components with the angular frequencies 10 and ω2 makes it unnecessary to switch the exciting frequencies. This can calculate the magnitude of the flow rate Q at higher speed. For example, it suffices to use the magnetic field represented by the following equation instead of equations (38) and (39).

$$B1=b1\cdot\cos(\omega0\cdot t-\theta1)+b1\cdot\cos(\omega2\cdot t-\theta1) \qquad (183)$$

$$B2=b2\cdot\cos(\omega0\cdot t-\theta2)+b2\cdot\cos(\omega2\cdot t-\theta2) \qquad (184)$$

Using modulated waves makes it unnecessary to switch the phase of the magnetic field. Exemplifying an amplitude modulation with reference to the angular frequency ω0 makes it possible to use the magnetic field represented by the following equation instead of equations (38) and (39).

$$B1=b1\cdot\{1+ma\cdot\cos(\omega1\cdot t)\}\cdot\cos(\omega0\cdot t) \qquad (185)$$

$$B2=b2\cdot\{1-ma\cdot\cos(\omega1\cdot t)\}\cdot\cos(\omega0\cdot t) \qquad (186)$$

where ω1 is the angular frequency of the modulated wave, ω0 is the angular frequency of the carrier wave, and ma is an amplitude modulation index. When performing excitation using an excitation current of such a modulated wave, a signal indicating the phase difference=0 is output to the angular frequency (10 component of the inter-electrode electromotive force detected by the electrodes 2a and 2b to output a signal equivalent to the phase difference p to the angular frequency ω0±ω1 component of the inter-electrode electromotive force. Obviously, the exciting frequency of the magnetic field and the phase difference need not be switched upon combining equations (183) to (186).

Fifth Embodiment

The fifth embodiment of the present invention will be described next. This embodiment uses the second arrangement described above. An electromagnetic flowmeter according to this embodiment includes two exciting coils and a pair of electrodes, and has the same arrangement as that of the electromagnetic flowmeter shown in FIG. 1 except for the signal processing system. The principle of this embodiment will therefore be described by using reference numerals in FIG. 1. This embodiment uses the second extraction method as a method of extracting a ∂A/∂t component from a resultant vector, and the first correction method as a flow rate correction method.

Assume that the first exciting current having an angular frequency ω0 is supplied to a first exciting coil 3a, the second exciting current having the angular frequency ω0 with a phase difference Δθ2 with respect to the first exciting current is supplied to a second exciting coil 3b (i.e., an excitation state ST1), and a parameter h3 is provided. In this case, an inter-electrode electromotive force E320 is represented by the following equation according to equations (45), (93), and (99).

$$E320 = rkg[h3] \cdot \exp\{j \cdot \qquad (187)$$
$$(\theta1 + \theta g[h3])\} \cdot \exp(j \cdot \pi/2) \cdot \{b1 - b2 \cdot \exp(j \cdot \Delta\theta2)\} \cdot$$
$$\omega0 + rkf[h3] \cdot \exp\{j \cdot (\theta1 + \theta f[h3])\} \cdot \{b1 + b2 \cdot \exp(j \cdot \Delta\theta2)\} \cdot V$$

Assume that the first exciting current having an angular frequency ω0 is supplied to the first exciting coil 3a, the second exciting current having the angular frequency ω0 with the phase difference Δθ2+p with respect to the first exciting current is supplied to the second exciting coil 3b (the excitation state ST2), and the parameter h3 is provided. In this case, an inter-electrode electromotive force E320R is represented by the following equation according to equations (46), (93), and (99).

$$E320R = rkg[h3] \cdot \qquad (188)$$
$$\exp\{j \cdot (\theta1 + \theta g[h3])\} \cdot \exp(j \cdot \pi/2) \cdot \{b1 + b2 \cdot \exp(j \cdot \Delta\theta2)\} \cdot$$
$$\omega0 + rkf[h3] \cdot \exp\{j \cdot (\theta1 + \theta f[h3])\} \cdot \{b1 - b2 \cdot \exp(j \cdot \Delta\theta2)\} \cdot V$$

From equations (89) and (90), the following approximate expression holds in equation (188):

$$|b1 + b2 \cdot \exp(j \cdot \Delta\theta2)| \gg |b1 - b2 \cdot \exp(j \cdot \Delta\theta2)| \qquad (189)$$

$$|rkg[h3] \cdot \omega0 \cdot \{b1 + b2 \cdot \exp(j \cdot \Delta\theta2)\}| \gg \qquad (190)$$
$$|rkf[h3] \cdot V \cdot \{b1 - b2 \cdot \exp(j \cdot \Delta\theta2)\}|$$

The following expressions represent an electromotive force EdA3 which approximates the inter-electrode electromotive force E320R in equation (188) by using the condition of expression (190).

$$EdA3 \sim E320R \qquad (191)$$

$$EdA3 = rkg[h3] \cdot \exp\{j \cdot \theta g[h3]\} \cdot \qquad (192)$$
$$\exp\{j \cdot (\pi/2 + \theta1)\} \cdot \{b1 + b2 \cdot \exp(j \cdot \Delta\theta2)\} \cdot \omega0$$

In equation (192), the ∂A/∂t component in the resultant vector can be extracted by using the phase difference between the magnetic fields generated from the first and second exciting coils 3a and 3b. Equation (192) is irrelevant to the magnitude V of the flow velocity, and hence is only the component generated by ∂A/∂t. The fluid state except for the flow velocity, and the state in the measuring tube can be measured by using the inter-electrode electromotive force EdA3.

A variation component dependent on the parameter h3 in the ∂A/∂t component is represented by Cg[h3]=rkg[h3] exp(j·θg[h3]), and the remaining portion of the ∂A/∂t component is a constant which is provided at the time of calibration. The variation component Cg[h3] is represented by equation (192).

$$Cg[h3] = EdA3/[\exp\{j \cdot (\pi/2 + \theta1)\} \cdot \{b1 + b2 \cdot \exp(j \cdot \Delta\theta2)\} \cdot \omega0] \qquad (193)$$

Letting m2b be the magnitude of [exp{j·(π/2+θ1)}·{b1+b2·exp(j·Δθ2)}], and letting θ2b be the angle, m2b and θ2b are represented by equations (152) and (153).

Upon applying equations (152) and (153) to equation (193), a magnitude rkg[h3] of the variation component Cg[h3] and an angle θg[h3] thereof from the real axis are represented by $$rkg[h3]=|EdA3|/(m2b\cdot\omega0) \qquad (194)$$

$$\theta g[h3]=\angle EdA3-\theta2b \qquad (195)$$

The parameter h3 can be obtained from the relationship between the parameter h3 and the variation component Cg[h3], which is checked in advance by measurement or the like at the time of calibration, or the relationship between the parameter h3 and the angle θg[h3] of the variation component Cg[h3]. A span as a coefficient applied to the magnitude V of the flow velocity of the v×B component is corrected by using the obtained parameter h3.

As described above, it is convenient to obtain the v×B component in the excitation state ST1 although it is convenient to obtain the parameter h3 in the excitation state ST2 upon extracting the ∂A/∂t component. The v×B component can also be extracted by using the different frequencies as in the third embodiment. However, as described in equation (146), when the distance d1 from the plane PLN including the electrodes 2a and 2b is substantially equal to the distance d2 from the plane PLN to the second exciting coil 3b, the inter-electrode electromotive force E320 in equation (187) can be assumed to be the electromotive force of only the v×B component. In this case, the electromotive force EvB3 of the v×B component is represented by the following equation.

$$EvB3 = rkf[h3] \cdot \exp\{j \cdot (\theta1 + \theta f[h3])\} \cdot \{b1 + b2 \cdot \exp(j \cdot \Delta\theta2)\} \cdot V \qquad (196)$$

The magnitude V of the flow velocity of the fluid to be measured can be expressed, using m2b in equation (152), by the following equation according to equation (196).

$$V=|Evb3|/(rkf[h3]\cdot m2b) \qquad (197)$$

When a parameter associated with the volume of a fluid, e.g., the level of the fluid or the amount of air bubbles mixed, is used as the parameter h3, the sectional area of the fluid is represented as a function S[h3] of the parameter h3. At this time, equation (197) is rewritten to an equation for a flow rate Q as follows:

$$Q=|Evb3|/(rkf[h3]/S[h3]\cdot m2b) \qquad (198)$$

Note that when a parameter irrelevant to the volume of a fluid is used as the parameter h3, the sectional area S[h3] of the fluid is a constant value.

Replacing rkf[h3]/S[h3] with one function rkf2[h3] allows to rewrite equation (198) to the following equation:

$$Q=|Evb3|/(rkf2[h3]/\cdot m2b) \qquad (199)$$

Since the relationship between the parameter h3 and the magnitude rkf2[h3] of a variation component Cf2[h3] can be checked at the time of calibration, the magnitude rkf2[h3] of the variation component Cf2[h3] can be obtained from the value of the parameter h3. That is, a span variation component can be corrected. In addition, since m2b is a known value, the magnitude Q of the flow rate can be obtained from the magnitude of an electromotive force Evb3 of a v×B component.

The specific arrangement and operation of the electromagnetic flowmeter according to this embodiment will be described next. The electromagnetic flowmeter according to this embodiment has the same arrangement as that of the electromagnetic flowmeter in the third embodiment. Hence, the same reference numerals as in FIG. 15 denote the same components in this embodiment. The electromagnetic flowmeter of this embodiment includes a measuring tube 1, electrodes 2a and 2b, the first and second exciting coils 3a and 3b, a power supply unit 4, a signal conversion unit 5a which extracts a ∂A/∂t component by obtaining the amplitude and phase in the excitation state ST2 of a resultant electromotive force detected by the electrodes 2a and 2b, and extracts the correction target v×B component by obtaining the amplitude and phase in the excitation state ST1 of a resultant electromotive force detected by the electrodes 2a and 2b, and a flow rate calculating unit 12.

The flow rate calculation unit 12a includes a state quantifying unit 8a and flow rate correcting unit h1a. The state quantifying unit 8a includes a state storage unit 6a and state output unit 7a. The flow rate correcting unit 11a includes a span storage unit 9a and flow rate output unit 10a.

The power supply unit 4a repeats, in a T-sec cycle, the operation of continuing the first excitation state (excitation state ST1) for T1 sec in which the first exciting current with the angular frequency ω0 is supplied to the first exciting coil 3a and at the same time the second exciting current with the angular frequency ω0 is supplied to the second exciting coil 3b, with a phase difference from the first exciting current being Δθ2, and continuing the second excitation state (excitation state ST2) for T2 sec in which the phase difference between the first and second exciting currents in the first excitation state has been changed to Δθ2+p. That is, T=T1+T2. Assume that the phase difference between the magnetic fields generated from the first and second exciting coils 3a and 3b is substantially zero (Δθ2~0) in the first excitation state, and the phase difference of the magnetic field is substantially p in the second excitation state.

Figure 21:
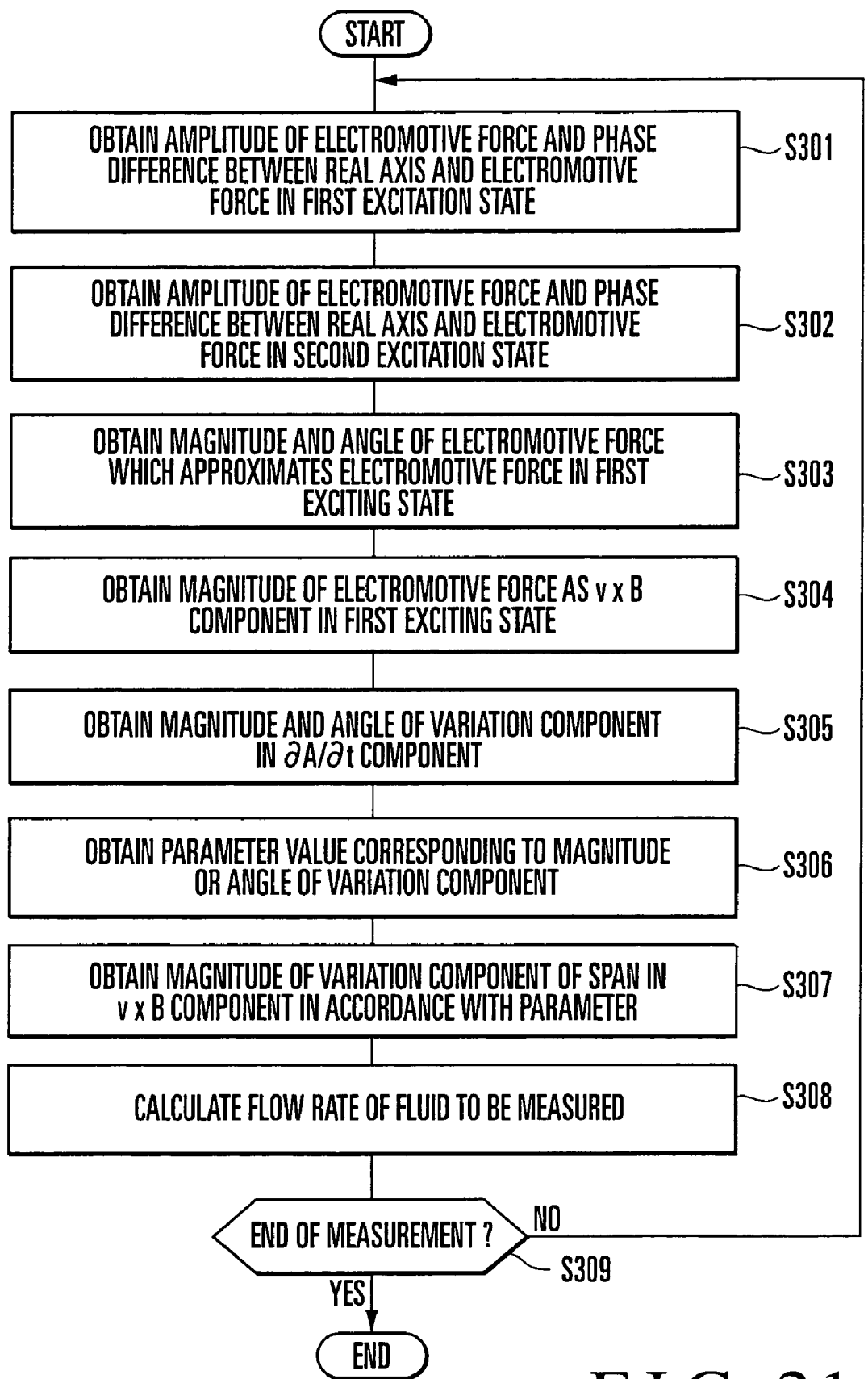
FIG. 21 is a flowchart showing the operations of a signal conversion unit and flow rate calculating unit in the fifth embodiment of the present invention.

FIG. 21 is a flowchart showing the operations of the signal conversion unit 5a and flow rate calculation unit 12a according to this embodiment. First of all, the signal conversion unit 5a obtains an amplitude r320 of the electromotive force E320 with the angular frequency 10 component of the electromotive force between the electrodes 2a and 2b in the first excitation state, and obtains a phase difference (320 between the real axis and the inter-electrode electromotive force E320 by using a phase detector (not shown) (step S301 in FIG. 21). Subsequently, the signal conversion unit 5a obtains an amplitude r320R of the electromotive force E320R with the angular frequency ω0 component of the electromotive force between the electrodes 2a and 2b in the second excitation state, and obtains a phase difference φ320R between the real axis and the inter-electrode electromotive force E320R by using the phase detector (step S302).

Next, the signal conversion unit 5a obtains the magnitude and angle of the electromotive force EdA3 which approximates the inter-electrode electromotive force E320R (step S303). The processing in step S303 corresponds to the processing of obtaining the ∂A/∂t component, and is equivalent to the calculation of equation (192). The signal conversion unit 5a calculates a magnitude |EdA3| of the electromotive force EdA3 which approximates the inter-electrode electromotive force E320R according to the following equation:

$$|EdA3|=r320R \tag{200}$$

The signal conversion unit 5a then calculates an angle ∠EdA3 of the inter-electrode electromotive force EdA3 with respect to the real axis according to the following equation:

$$\angle EdA3=\phi 320R \tag{201}$$

With the above operation, the processing in step S303 is complete.

Subsequently, the signal conversion unit 5a obtains an electromotive force EvB3 of the v×B component in the electromotive force E320 (step S304). The signal conversion unit 5a calculates a magnitude |EvB3| of the electromotive force EvB3 based on a v×B component according to the following equation:

$$|EVB3|=r320 \tag{202}$$

The state output unit 7a then extracts the magnitude rkg[h3] of the variation component Cg[h3] dependent on the parameter h3 and the angle θg[h3] with respect to the real axis from the electromotive force difference EdA3 according to the following equations (step S305):

$$rkg[h3]=|EvA3|/(m2b \cdot \omega 0) \tag{203}$$

$$\theta g[h3]=\angle EdA3-\theta 2b \tag{204}$$

Note that m2b and θ2b (the amplitude b1 of the magnetic field B1 generated from the first exciting coil 3a, the amplitude b2 of the magnetic field B2 generated from the second exciting coil 3b, the phase difference θ1 between magnetic field B1 and ω0·t, and Δθ2) are constants which can be obtained in advance by calibration or the like.

The relationship between the parameter h3 and the magnitude rkg[h3] of the variation component Cg[h3] in the ∂A/∂t component or the relationship between the parameter h3 and the angle θg[h3] of the variation component Cg[h3] is registered in advance in the state storage unit 6a in the form of a mathematical expression or table. The relationship between h3 and rkg[h3] or between h3 and θg[h3] can be obtained at the time of calibration.

The state output unit 7a calculates the value of the parameter h3 corresponding to rkg[h3] or θg[h3] by referring to the state storage unit 6a on the basis of the magnitude rkg[h3] or angle θg[h3] of the variation component Cg[h3] extracted in step S305 or acquires it from the state storage unit 6a (step S306).

The relationship between the parameter h3 and the magnitude rkf2[h3] of the variation component Cf2[h3] in the v×B component is registered in advance in the span storage unit 9a in the form of a mathematical expression or table. The relationship between h3 and rkf2[h3] can be obtained at the time of calibration.

The flow rate output unit b1a calculates the magnitude rkf2[h3] of the variation component Cf2[h3] corresponding to the parameter h3 by referring to the span storage unit 9a on the basis of the parameter h3 obtained by the state output unit 7a or acquires it from the span storage unit 9a (step S307).

Finally, the flow rate output unit b1a calculates the magnitude Q of the flow rate of the fluid to be measured according to the following equation (step S308):

$$Q=|Evb3|/(rkf2[h3] \cdot m2b) \tag{205}$$

The flow rate calculating unit 12a performs the processing in steps S301 to S308 described above in a cycle T until, for example, the operator designates the end of the measurement (YES in step S309). Note that the processing in steps S302 to S309 is performed in the second excitation state for a duration of T2 sec.

As described above, according to this embodiment, note that when the magnitudes of the magnetic fields B1 and B2 are equal to each other in the excitation state ST2 wherein the phase difference between the magnetic fields B1 and B2 generated from the first and second exciting coils 3a and 3b is substantially p, the inter-electrode electromotive force E320R can be approximately extracted as the $\partial A/\partial t$ component, and the inter-electrode electromotive force E320 can be approximately extracted as the v×B component. This embodiment is configured to extract the magnitude or phase of the variation component Cg[h3]l dependent on the parameter h3 from the $\partial A/\partial t$ component, obtain the parameter h3 corresponding to the magnitude or phase of the variation component Cg[h3], and obtain the magnitude of the span variation component Cf2[h3] of the v×B component corresponding to the parameter h3, thereby correcting the span of the v×B component on the basis of the magnitude of the variation component Cf2[h3] of the span and calculating the flow rate of the fluid. Even if, therefore, the ratio of Cf2[h3]/Cg[h3] is not constant or the parameter h3 varies, the parameter h3 can be accurately detected regardless of the flow velocity of the fluid, and the flow rate of the fluid is corrected. This makes it possible to measure a flow rate with high accuracy.

In this embodiment, upon adjusting the distance d1 from the plane PLN including the electrodes 2a and 2b to the first exciting coil 3a and the distance d2 from the plane PLN to the second exciting coil 3b, the inter-electrode electromotive force E320 can be almost only the electromotive force based on the v×B component. Hence, this embodiment can extract the v×B component more effectively, and can reduce computation errors more than the first and second embodiments.

Sixth Embodiment

The sixth embodiment of the present invention will be described next. This embodiment uses the second arrangement like the fifth embodiment. The sixth embodiment uses the second extraction method as a method of extracting a $\partial A/\partial t$ component from a resultant vector, and the second correction method as a flow rate correction method. Since the principle of this embodiment is the same as that of the fifth embodiment up to the point where the parameter h3 is obtained, only the difference after the parameter h3 is obtained will be described.

A normalized electromotive force EvBn3 obtained by normalizing an electromotive force EvB3 of a v×B component with an electromotive force difference EdA3 and multiplying the resultant value by ω0 is represented by the following equation.

$$EvBn3 = EvB3/EdA3 \cdot \omega 0 \quad (206)$$
$$= (rkf[h3]/rkg[h3]) \cdot V \cdot \exp\{j \cdot (\theta f[h3] - \theta g[h3] - \pi/2)\}$$

The reason why the result obtained by normalizing the electromotive force difference EvB3 of the v×B component with the electromotive force EdA3 is multiplied by ω0 is to erase the exciting angular frequency ω0 from coefficients applied to a magnitude V of the flow velocity.

According to equation (206), the magnitude V of the flow velocity of the fluid to be measured can be represented by $$V=|Evbn3|/(rkf[h3]/rkg[h3]) \quad (207)$$

When a parameter associated with the volume of the fluid to be measured is used as h3, the sectional area of the fluid to be measured is represented as a function S[h3] of the parameter h3. At this time, equation (207) is rewritten to an equation for a flow rate as follows:

$$Q=|Evbn3|/\{(rkf[h3]/S[h3])/rkg[h3]\} \quad (208)$$

Replacing rkf[h3]/S[h3] with one function rkf2[h3] makes it possible to rewrite equation (208) to the following equation:

$$Q=|Evbn3|/(rkf2[h3]/rkg[h3]) \quad (209)$$

Since the relationship between the parameter h3 and a ratio rkf2[h3]/rkg[h3] of a variation component can be checked at the time of calibration, the value of the ratio rkf2[h3]/rkg[h3] of the variation component can be obtained from the value of the parameter h3. That is, the variation component of the span is corrected, and a magnitude Q of the flow rate can be obtained from the magnitude of the normalized electromotive force Evbn3.

Figure 22:
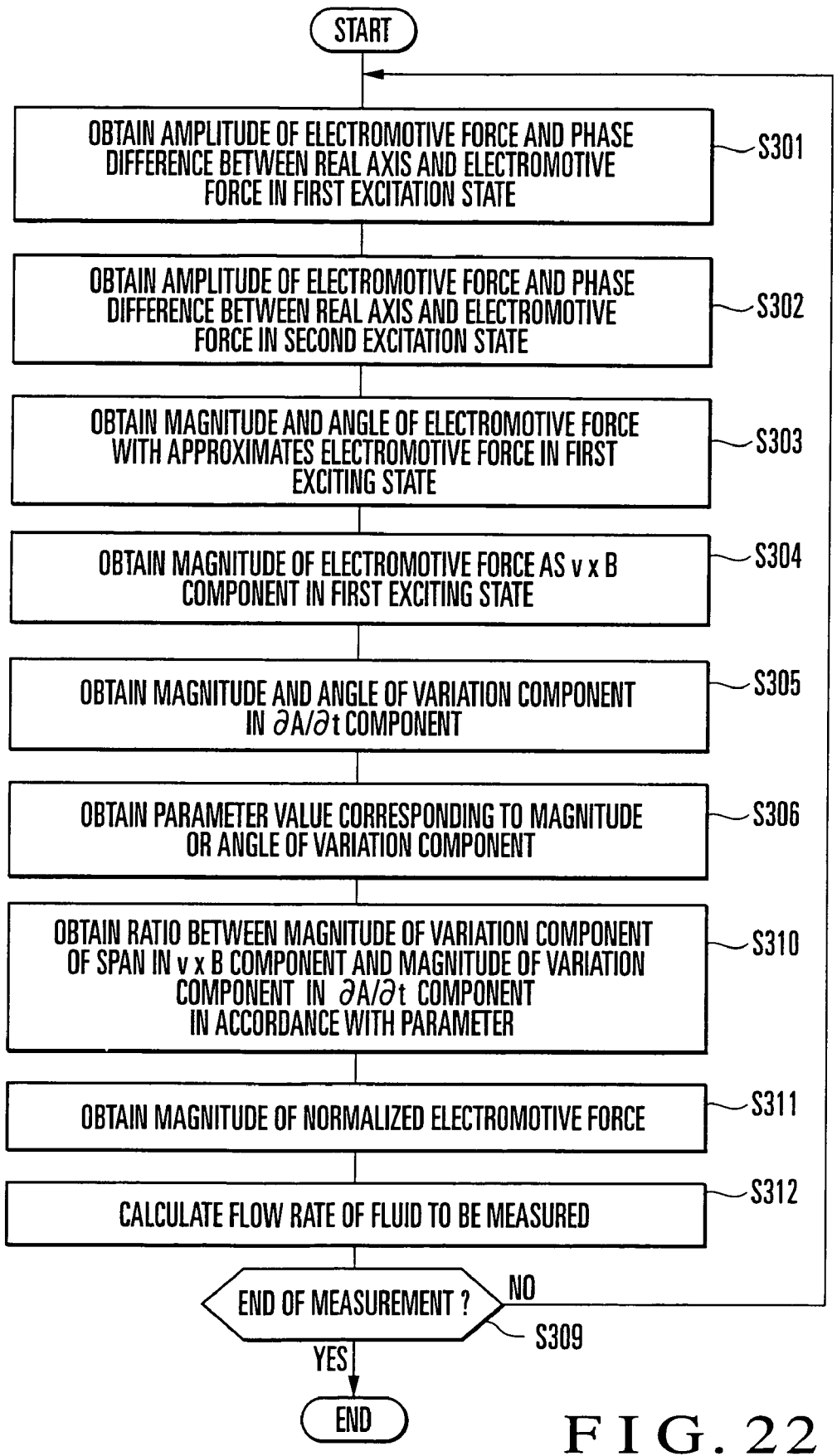
FIG. 22 is a flowchart showing the operations of a signal conversion unit and flow rate calculating unit in the sixth embodiment of the present invention.

A specific arrangement and operation of the electromagnetic flowmeter of this embodiment will be described next. The arrangement of the electromagnetic flowmeter of this embodiment is the same as in the third embodiment, and hence will be described with reference to the reference numerals in FIG. 15. The operation of a power supply unit 4a is the same as that in the fifth embodiment. FIG. 22 shows the operations of a signal conversion unit 5a and flow rate calculating unit 12a according to this embodiment. The same reference numerals as in FIG. 22 denote the same processes in FIG. 21.

The processing in steps S301 to S306 is the same as that in the fifth embodiment. The relationship between the parameter h3 and the ratio rkf2[h3]/rkg[h3] of a variation component is registered in advance in a span storage unit 9a in the form of a mathematical expression or table. The relationship between h3 and rkf2[h3]/rkg[h3] can be obtained at the time of calibration.

A flow rate output unit 10a calculates the ratio rkf2[h3]/rkg[h3] of the variation component corresponding to the parameter h3 by referring to the span storage unit 9a on the basis of the parameter h3 obtained by a state output unit 7a or acquires it from the span storage unit 9a (step S310).

The signal conversion unit 5a obtains a magnitude |EvBn3| of the normalized electromotive force EvBn3 obtained by normalizing the electromotive force EvB3 of the v×B component with the electromotive force EdA3 according to the following equation (step S311). The processing in step S311 is equivalent to the calculation of equation (206).

$$|EvBn3|=|EvB3|/|EdA3|\cdot\omega 0 \quad (210)$$

Finally, the flow rate output unit b1a calculates the magnitude Q of the flow rate of the fluid to be measured according to the following equation (step S312):

$$Q=|Evbn3|/(rkf2[h3]/rkg[h3]) \quad (211)$$

The flow rate calculating unit 12a performs the processing in steps S301 to S306 and S310 to S312 described above in a cycle T until, for example, the operator designates the end of the measurement (YES in step S309). Note that the processing in steps S302 to S306, S310 to S312, and S309 is performed in the second excitation state for a duration of T2 sec.

In the above manner, this embodiment can obtain the same effects as those of the fifth embodiment.

This embodiment is configured to directly obtain the value of the ratio rkf2[h3]/rkg[h3] of the variation component corresponding to the parameter h3. However, it suffices to register the relationship between the parameter h3 and the magnitude rkg[h3] of the variation component Cg[h3] and the relationship between the parameter h3 and the magnitude rkf2[h3] of the variation component Cf2[h3] in the span storage unit 9a in advance, obtain the values of rkg[h3] and rkf2[h3] corresponding to the parameter h3 by referring to the span storage unit 9a, and obtain the ratio rkf2[h3]/rkg[h3] of the variation component from the obtained values.

In addition, the fifth and sixth embodiments have exemplified the case wherein the phase difference between the magnetic fields generated from the first and second exciting coils 3a and 3b is switched to almost 0 or p. However, using the modulated wave makes it unnecessary to switch the phase of the magnetic field. Exemplifying an amplitude modulation with reference to the angular frequency ω0 makes it possible to use the magnetic field represented by the following equation instead of equations (38) and (39).

$$B1 = b1 \cdot \{1 + ma \cdot \cos(\omega1 \cdot t)\} \cdot \cos(\omega0 \cdot t) \quad (212)$$

$$B2 = b2 \cdot \{1 - ma \cdot \cos(\omega1 \cdot t)\} \cdot \cos(\omega0 \cdot t) \quad (213)$$

where ω1 is the angular frequency of the modulated wave, ω0 is the angular frequency of the carrier wave, and ma is an amplitude modulation index. When performing excitation using an excitation current of such a modulated wave, a signal indicating the phase difference=0 is output to the angular frequency ω0 component of the inter-electrode electromotive force detected by the electrodes 2a and 2b to output a signal equivalent to the phase difference p to the angular frequency ω0±ω1 component of the inter-electrode electromotive force.

Seventh Embodiment

The seventh embodiment of the present invention will be described next. This embodiment uses the third arrangement described above. An electromagnetic flowmeter according to this embodiment includes one exciting coil and two pairs of electrodes, and has the same arrangement as that of the electromagnetic flowmeter shown in FIG. 4 except for the signal processing system. The principle of this embodiment will therefore be described by using reference numerals in FIG. 4. This embodiment uses the first extraction method as a method of extracting a ∂A/∂t component from a resultant vector, and the first correction method as a flow rate correction method.

Assume that the exciting current having an angular frequency ω0 is supplied to a exciting coil 3, and a parameter h4 is provided. In this case, a sum E430s of the first inter-electrode electromotive force between electrodes 2a and 2b and the second inter-electrode electromotive force between electrodes 2c and 2d is represented by the following equation according to equations (69), (93), and (99).

$$E430s = rkg[h4] \cdot \exp\{j \cdot (\theta 3 + \theta g[h4])\} \cdot \quad (214)$$
$$\exp(j \cdot \pi/2) \cdot \{b3 - b4 \cdot \exp(j \cdot \Delta\theta 4)\} \cdot \omega 0 +$$
$$rkf[h4] \cdot \exp\{j \cdot (\theta 4 + \theta f[h4])\} \cdot$$
$$\{b3 + b4 \cdot \exp(j \cdot \Delta\theta 4)\} \cdot V$$

Assume that the exciting current having an angular frequency ω2 is supplied to the exciting coil 3, and the parameter h4 is provided. In this case, a sum E432s of the first inter-electrode electromotive force between the electrodes 2a and 2b and the second inter-electrode electromotive force between the electrodes 2c and 2d is represented by the following equation according to equations (69), (93), and (99).

$$E432s = rkg[h4] \cdot \exp\{j \cdot (\theta 3 + \theta g[h4])\} \cdot \quad (215)$$
$$\exp(j \cdot \pi/2) \cdot \{b3 - b4 \cdot \exp(j \cdot \Delta\theta 4)\} \cdot \omega 2 +$$
$$rkf[h4] \cdot \exp\{j \cdot (\theta 3 + \theta f[h4])\} \cdot$$
$$\{b3 + b4 \cdot \exp(j \cdot \Delta\theta 4)\} \cdot V$$

Assume that the exciting current having the angular frequency ω0 is supplied to the exciting coil 3, and the parameter h4 is provided. In this case, a difference E430d between the first inter-electrode electromotive force between the electrodes 2a and 2b and the second inter-electrode electromotive force between the electrodes 2c and 2d is represented by the following equation according to equations (70), (93), and (99).

$$E430d = rkg[h4] \cdot \exp\{j \cdot (\theta 3 + \theta g[h4])\} \cdot \quad (216)$$
$$\exp(j \cdot \pi/2) \cdot \{b3 + b4 \cdot \exp(j \cdot \Delta\theta 4)\} \cdot \omega 0 +$$
$$rkf[h4] \cdot \exp\{j \cdot (\theta 3 + \theta f[h4])\} \cdot$$
$$\{b3 - b4 \cdot \exp(j \cdot \Delta\theta 4)\} \cdot V$$

Assume that the exciting current having the angular frequency ω2 is supplied to the exciting coil 3, and the parameter h4 is provided. In this case, a difference E432d between the first inter-electrode electromotive force between the electrodes 2a and 2b and the second inter-electrode electromotive force between the electrodes 2c and 2d is represented by the following equation according to equations (70), (93), and (99).

$$E432d = rkg[h4] \cdot \exp\{j \cdot (\theta 3 + \theta g[h4])\} \cdot \quad (217)$$
$$\exp(j \cdot \pi/2) \cdot \{b3 + b4 \cdot \exp(j \cdot \Delta\theta 4)\} \cdot \omega 2 +$$
$$rkf[h4] \cdot \exp\{j \cdot (\theta 3 + \theta f[h4])\} \cdot$$
$$\{b3 - b4 \cdot \exp(j \cdot \Delta\theta 4)\} \cdot V$$

In this case, if a distance d3 from a plane PLN3 including the axis of the exciting coil 3 to an electrode axis EAX1 connecting the electrodes 2a and 2b is almost equal to a distance d4 from the plane PLN3 to an electrode axis EAX2 connecting the electrodes 2c and 2d (d3~d4), then b3~b4 and Δθ4~0. In this case, equations (214) to (217) are rewritten as follows:

$$E430s \sim rkf[h4] \cdot \exp\{j \cdot (\theta 3 + \theta f[h4])\} \cdot (2 \cdot b3 \cdot V) \quad (218)$$

$$E432s \sim rkf[h4] \cdot \exp\{j \cdot (\theta 3 + \theta f[h4])\} \cdot (2 \cdot b3 \cdot V) \quad (219)$$

$$E430d \sim rkg[h4] \cdot \exp\{j \cdot (\theta 3 + \theta g[h4])\} \cdot \\ \exp(j \cdot \pi/2) \cdot \{2 \cdot b3 \cdot \omega 0\} \quad (220)$$

$$E432d \sim rkg[h4] \cdot \exp\{j \cdot (\theta 3 + \theta g[h4])\} \cdot \\ \exp(j \cdot \pi/2) \cdot \{2 \cdot b3 \cdot \omega 2\} \quad (221)$$

That is, since the electromotive force sums E430$s$ and E432$s$ are almost only the electromotive forces based on the v×B components, and the electromotive force differences E430$d$ and E432$d$ are almost only the electromotive forces based on the $\partial A/\partial t$ components, computation errors in the extraction of a $\partial A/\partial t$ component and a v×B component can be reduced. This point is a difference in terms of technical significance between the first and second embodiments. Note, however, that the subsequent theoretical development will be made assuming that $b3 \neq b4$ and $\Delta\theta 4 \neq 0$.

Letting EdA41 be the result obtained by obtaining the difference between the electromotive force differences E430$d$ and E432$d$ and multiplying the obtained difference by $\omega 0/(\omega - \omega 2)$, the difference EdA41 is given by $$EdA41 = (E430d - E432d) \cdot \omega 0 / (\omega 0 - \omega 2) \quad (222)$$
$$= rkf[h4] \cdot \exp(j \cdot \theta g[h4]) \cdot \exp\{j \cdot (\pi/2 + \theta 3)\} \cdot$$
$$\{b3 + b4 \cdot \exp(j \cdot \Delta\theta 4)\} \cdot \omega 0$$

According to equation (222), it is obvious that a $\partial A/\partial t$ component in a resultant vector can be extracted by using the output difference between different frequency components. Equation (222) is irrelevant to a magnitude V of the flow velocity, and hence is only the component generated by $\partial A/\partial t$. Using the difference EdA41, therefore, makes it possible to measure a state of the fluid or a state in the measuring tube other than the flow velocity.

A variation component dependent on the parameter h4 in the $\partial A/\partial t$ component is represented by $Cg[h4]=rkg[h4]\cdot\exp(j\cdot\theta g[h4])$, and the remaining portion of the $\partial A/\partial t$ component is a constant which is provided at the time of calibration. The variation component Cg[h4] is represented by the following equation according to equation (222).

$$Cg[h4] = EdA41 / [\exp\{j \cdot (\pi/2 + \theta 3)\} \cdot \\ \{b3 + b4 \cdot \exp(j \cdot \Delta\theta 4)\} \cdot \omega 0] \quad (223)$$

Letting m3$b$ and $\theta 3b$ be the magnitude and angle of $[\exp\{j\cdot(p/2+\theta 3)\}\cdot\{b3+b4\cdot\exp(j\cdot\Delta\theta 4)\}]$ in equation (223), m3$b$ and $\theta 3b$ are represented by $$m3b = \{b3^2 + b4^2 + 2 \cdot b3 \cdot b4 \cdot \cos(\Delta\theta 4)\}^{1/2} \quad (224)$$

$$\theta 3b = \tan^{-1}[\{b4 \cdot \sin(\Delta\theta 4)\} / \\ \{b3 + b4 \cdot \cos(\Delta\theta 4)\}] + (\pi/2 + \theta 3) \quad (225)$$

According to equations (223) to (225), the magnitude rkg[h4] of the variation component Cg[h4] and the angle $\theta g[h4]$ with respect to the real axis are represented by $$rkg[h4]=|EdA41|/(m3b\cdot\omega 0) \quad (226)$$

$$\theta g[h4]=\angle EdA41-\theta 3b \quad (227)$$

The parameter h4 can be obtained from the relationship between the parameter h4 and the variation component Cg[h4], which is checked in advance by measurement or the like at the time of calibration, or the relationship between the parameter h4 and the angle $\theta g[h4]$ of the variation component Cg[h4]. A span as a coefficient applied to the magnitude V of the flow velocity of the v×B component is corrected by using the obtained parameter h4.

As described above, although the difference between the inter-electrode electromotive forces is more favorable for the acquisition of the parameter h4 by extracting a $\partial A/\partial t$ component, the sum of the inter-electrode electromotive forces is more favorable for the acquisition of a v×B component.

Letting EdA42 be the result obtained by obtaining the difference between the electromotive force sums E430$s$ and E432$s$ and multiplying the obtained difference by $\omega 0/(\omega 0-\omega 2)$, the difference EdA42 is given by $$EdA42 = (E430s - E432s) \cdot \omega 0 / (\omega 0 - \omega 2) \quad (228)$$
$$= rkg[h4] \cdot \exp(j \cdot \theta g[h4]) \cdot$$
$$\exp\{j \cdot (\pi/2 + \theta 3)\} \cdot$$
$$\{b3 - b4 \cdot \exp(j \cdot \Delta\theta 4)\} \cdot \omega 0$$

Removing the difference EdA42 from the electromotive force sum E430$s$ makes it possible to extract an electromotive force EvB4 of the v×B component in the electromotive force sum E430$s$ according to the following equation:

$$EvB4 = E430s - EdA42 \quad (229)$$
$$= rkf[h4] \cdot \exp\{j \cdot (\theta 3 + \theta f[h4])\} \cdot$$
$$\{b3 + b4 \cdot \exp(j \cdot \Delta\theta 4)\} \cdot V$$

The magnitude V of the flow velocity of the fluid to be measured can be represented by the following equation according to equation (229) using m3$b$ of equation (224).

$$V=|Evb4|/(rkf[h4]\cdot m3) \quad (230)$$

When a parameter associated with the volume of a fluid, e.g., the level of the fluid or the amount of air bubbles mixed, is used as the parameter h4, the sectional area of the fluid is represented as a function S[h4] of the parameter h4. At this time, equation (230) is rewritten to an equation for a flow rate Q as follows:

$$Q=|Evb4|/\{rkf[h4]/S[h4]\cdot m3b\} \quad (231)$$

Note that when a parameter irrelevant to the volume of a fluid is used as the parameter h4, the sectional area S[h4] of the fluid is a constant value.

Replacing rkf[h4]/S[h4] with one function rkf2[h4] makes it possible to rewrite equation (231) to the following equation:

$$Q=|Evb4|/(rkf2[h4]\cdot m3b) \quad (232)$$

Since the relationship between the parameter h4 and the magnitude rkf2[h4] of a variation component Cf2[h4] can be checked at the time of calibration, the magnitude rkf2[h4] of the variation component Cf2[h4] can be obtained from the value of the parameter h4. That is, a span variation component can be corrected. In addition, since m3b is a known value, the magnitude Q of the flow rate can be obtained from the magnitude of an electromotive force Evb4 of a v×B component.

Figure 23:
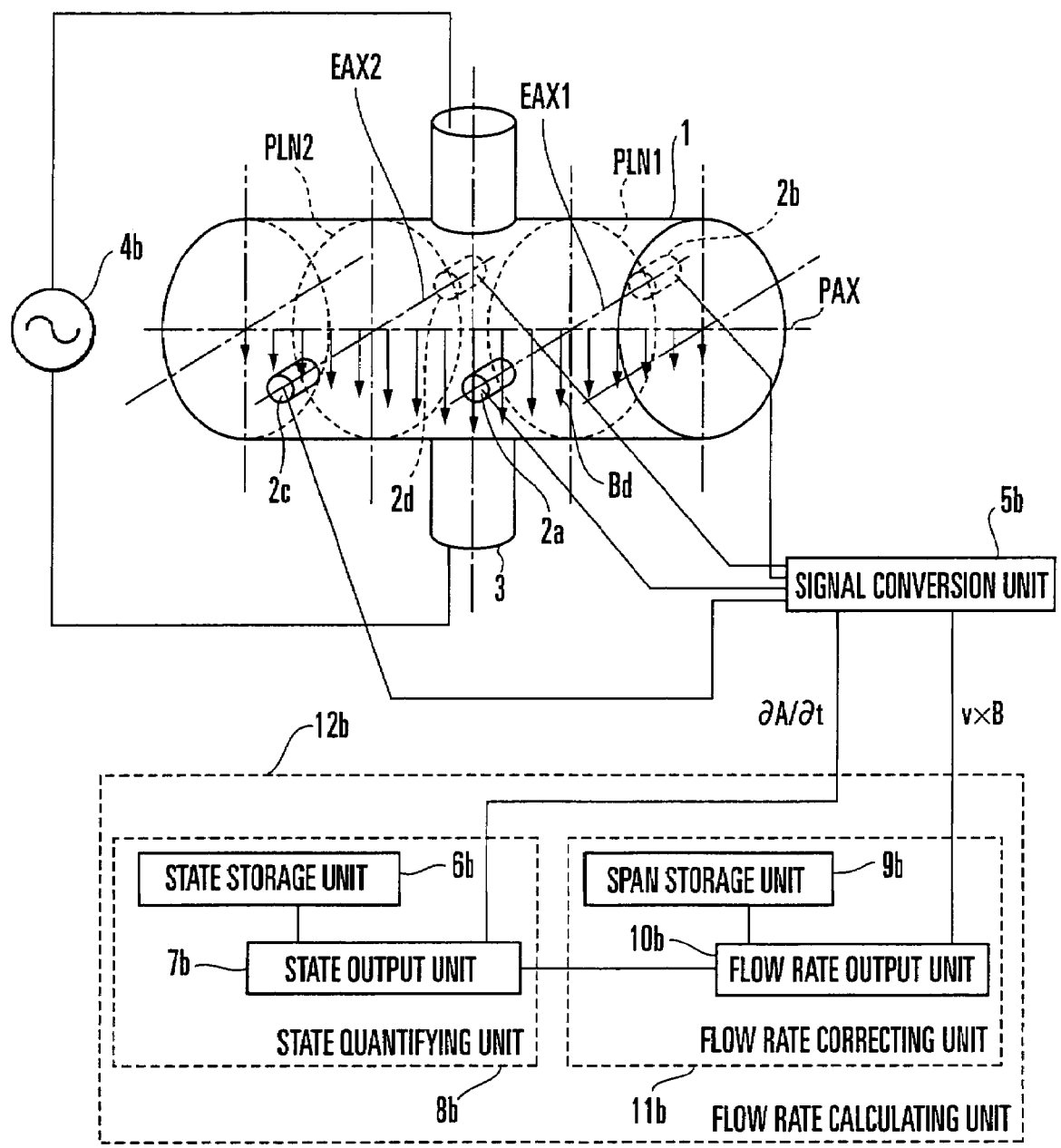
FIG. 23 is a block diagram showing the arrangement of an electromagnetic flowmeter according to the seventh embodiment of the present invention.

The specific arrangement and operation of the electromagnetic flowmeter according to this embodiment will be described next. FIG. 23 shows the arrangement of the electromagnetic flowmeter according to this embodiment. The same reference numerals as in FIG. 4 denote the same components in FIG. 23. The electromagnetic flowmeter of this embodiment includes a measuring tube 1, first electrodes 2a and 2b, second electrodes 2c and 2d, an exciting coil 3, a power supply unit 4b, a signal conversion unit 5b, and a flow rate calculation unit 12b. The signal conversion unit 5b obtains, at each of the first and second frequencies, an electromotive force difference between the first resultant electromotive force detected by the first electrodes 2a and 2b and the second resultant electromotive force detected by the second electrodes 2c and 2d which has the same frequency as that of the first resultant electromotive force, extracts, as the ∂A/∂t component, the difference between the electromotive force differences at the first and second frequencies, obtains, at each of the first and second frequencies, the electromotive force sum of the first and second resultant electromotive forces which have the same frequency, extracts, as the second ∂A/∂t component, the difference between the electromotive force sums at the first and second frequencies, and extracts the correction target v×B component by removing the second ∂A/∂t component from the electromotive force sum at the first frequency.

The exciting coil 3 and the power supply unit 4b constitute an exciting unit which applies a magnetic field to the fluid to be measured.

The flow rate calculating unit 12b comprises a state quantifying unit 8b and a flow rate correcting unit 11b. The state quantifying unit 8b includes a state storage unit 6b which stores in advance the relationship between the magnitude or phase of a variation component dependent on a parameter and the parameter, and a state output unit 7b which extracts the magnitude or phase of a variation component dependent on a parameter from the extracted first ∂A/∂t component, and obtains a parameter corresponding to the magnitude or phase of the extracted variation component on the basis of the relationship stored in the state storage unit 6b. The flow rate correcting unit 11b includes a span storage unit 9b which stores in advance the relationship between a parameter and the magnitude of a span variation component of a v×B component, and a flow rate output unit 10b which obtains, on the basis of the relationship stored in the span storage unit 9b, the magnitude of a span variation component corresponding to a parameter obtained by the state output unit, corrects, on the basis of the magnitude of the span variation component, the span of a v×B component to be corrected, and calculates the flow rate of the fluid from the corrected v×B component.

The power supply unit 4b repeats, in a T-sec cycle, the operation of continuing the first excitation state for T1 sec in which the exciting current with the first angular frequency ω0 is supplied to the exciting coil 3, and continuing the second excitation state for T2 sec in which the exciting current with the second angular frequency ω2 is supplied to the exciting coil 3. That is, T=T1+T2.

Figure 24:
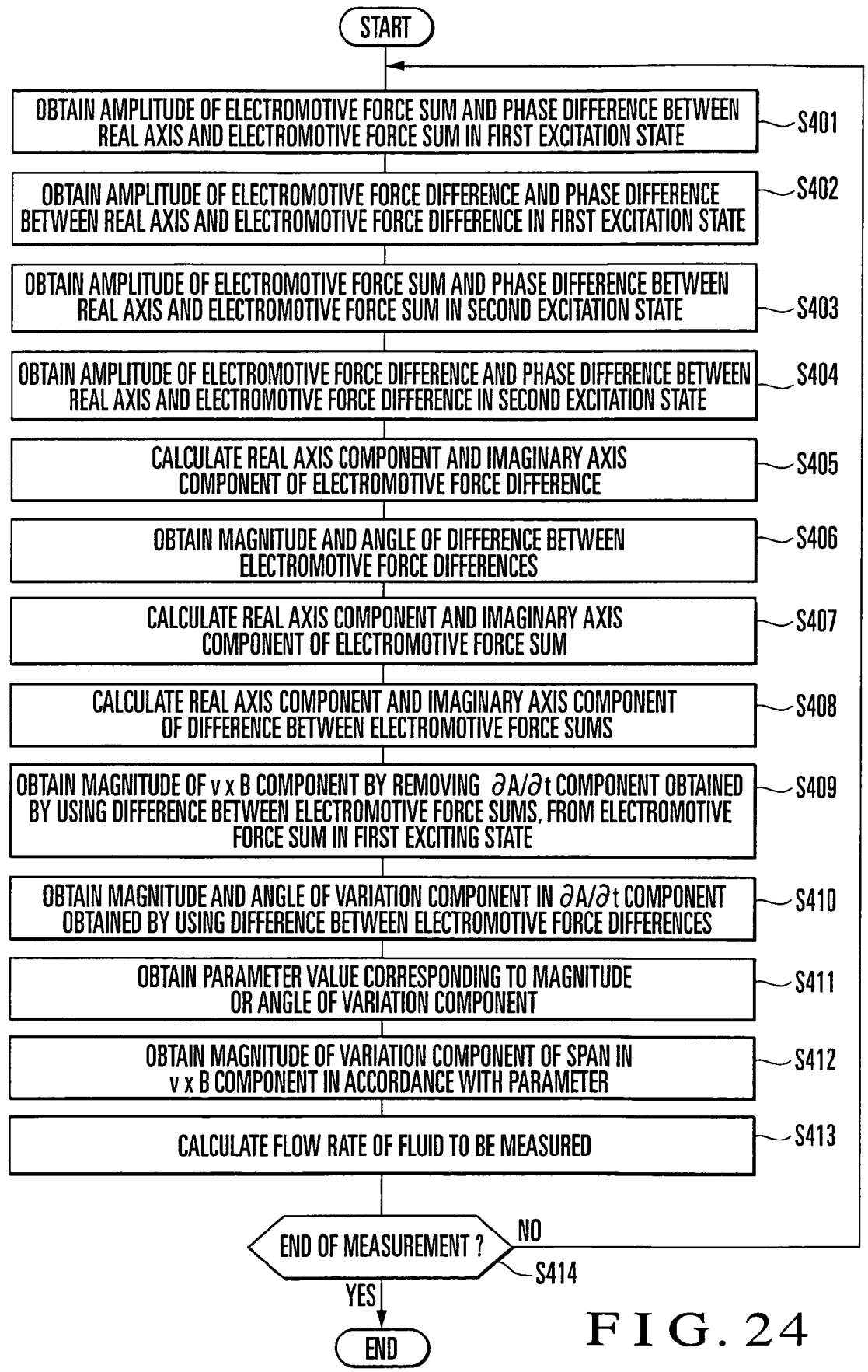
FIG. 24 is a flowchart showing the operations of a signal conversion unit and flow rate calculating unit in the seventh embodiment of the present invention.

FIG. 24 shows the operations of the signal conversion unit 5b and flow rate output unit 12b. First of all, the signal conversion unit 5b obtains an amplitude r430r of the sum E430s of the electromotive force of a component with the angular frequency ω0 of the first inter-electrode electromotive force between the electrodes 2a and 2b, and the electromotive force of a component with the angular frequency ω0 of the second inter-electrode electromotive force between the electrodes 2c and 2c, in the first excitation state, and obtains a phase difference φ430s between the real axis and the electromotive force sum E430s by using a phase detector (not shown) (step S401 in FIG. 24). The signal conversion unit 5b then obtains an amplitude r430d of the difference E430d between the electromotive force of a component with the angular frequency ω0 of the first inter-electrode electromotive force and the electromotive force of a component with the angular frequency ω0 of the second inter-electrode electromotive force, in the first excitation state, and obtains a phase difference φ430d between the real axis and the electromotive force difference E430d by using the phase detector (step S402).

In addition, the signal conversion unit 5b then obtains an amplitude r432s of the sum E432s of the electromotive force of a component with the angular frequency ω2 of the first inter-electrode electromotive force between the electrodes 2a and 2b and the electromotive force of a component with the angular frequency ω2 of the second inter-electrode electromotive force between the electrodes 2c and 2d, in the second excitation state, and obtains a phase difference φ432s between the real axis and the electromotive force sum E432s by using the phase detector (step S403). The signal conversion unit 5b then obtains an amplitude r432d of the difference E432d between the electromotive force of a component with the angular frequency ω2 of the first inter-electrode electromotive force and the electromotive force of a component with the angular frequency ω2 of the second inter-electrode electromotive force, in the second excitation state, and obtains a phase difference φ432d between the real axis and the electromotive force difference E432d by using the phase detector (step S404).

The signal conversion unit 5b then calculates a real axis component E430dx and imaginary axis component E430dy of the electromotive force difference E430d, and a real axis component E432dx and imaginary axis component E432dy of the electromotive force difference E432d according to the following equations (step S405):

$$E430dx = r430d \cdot \cos(\phi 430d) \quad (233)$$

$$E430dy = r430d \cdot \sin(\phi 430d) \quad (234)$$

$$E432dx = r432d \cdot \cos(\phi 432d) \quad (235)$$

$$E432dy = r432d \cdot \sin(\phi 432d) \quad (236)$$

After the calculation of equations (233) to (236), the signal conversion unit 5b obtains the magnitude and angle of the difference EdA41 between the electromotive force differences E430d and E432d (step S406). The processing in step S406 corresponds to the processing of obtaining a ∂A/∂t component, and is equivalent to the calculation of equation (222). The signal conversion unit 5b calculates a magnitude |EdA41| of the difference EdA41 according to the following equation:

$$|EdA41| = \qquad (237)$$
$$\{(E430dx - E432dx)^2 + (E430dy - E432dy)^2\}^{1/2} \cdot \omega 0 / (\omega 0 - \omega 2)$$

The signal conversion unit 5b then calculates an angle ∠EdA41 of the difference EdA41 with respect to the real axis according to the following equation:

$$\angle EdA41 = \tan^{-1}\{(E430dy - E432dy)/ \qquad (238)$$
$$(E430dx - E432dx)\}$$

With the above operation, the processing in step S406 is complete.

The signal conversion unit 5a then calculates a real axis component E430sx and imaginary axis component E430sy of the electromotive force sum E430s, and a real axis component E432sx and imaginary axis component E432sy of the electromotive force sum E432s according to the following equations (step S407):

$$E430sx = r430s \cdot \cos(\phi 430s) \qquad (239)$$

$$E430sy = r430s \cdot \sin(\phi 430s) \qquad (240)$$

$$E432sx = r432s \cdot \cos(\phi 432s) \qquad (241)$$

$$E432sy = r432s \cdot \sin(\phi 432s) \qquad (242)$$

After calculation of equations (239) to (242), the signal conversion unit 5b calculates a real axis component EdA42x and imaginary axis component EdA42y of the difference EdA42 between the electromotive force sums E430s and E432s according to the following equations (step S408):

$$EdA42x = (E430sx - E432sx) \cdot \omega 0/(\omega 0 - \omega 2) \qquad (243)$$

$$EdA42y = (E430sy - E432sy) \cdot \omega 0/(\omega 0 - \omega 2) \qquad (244)$$

Subsequently, the signal conversion unit 5b obtains an electromotive force EvB4 of the v×B component in the electromotive force sum E430s by removing a ∂A/∂t component (difference EdA42) from the electromotive force sum E430s (step S409). The processing in step S409 is equivalent to the calculation of equation (229). The signal conversion unit 5b calculates a magnitude |EvB4| of the electromotive force EvB4 based on a v×B component according to the following equation:

$$|EvB4| = \{(E430sx - EdA42sx)^2 + \qquad (245)$$
$$(E430sy - EdA42sy)^2\}^{1/2}$$

The state output unit 7b then extracts the magnitude rkg[h4] of the variation component Cg[h4] dependent on the parameter h4 and the angle θg[h4] with respect to the real axis from the difference EdA41 according to the following equations (step S410):

$$rkg[h4] = |EdA41|/(m3b \cdot \omega 0) \qquad (246)$$

$$\theta g[h4] = \angle EdA41 - \theta 3b \qquad (247)$$

Note that m3b and θ3b (the amplitude b3 of the magnetic field B3 generated from the first exciting coil 3, the amplitude b4 of the magnetic field B4 generated from the first exciting coil 3, and the phase difference θ3 between the magnetic field B3 and ω0·t, and Δθ4) are constants which can be obtained in advance by calibration or the like.

The relationship between the parameter h4 and the magnitude rkg[h4] of the variation component Cg[h4] in the ∂A/∂t component or the relationship between the parameter h4 and the angle θg[h4] of the variation component Cg[h4] is registered in advance in the state storage unit 6b in the form of a mathematical expression or table. The relationship between h4 and rkg[h4] or between h4 and θg[h4] can be obtained at the time of calibration.

The state output unit 7b calculates the value of the parameter h4 corresponding to rkg[h4] or θg[h4] by referring to the state storage unit 6b on the basis of the magnitude rkg[h4] or angle θg[h4] of the variation component Cg[h4] extracted in step S410 or acquires it from the state storage unit 6b (step S411).

The relationship between the parameter h4 and the magnitude rkf2[h4] of the span variation component Cf2[h4] in the v×B component is registered in advance in the span storage unit 9b in the form of a mathematical expression or table. The relationship between h4 and rkf2[h4] can be obtained at the time of calibration.

The flow rate output unit 10b calculates the magnitude rkf2[h4] of the variation component Cf2[h4] corresponding to the parameter h4 by referring to the span storage unit 9b on the basis of the parameter h4 obtained by the state output unit 7b or acquires it from the span storage unit 9b (step S412).

Finally, the flow rate output unit 10b calculates the magnitude Q of the flow rate of the fluid to be measured according to the following equation (step S413):

$$Q = |Evb4|/(rkf[h4] \cdot m4v) \qquad (248)$$

The flow rate calculating unit 12b performs the processing in steps S401 to S413 described above in a cycle T until, for example, the operator designates the end of the measurement (YES in step S414). Note that the processing in steps S404 to S414 is performed in the second excitation state for a duration of T2 sec.

As described above, this embodiment obtains the sum E430s of the angular frequency ω0 component of the first inter-electrode electromotive force and the angular frequency ω0 component of the second inter-electrode electromotive force, the difference E430d between the angular frequency ω0 component of the first inter-electrode electromotive force and the angular frequency ω0 component of the second inter-electrode electromotive force, the sum E432s of the angular frequency ω2 component of the first inter-electrode electromotive force and the angular frequency ω2 component of the second inter-electrode electromotive force, and the difference E432d between the angular frequency ω2 component of the first inter-electrode electromotive force and the angular frequency ω2 component of the second inter-electrode electromotive force. This embodiment also extracts the difference EdA41 (the first ∂A/∂t component) from the electromotive force differences E430d and E432d, extracts difference EdA42 (the second ∂A/∂t component) from the electromotive force sums E430s and E432s, extracts the electromotive force EvB4 (the v×B component) by removing the difference EdA42 from the electromotive force sum E430s, extract the magnitude or phase of the variation component Cg[h4] dependent on the parameter h4 from the difference EdA41, obtain the parameter h4 corresponding to the magnitude or phase of the variation component Cg[h4], and obtain the magnitude of the span variation component Cf2[h4] of the v×B component corresponding to the parameter h4, thereby correcting the span of the v×B component on the basis of the magnitude of the variation component Cf2[h4] of the span and calculating the flow rate of the fluid. Even if, therefore, the ratio of Cf2[h4]/Cg[h4] is not constant or the parameter h4 varies, the parameter h4 can be accurately detected regardless of the flow velocity of the fluid, and the flow rate of the fluid is corrected. This makes it possible to measure a flow rate with high accuracy.

In this embodiment, adjusting the distance d3 from the plane PLN3 including the axis of the exciting coil 3 to the first electrodes 2a and 2b and the distance d4 from the plane PLN3 to the second electrodes 2c and 2d allows the electromotive force sums E430s and E432s to be almost only electromotive forces based on v×B components, and also allows the electromotive force differences E430d and E432d to be almost only electromotive forces based on ∂A/∂t components. With this processing, this embodiment can extract a v×B component and a ∂A/∂t component more effectively, and can reduce computation errors more than the first and second embodiments.

Figure 25:
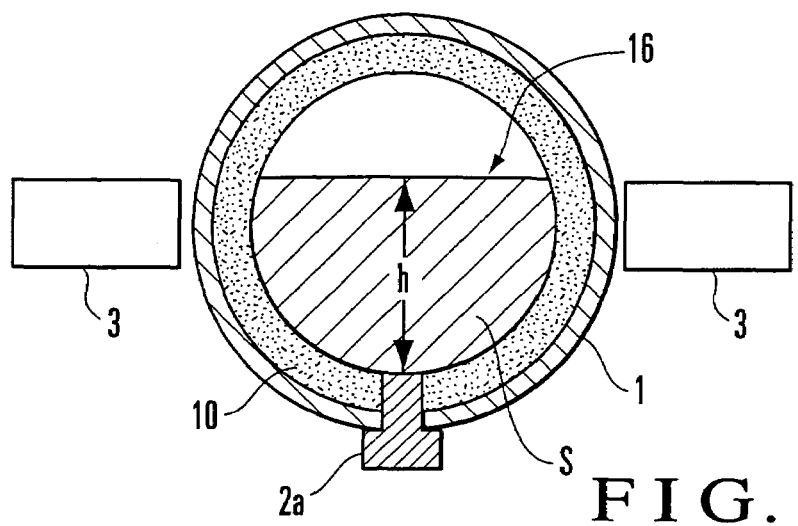
FIG. 25 is a sectional view showing an example of the arrangement of an exciting coil and an electrode used in the electromagnetic flowmeter according to the seventh embodiment of the present invention.
Figure 26:
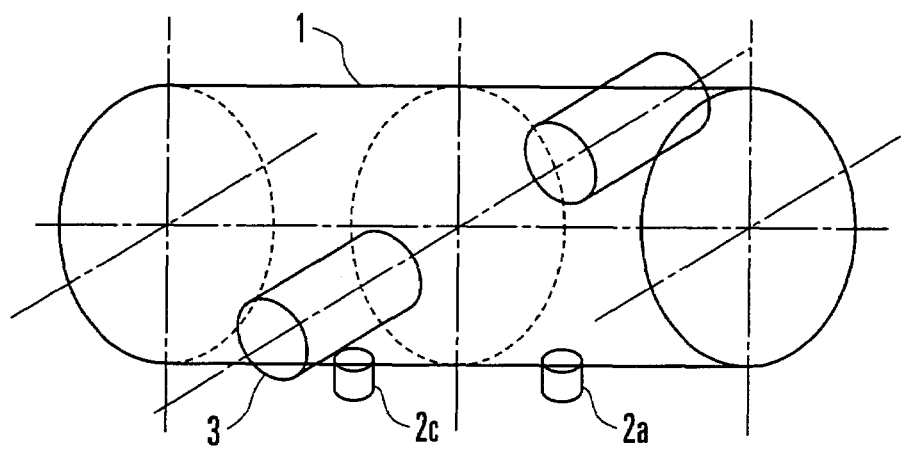
FIG. 26 is a perspective view showing an example of the arrangement of an exciting coil and electrodes used in the electromagnetic flowmeter according to the seventh embodiment of the present invention.

The following description will explain a specific example of the electromagnetic flowmeter of this embodiment which corrects the flow rate of a fluid 16 on the basis of a level h or sectional area S of the fluid 16 with the level h or sectional area S of the fluid 16 being the parameter h4. In this case, considering that the level h varies, as shown in FIGS. 25 and 26, the exciting coil 3 is arranged in a direction horizontal to the measuring tube 1, and the electrodes 2a and 2c is placed under the measuring tube 1. When each of the first and second electrodes is to be used in this manner, it suffices if an earth ring (not shown) for grounding the potential of the fluid 16 is provided on the measuring tube 1, and a potential difference between the electrode 2a and the ground potential is used as the first inter-electrode electromotive force, and a potential difference between the electrode 2c and the ground potential is detected as the second inter-electrode electromotive force by the signal conversion unit 5b.

Figure 27:
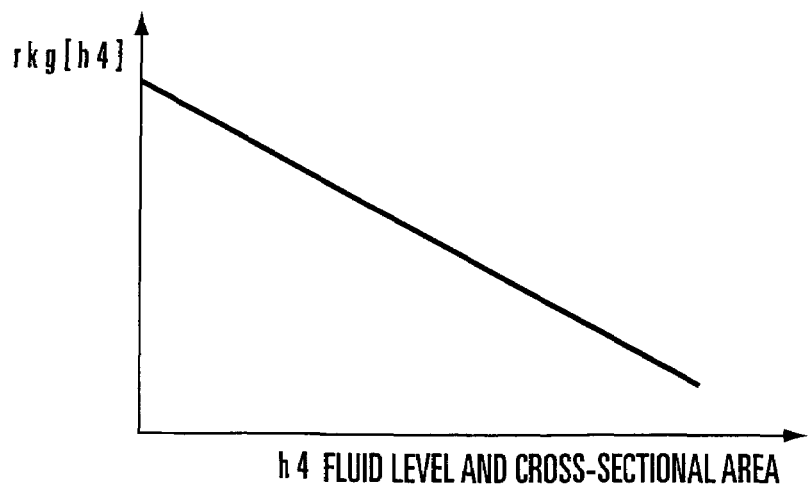
FIG. 27 is a graph showing an example of the relationship between the level or sectional area of a fluid and the magnitude of a variation component in a ∂A/∂t component in the seventh embodiment of the present invention.

As the level h or sectional area S of the fluid 16 varies, the value of the magnitude rkg[h4] of the variation component Cg[h4] in a ∂A/∂t component also varies. FIG. 27 shows an example of the relationship between the level h or sectional area S (parameter h4) of the fluid 16 and the magnitude rkg[h4] of the variation component Cg[h4]. The relationship shown in FIG. 27 changes depending on the shape or the like of the measuring tube 1. Therefore, obtaining this relationship by a theoretical formula at the time of design or measurement at the time of calibration and storing it in the state storage unit 6b in advance make it possible to obtain the level h or sectional area S of the fluid 16 in step S411 on the basis of the magnitude rkg[h4] of the variation component Cg[h4] obtained in step S410 and to correct the flow rate of the fluid 16 in steps S412 and S413 on the basis of the level h or sectional area S of the fluid 16.

The value of the magnitude rkg[h4] of the variation component Cg[h4] is irrelevant to the flow velocity and is larger when the level of the fluid is low than when the measuring tube is filled with the fluid. This property prevents a signal from becoming small when the level of a fluid becomes low as in a conventional electromagnetic flowmeter, and can ensure the high accuracy of flow rate measurement even when the level of the fluid becomes low.

Eighth Embodiment

The eighth embodiment of the present invention will be described next. This embodiment uses the third arrangement like the seventh embodiment. The eighth embodiment uses the first extraction method as a method of extracting a ∂A/∂t component from a resultant vector, and the second correction method as a flow rate correction method. Since the principle of this embodiment is the same as that of the seventh embodiment up to the point where the parameter h4 is obtained, only the difference after the parameter h4 is obtained will be described.

A normalized electromotive force EvBn4 obtained by normalizing an electromotive force EvB4 of a v×B component with a difference EdA41 between an electromotive force differences E430d and E432d and multiplying the resultant value by ω0 is represented by the following equation.

$$EvBn4 = EvB4/EdA41 \cdot \omega 0 \qquad (249)$$
$$= (rkf[h4]/rkg[h4]) \cdot V \cdot$$
$$\exp\{j \cdot (\theta f[h4] - \theta g[h4] - \pi/2)\}$$

The reason why the result obtained by normalizing the electromotive force EvB4 of the v×B component with the difference EdA41 is multiplied by ω0 is to erase the exciting angular frequency ω0 from coefficients applied to a magnitude V of the flow velocity.

According to equation (249), the magnitude V of the flow velocity of the fluid to be measured can be represented by $$V = |Evbn4|/(rkf[h4]/rkg[h4]) \qquad (250)$$

When a parameter associated with the volume of the fluid to be measured is used as h4, the sectional area of the fluid to be measured is represented as a function S[h4] of the parameter h4. At this time, equation (250) is rewritten to an equation for a flow rate as follows:

$$Q = |Evbn4|/\{(rkf[h4]/S[h4])/rkg[h4]\} \qquad (251)$$

Replacing rkf[h4]/S[h4] with one function rkf2[h4] makes it possible to rewrite equation (251) to the following equation:

$$Q = |Evbn4|/(rkf2[h4]/rkg[h4]) \qquad (252)$$

Since the relationship between the parameter h4 and a ratio rkf2[h4]/rkg[h4] of a variation component can be checked at the time of calibration, the value of the ratio rkf2[h4]/rkg[h4] of the variation component can be obtained from the value of the parameter h4. That is, the variation component of the span is corrected, and a magnitude Q of the flow rate can be obtained from the magnitude of a normalized electromotive force EvBn4.

Figure 28:
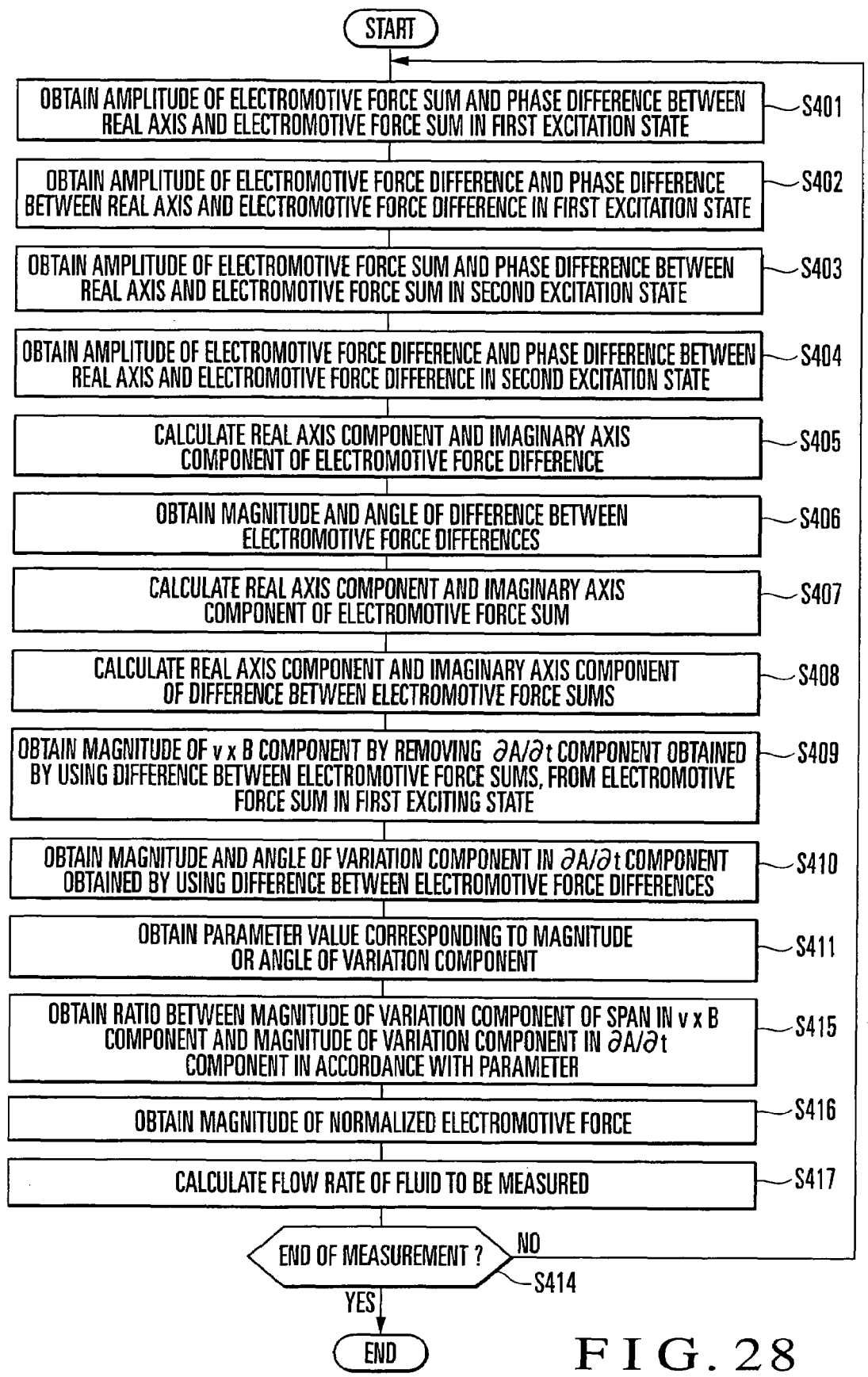
FIG. 28 is a flowchart showing the operations of a signal conversion unit and flow rate calculating unit in the eighth embodiment of the present invention.

A specific arrangement and operation of the electromagnetic flowmeter of this embodiment will be described next. The arrangement of the electromagnetic flowmeter of this embodiment is the same as in the seventh embodiment, and hence will be described with reference to the reference numerals in FIG. 23. The operation of a power supply unit 4b is the same as that in the seventh embodiment. FIG. 28 shows the operations of a signal conversion unit 5b and flow rate calculating unit 12b according to this embodiment. The same reference numerals as in FIG. 28 denote the same processes in FIG. 24.

The processing in steps S401 to S411 is the same as that in the seventh embodiment. The relationship between the parameter h4 and the ratio rkf2[h4]/rkg[h4] of a variation component is registered in advance in a span storage unit 9b in the form of a mathematical expression or table. The relationship between h4 and rkf2[h4]/rkg[h4] can be obtained at the time of calibration. In this case, rkg[h4] corresponds to both the ∂A/∂t component (difference EdA41) obtained from the difference between the electromotive force differences, and the ∂A/∂t component (difference EdA42) obtained from the difference between the electromotive force sums.

A flow rate output unit 10b calculates the ratio rkf2[h4]/rkg[h4] of the variation component corresponding to the parameter h4 by referring to the span storage unit 9b on the basis of the parameter h4 obtained by a state output unit 7b or acquires it from the span storage unit 9b (step S415).

The signal conversion unit 5b obtains a magnitude |EvBn4| of the normalized electromotive force EvBn4 obtained by normalizing the electromotive force EvB4 of the v×B component with the difference EdA41 according to the following equation (step S416). The processing in step S416 is equivalent to the calculation of equation (249).

$$|EvBn4|=|EvB4|/|EdA4|\cdot\omega 0 \quad (253)$$

Finally, the flow rate output unit 10b calculates the magnitude Q of the flow rate of the fluid to be measured according to the following equation (step S417):

$$Q=|Evbn4|/(rkf2[h4]/rkg[h4]) \quad (254)$$

The flow rate calculating unit 12b performs the processing in steps S401 to S411 and S415 to S417 described above in a cycle T until, for example, the operator designates the end of the measurement (YES in step S414). Note that the processing in steps S403 to S411, S415 to S417, and S414 is performed in the second excitation state for a duration of T2 sec.

In the above manner, this embodiment can obtain the same effects as those of the seventh embodiment.

This embodiment is configured to directly obtain the value of the ratio rkf2[h4]/rkg[h4] of the variation component corresponding to the parameter h4. However, it suffices to register the relationship between the parameter h4 and the magnitude rkg[h4] of the variation component Cg[h4] and the relationship between the parameter h4 and the magnitude rkf2[h4] of the variation component Cf2[h4] in the span storage unit 9b in advance, obtain the values of rkg[h4] and rkf2[h4] corresponding to the parameter h4 by referring to the span storage unit 9b, and obtain the ratio rkf2[h4]/rkg[h4] of the variation component from the obtained values.

In addition, the seventh and eighth embodiments have exemplified the case wherein the exciting angular frequency is switched to ω0 or ω2. However, performing excitation using exciting currents containing components with the angular frequencies ω0 and ω2 makes it unnecessary to switch the exciting frequencies. This can calculate the magnitude of the flow rate Q at higher speed. For example, it suffices to use the magnetic field represented by the following equation instead of equations (57) and (58).

$$B3=b3\cdot\cos(\omega 0\cdot t-\theta 3)+b3\cdot\cos(\omega 2\cdot t-\theta 3) \quad (255)$$

$$B4=b4\cdot\cos(\omega 0 t-\theta 4)+b4\cdot\cos(\omega 2\cdot t-\theta 4) \quad (256)$$

Ninth Embodiment

The ninth embodiment of the present invention will be described next. This embodiment uses the third arrangement described above. An electromagnetic flowmeter according to this embodiment includes one exciting coil and two pairs of electrodes, and has the same arrangement as that of the electromagnetic flowmeter shown in FIG. 4 except for the signal processing system. The principle of this embodiment will therefore be described by using reference numerals in FIG. 4. This embodiment uses the second extraction method as a method of extracting a ∂A/∂t component from a resultant vector, and the first correction method as a flow rate correction method.

Assume that the exciting current having an angular frequency ω0 is supplied to an exciting coil 3, and a parameter h5 is provided. In this case, a sum E530s of the first inter-electrode electromotive force between electrodes 2a and 2b and the second inter-electrode electromotive force between electrodes 2c and 2d is represented by the following equation according to equations (69), (93), and (99).

$$E530s = rkg[h5]\cdot\exp\{j\cdot(\theta 3+\theta g[h5])\}\cdot \quad (257)$$
$$\exp(j\cdot\pi/2)\cdot\{b3-b4\cdot\exp(j\cdot\Delta\theta 4)\}\cdot\omega 0 +$$
$$rkf[h5]\cdot\exp\{j\cdot(\theta 3+\theta f[h5])\}\cdot$$
$$\{b3+b4\cdot\exp(j\cdot\Delta\theta 4)\}\cdot V$$

Assume that the first exciting current having an angular frequency ω0 is supplied to the exciting coil 3, and the parameter h5 is provided. In this case, a difference E530d between the first inter-electrode electromotive force between electrodes 2a and 2b and the second inter-electrode electromotive force between electrodes 2c and 2d is represented by the following equation according to equations (70), (93), and (99).

$$E530d = rkg[h5]\cdot\exp\{j\cdot(\theta 3+\theta g[h5])\}\cdot \quad (258)$$
$$\exp(j\cdot\pi/2)\cdot\{b3+b4\cdot\exp(j\cdot\Delta\theta 4)\}\cdot\omega 0 +$$
$$rkf[h5]\cdot\exp\{j\cdot(\theta 3+\theta f[h5])\}\cdot$$
$$\{b3-b4\cdot\exp(j\cdot\Delta\theta 4)\}\cdot V$$

If the magnetic fields B3 and B4 generated from the exciting coil 3 are set to be equal to each other in the initial state (at the time of calibration), the difference between the magnetic fields B3 and B4 decreases afterward. The following approximate expression holds in equation (258):

$$|b3+b4\cdot\exp(j\cdot\Delta\theta 4)| \gg |b3-b4\cdot\exp(j\cdot\Delta\theta 4)| \quad (259)$$

$$|rkg[h5]\cdot\omega 0\cdot\{b3+b4\cdot\exp(j\cdot\Delta\theta 4)\}| \gg \quad (260)$$
$$|rkf[h5]\cdot V\cdot\{b3-b4\cdot\exp(j\cdot\Delta\theta 4)\}|$$

The following expressions represent an electromotive force difference EdA5 which approximates the electromotive force difference E530d in equation (258) by using the condition of expression (260).

$$EdA5 \sim E530d \quad (261)$$

$$EdA5 = rkg[h5]\cdot\exp\{j\cdot\theta g[h5]\}\cdot \quad (262)$$
$$\exp\{j\cdot(\pi/2+\theta 3)\}\cdot\{b3+b4\cdot\exp(j\cdot\Delta\theta 4)\}\cdot\omega 0$$

In equation (261), the ∂A/∂t component in the resultant vector can be extracted by using the difference between the inter-electrode electromotive forces. Equation (262) is irrelevant to the magnitude V of the flow velocity, and hence is only the component generated by ∂A/∂t. The fluid state except for the flow velocity, and the state in the tube can be measured by using the electromotive force difference EdA5.

A variation component dependent on the parameter h5 in the ∂A/∂t component is represented by Cg[h5]=rkg[h5]·exp(j·θg[h5]), and the remaining portion of the ∂A/∂t component is a constant which is provided at the time of calibration. The variation component Cg[h5] is represented by equation (262).

$$Cg[h5] = EdA5 / [\exp\{j \cdot (\pi/2 + \theta 3)\} \cdot \qquad (263)$$
$$\{b3 + b4 \cdot \exp(j \cdot \Delta\theta 4)\} \cdot \omega 0]$$

Letting m3b be the magnitude of $[\exp\{j \cdot (\pi/2+\theta 3)\} \cdot \{b3+b4 \cdot \exp(j \cdot \Delta\theta 4)\}]$, and letting θ3b be the angle, m3b and θ3b are represented by equations (224) and (225).

Upon applying equations (224) and (225) to equation (263), a magnitude rkg[h5] of the variation component Cg[h5] and an angle θg[h5] thereof from the real axis are represented by $$rkg[h5] = |EdA5|/(m3b \cdot \omega 0) \qquad (264)$$

$$\theta g[h5] = \angle EdA5 - \theta 3b) \qquad (265)$$

The parameter h5 can be obtained from the relationship between the parameter h5 and the variation component Cg[h5], which is checked in advance by measurement or the like at the time of calibration, or the relationship between the parameter h5 and the angle θg[h5] of the variation component Cg[h5]. A span as a coefficient applied to the magnitude V of the flow velocity of the v×B component is corrected by using the obtained parameter h5.

As described above, it is convenient to obtain the v×B component from the sum of the inter-electrode electromotive forces although it is convenient to obtain the parameter h5 from the difference between the inter-electrode electromotive forces upon extracting the ∂A/∂t component.

The v×B component can also be extracted by using the different frequencies as in the seventh embodiment. However, as described in equation (218), when the distance d3 from the plane PLN3 including the axis of the exciting coil 3 to an electrode axis EAX1 connecting the electrodes 2a and 2b is substantially equal to the distance d4 from the plane PLN3 to the electrode axis EAX2 connecting the electrodes 2c and 2d, the electromotive force sum E530s in equation (257) can be assumed to be the electromotive force of only the v×B component. In this case, the electromotive force EvB5 of the v×B component is represented by the following equation.

$$EvB5 = rkf[h5] \cdot \exp\{j \cdot (\theta 3 + \theta f[h5])\} \cdot \qquad (266)$$
$$\{b3 + b4 \cdot \exp(j \cdot \Delta\theta 4)\} \cdot V$$

The magnitude V of the flow velocity of the fluid to be measured can be expressed, using m3b in equation (224), by the following equation according to equation (266).

$$V = |EvB5|/(rkf[h5] \cdot m3b) \qquad (267)$$

When a parameter associated with the volume of a fluid, e.g., the level of the fluid or the amount of air bubbles mixed, is used as the parameter h5, the sectional area of the fluid is represented as a function S[h5] of the parameter h5. At this time, equation (267) is rewritten to an equation for a flow rate Q as follows:

$$Q = |EvB5|/\{rkf[h5]/S[h5] - m3b\} \qquad (268)$$

Replacing rkf[h5]/S[h5] with one function rkf2[h5] makes it possible to rewrite equation (268) to the following equation:

$$Q = |EvB5|/(rkf2[h5] \cdot m3b) \qquad (269)$$

Since the relationship between the parameter h5 and the magnitude rkf2[h5] of a variation component Cf2[h5] can be checked at the time of calibration, the magnitude rkf2[h5] of the variation component Cf2[h5] can be obtained from the value of the parameter h5. That is, a span variation component can be corrected. In addition, since m3b is a known value, the magnitude Q of the flow rate can be obtained from the magnitude of an electromotive force Evb5 of a v×B component.

The specific arrangement and operation of the electromagnetic flowmeter according to this embodiment will be described next. The electromagnetic flowmeter according to this embodiment has the same arrangement as that of the electromagnetic flowmeter in the seventh embodiment. Hence, the same reference numerals as in FIG. 23 denote the same components in this embodiment. The electromagnetic flowmeter of this embodiment includes a measuring tube 1, first electrodes 2a and 2b, second electrodes 2c and 2d, the exciting coil 3, a power supply unit 4b, a signal conversion unit 5b which extracts a ∂A/∂t component from the electromotive force difference between the first resultant electromotive force detected by the first electrodes 2a and 2b and the second resultant electromotive force detected by the second electrodes 2c and 2d, and extracts the correction target v×B component from the electromotive force sum of the first and second resultant electromotive forces, and a flow rate calculating unit 12b.

The flow rate calculation unit 12b includes a state quantifying unit 8b and flow rate correcting unit 11b. The state quantifying unit 8b includes a state storage unit 6b and state output unit 7b. The flow rate correcting unit 11b includes a span storage unit 9b and flow rate output unit 10b.

Figure 29:
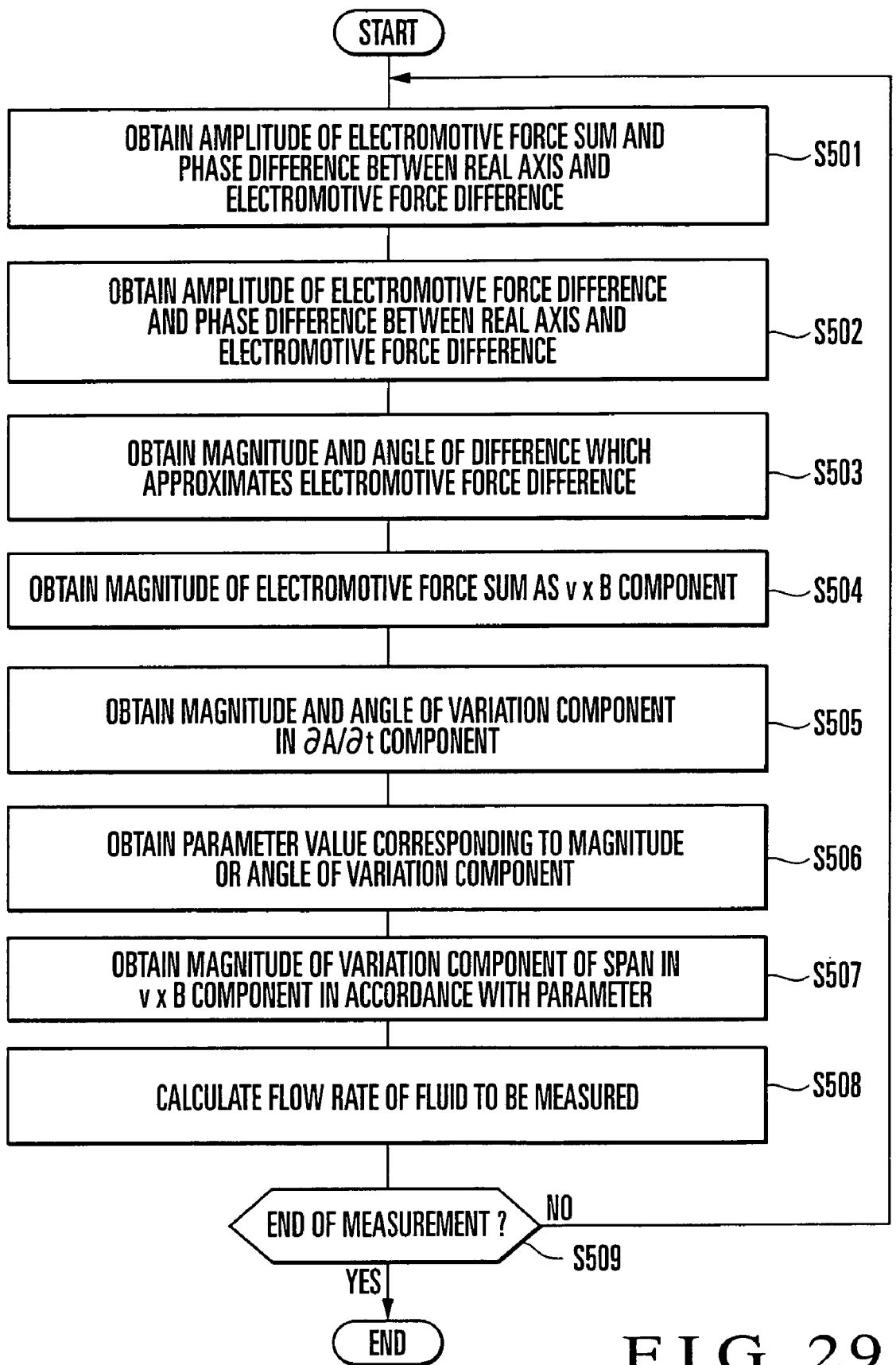
FIG. 29 is a flowchart showing the operations of a signal conversion unit and flow rate calculating unit in the ninth embodiment of the present invention.

The power supply unit 4b supplies the exciting current with the angular frequency ω0 to the exciting coil 3. FIG. 29 is a flowchart showing the operations of the signal conversion unit 5b and flow rate calculation unit 12b according to this embodiment. First of all, the signal conversion unit 5b obtains an amplitude r530s of the sum E530s of the electromotive force with the angular frequency ω0 component of the first inter-electrode electromotive force between the electrodes 2a and 2b and the electromotive force with the angular frequency ω0 component of the second inter-electrode electromotive force between the electrodes 2c and 2d, and obtains a phase difference 530s between the real axis and the electromotive force sum E530s by using a phase detector (not shown) (step S501 in FIG. 29). Subsequently, the signal conversion unit 5b obtains an amplitude r530d of the difference E530d between the electromotive force with the angular frequency ω0 component of the first inter-electrode electromotive force and the electromotive force with the angular frequency ω0 component of the second inter-electrode electromotive force, and obtains a phase difference φ530d between the real axis and the electromotive force difference E530d by using the phase detector (step S502).

Next, the signal conversion unit 5b obtains the magnitude and angle of the electromotive force difference EdA5 which approximates the electromotive force difference E530d (step S503). The processing in step S503 corresponds to the processing of obtaining the ∂A/∂t component, and is equivalent to the calculation of equation (262). The signal conversion unit 5b calculates a magnitude |EdA5| of the electromotive force difference EdA5 according to the following equation:

$$|EdA5|=r530d \quad (270)$$

The signal conversion unit 5b then calculates an angle ∠EdA5 of the inter-electrode electromotive force EdA5 with respect to the real axis according to the following equation:

$$\angle EdA5=\phi 530d \quad (271)$$

With the above operation, the processing in step S503 is complete.

Subsequently, the signal conversion unit 5b obtains an electromotive force EvB5 of the v×B component in the electromotive force sum E530s (step S504). The signal conversion unit 5b calculates a magnitude |EVB5| of the electromotive force EvB5 based on a v×B component according to the following equation:

$$|EvB5|=r530s \quad (272)$$

The state output unit 7b then extracts the magnitude rkg[h5] of the variation component Cg[h5] dependent on the parameter h5 and the angle θg[h5] with respect to the real axis from the electromotive force difference EdA5 according to the following equations (step S505):

$$rkg[h5]=|EvA5|/(m3b \cdot \omega 0). \quad (273)$$

$$\theta g[h5]=\angle EdA5-\theta 3b \quad (274)$$

Note that m3b and θ3b (amplitudes b3 and b4 of the magnetic fields B3 and B4 generated from the exciting coil 3, the phase difference θ3 between ω0·t and the magnetic field B3, and Δθ4) are constants which can be obtained in advance by calibration or the like.

The relationship between the parameter h5 and the magnitude rkg[h5] of the variation component Cg[h5] in the ∂A/∂t component or the relationship between the parameter h5 and the angle θg[h5] of the variation component Cg[h5] is registered in advance in the state storage unit 6b in the form of a mathematical expression or table. The relationship between h5 and rkg[h5] or between h5 and θg[h5] can be obtained at the time of calibration.

The state output unit 7b calculates the value of the parameter h5 corresponding to rkg[h5] or θg[h5] by referring to the state storage unit 6b on the basis of the magnitude rkg[h5] or angle θg[h5] of the variation component Cg[h5] extracted in step S505 or acquires it from the state storage unit 6b (step S506).

The relationship between the parameter h5 and the magnitude rkf2[h5] of the variation component Cf2[h5] in the v×B component is registered in advance in the span storage unit 9b in the form of a mathematical expression or table. The relationship between h5 and rkf2[h5] can be obtained at the time of calibration.

The flow rate output unit 10b calculates the magnitude rkf2[h5] of the variation component Cf2[h5] corresponding to the parameter h5 by referring to the span storage unit 9b on the basis of the parameter h5 obtained by the state output unit 7b or acquires it from the span storage unit 9b (step S507).

Finally, the flow rate output unit 10b calculates the magnitude Q of the flow rate of the fluid to be measured according to the following equation (step S508):

$$Q=|Evb5|/(rkf2[h5]/\cdot m3b) \quad (275)$$

The flow rate calculating unit 12b performs the processing in steps S501 to S508 described above in a predetermined cycle until, for example, the operator designates the end of the measurement (YES in step S509).

As described above, according to this embodiment, note that when the magnitudes of the magnetic fields B3 and B4 generated from the exciting coil 3 are adjusted to be equal to each other, the electromotive force difference E530d can be approximately extracted as the ∂A/∂t component, and the electromotive force sum E530s can be approximately extracted as the v×B component. This embodiment is configured to extract the magnitude or phase of the variation component Cg[h5] dependent on the parameter h5 from the ∂A/∂t component, obtain the parameter h5 corresponding to the magnitude or phase of the variation component Cg[h5], and obtain the magnitude of the span variation component Cf2[h5] of the v×B component corresponding to the parameter h5, thereby correcting the span of the v×B component on the basis of the magnitude of the variation component Cf2[h5] of the span and calculating the flow rate of the fluid. Even if, therefore, the ratio of Cf2[h5]/Cg[h5] is not constant or the parameter h5 varies, the parameter h5 can be accurately detected regardless of the flow velocity of the fluid, and the flow rate of the fluid is corrected. This makes it possible to measure a flow rate with high accuracy.

10th Embodiment

The 10th embodiment of the present invention will be described next. This embodiment uses the third arrangement like the ninth embodiment. The 10th embodiment uses the second extraction method as a method of extracting a ∂A/∂t component from a resultant vector, and the second correction method as a flow rate correction method. Since the principle of this embodiment is the same as that of the ninth embodiment up to the point where the parameter h5 is obtained, only the difference after the parameter h5 is obtained will be described.

A normalized electromotive force EvBn5 obtained by normalizing an electromotive force EvB5 of a v×B component with an electromotive force difference EdA5 and multiplying the resultant value by ω0 is represented by the following equation.

$$EvBn5 = EvB5/EdA5 \cdot \omega 0 \quad (276)$$
$$= (rkf[h5]/rkg[h5]) \cdot V \cdot$$
$$\exp\{j \cdot (\theta f[h5]-\theta g[h5]-\pi/2)\}$$

The reason why the result obtained by normalizing the electromotive force EvB5 of the v×B component with the electromotive force difference EdA5 is multiplied by ω0 is to erase the exciting angular frequency ω0 from coefficients applied to a magnitude V of the flow velocity.

According to equation (276), the magnitude V of the flow velocity of the fluid to be measured can be represented by $$V=|Evbn5|/(rkf[h5]/rkg[h5]) \quad (277)$$

When a parameter associated with the volume of the fluid to be measured is used as h5, the sectional area of the fluid to be measured is represented as a function S[h5] of the parameter h5. At this time, equation (277) is rewritten to an equation for a flow rate as follows:

$$Q=|Evbn5|/\{(rkf[h5]/S[h5])/rkg[h5]\} \quad (278)$$

Replacing rkf[h5]/S[h5] with one function rkf2[h5] makes it possible to rewrite equation (278) to the following equation:

$$Q=|Evbn5|/(rkf2[h5]/rkg[h5]) \quad (279)$$

Since the relationship between the parameter h5 and a ratio rkf2[h5]/rkg[h5] of a variation component can be checked at the time of calibration, the value of the ratio rkf2[h5]/rkg[h5] of the variation component can be obtained from the value of the parameter h5. That is, the variation component of the span is corrected, and a magnitude Q of the flow rate can be obtained from the magnitude of the normalized electromotive force Evbn5.

Figure 30:
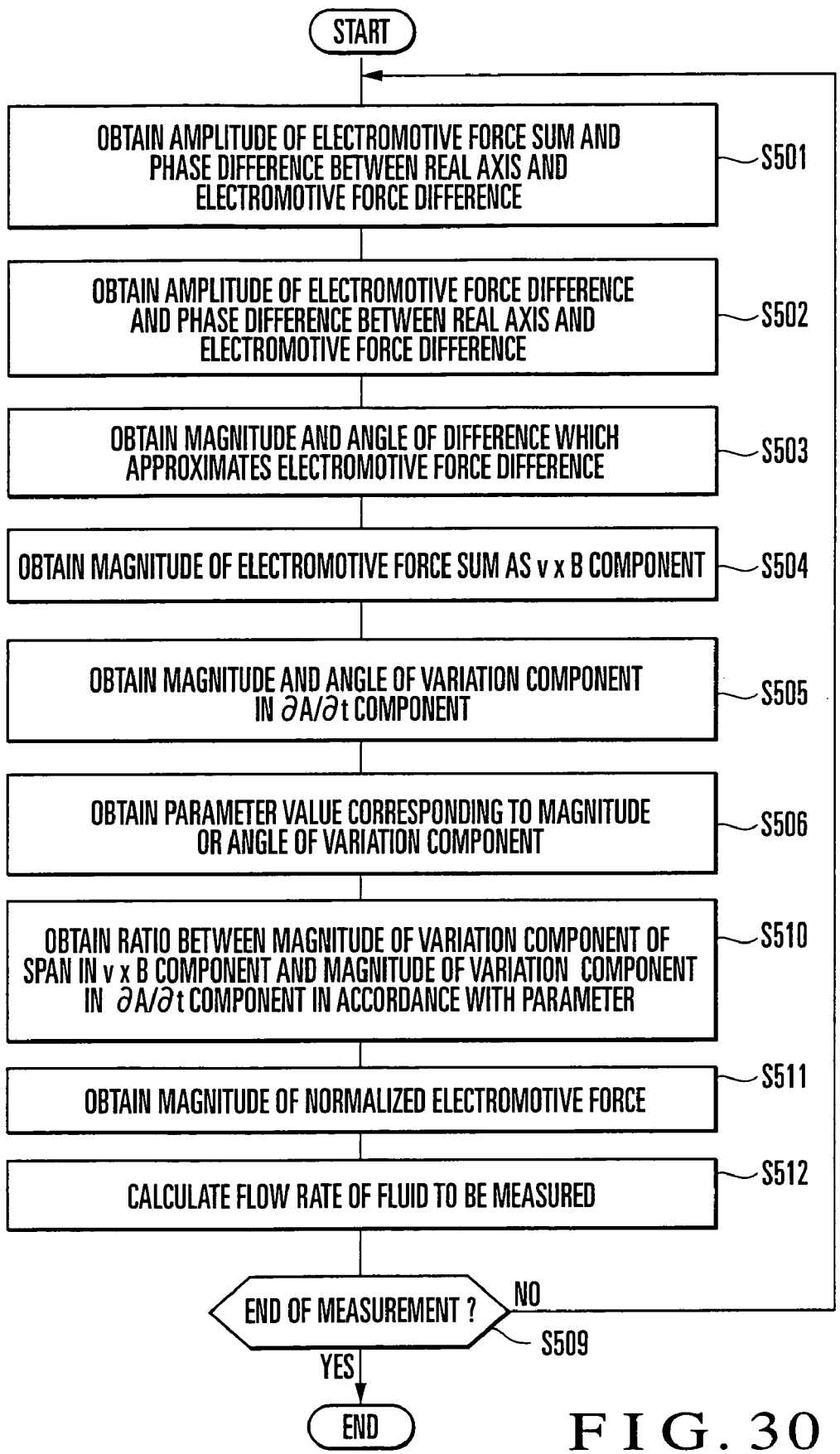
FIG. 30 is a flowchart showing the operations of a signal conversion unit and flow rate calculating unit in the 10th embodiment of the present invention.

A specific arrangement and operation of the electromagnetic flowmeter of this embodiment will be described next. The arrangement of the electromagnetic flowmeter of this embodiment is the same as in the ninth embodiment, and hence will be described with reference to the reference numerals in FIG. 23. The operation of a power supply unit 4b is the same as that in the ninth embodiment. FIG. 30 shows the operations of a signal conversion unit 5b and flow rate calculating unit 12b according to this embodiment. The same reference numerals as in FIG. 30 denote the same processes in FIG. 29.

The processing in steps S501 to S506 is the same as that in the ninth embodiment. The relationship between the parameter h5 and the ratio rkf2[h5]/rkg[h5] of a variation component is registered in advance in a span storage unit 9b in the form of a mathematical expression or table. The relationship between h5 and rkf2[h5]/rkg[h5] can be obtained at the time of calibration.

A flow rate output unit 10b calculates the ratio rkf2[h5]/rkg[h5] of the variation component corresponding to the parameter h5 by referring to the span storage unit 9b on the basis of the parameter h5 obtained by a state output unit 7b or acquires it from the span storage unit 9b (step S510 in FIG. 30).

The signal conversion unit 5b obtains a magnitude |EvBn5| of the normalized electromotive force EvBn5 obtained by normalizing the electromotive force EvB5 of the v×B component with the electromotive force difference EdA5 according to the following equation (step S511). The processing in step S511 is equivalent to the calculation of equation (276).

$$|EvBn5|=|EvB5|/|EdA5|\cdot\omega0 \quad (280)$$

Finally, the flow rate output unit 10b calculates the magnitude Q of the flow rate of the fluid to be measured according to the following equation (step 512):

$$Q=|Evbn5|/(rkf2[h5]/rkg[h5]) \quad (281)$$

The flow rate calculating unit 12b performs the processing in steps S501 to S506 and S510 to S512 described above in a predetermined cycle until, for example, the operator designates the end of the measurement (YES in step S509).

In the above manner, this embodiment can obtain the same effects as those of the ninth embodiment.

This embodiment is configured to directly obtain the value of the ratio rkf2[h5]/rkg[h5] of the variation component corresponding to the parameter h5. However, it suffices to register the relationship between the parameter h5 and the magnitude rkg[h5] of the variation component Cg[h5] and the relationship between the parameter h5 and the magnitude rkf2[h5] of the variation component Cf2[h5] in the span storage unit 9b in advance, obtain the values of rkg[h5] and rkf2[h5] corresponding to the parameter h5 by referring to the span storage unit 9b, and obtain the ratio rkf2[h5]/rkg[h5] of the variation component from the obtained values.

Figure 31:
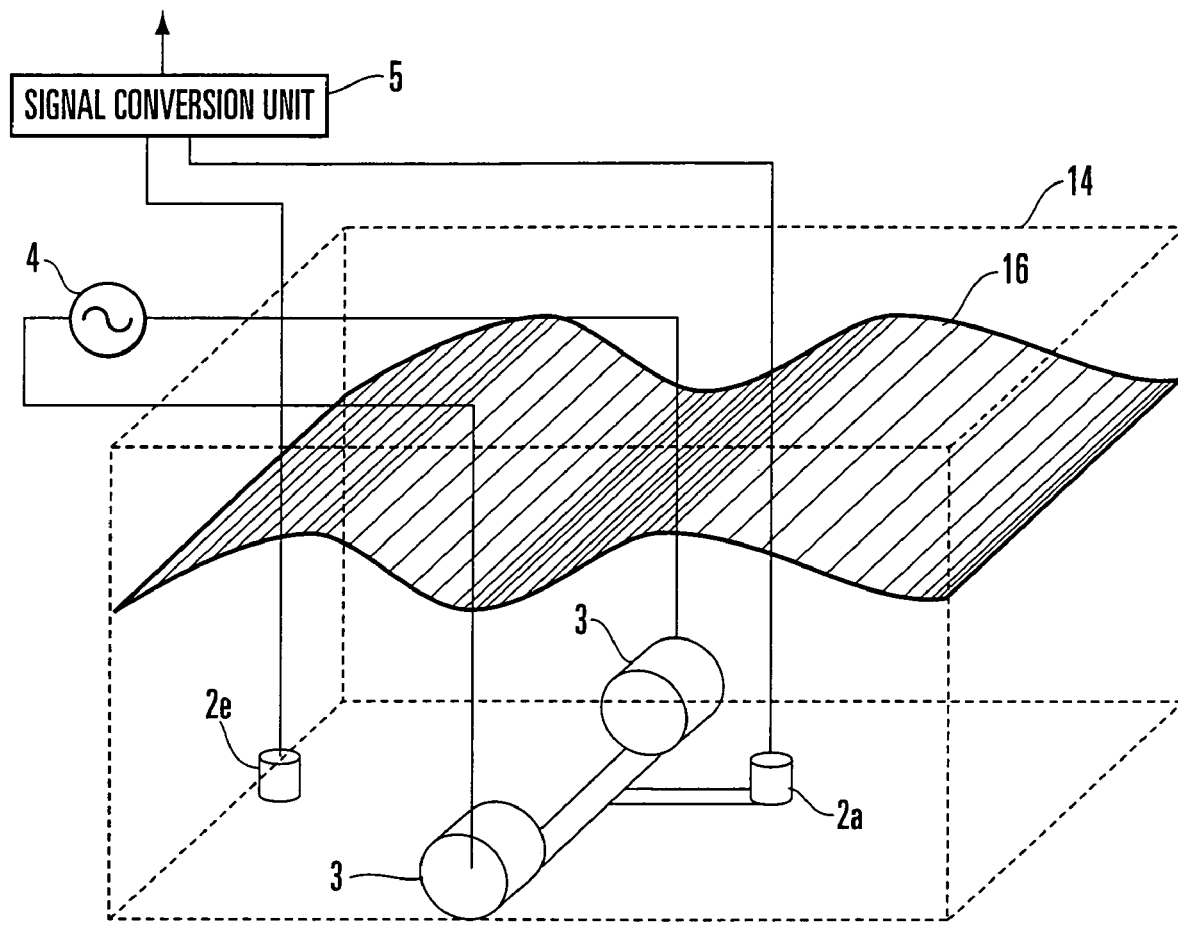
FIG. 31 is a view showing an arrangement in which the electromagnetic flowmeter according to the first and second embodiments is placed in an existing channel.
Figure 32:
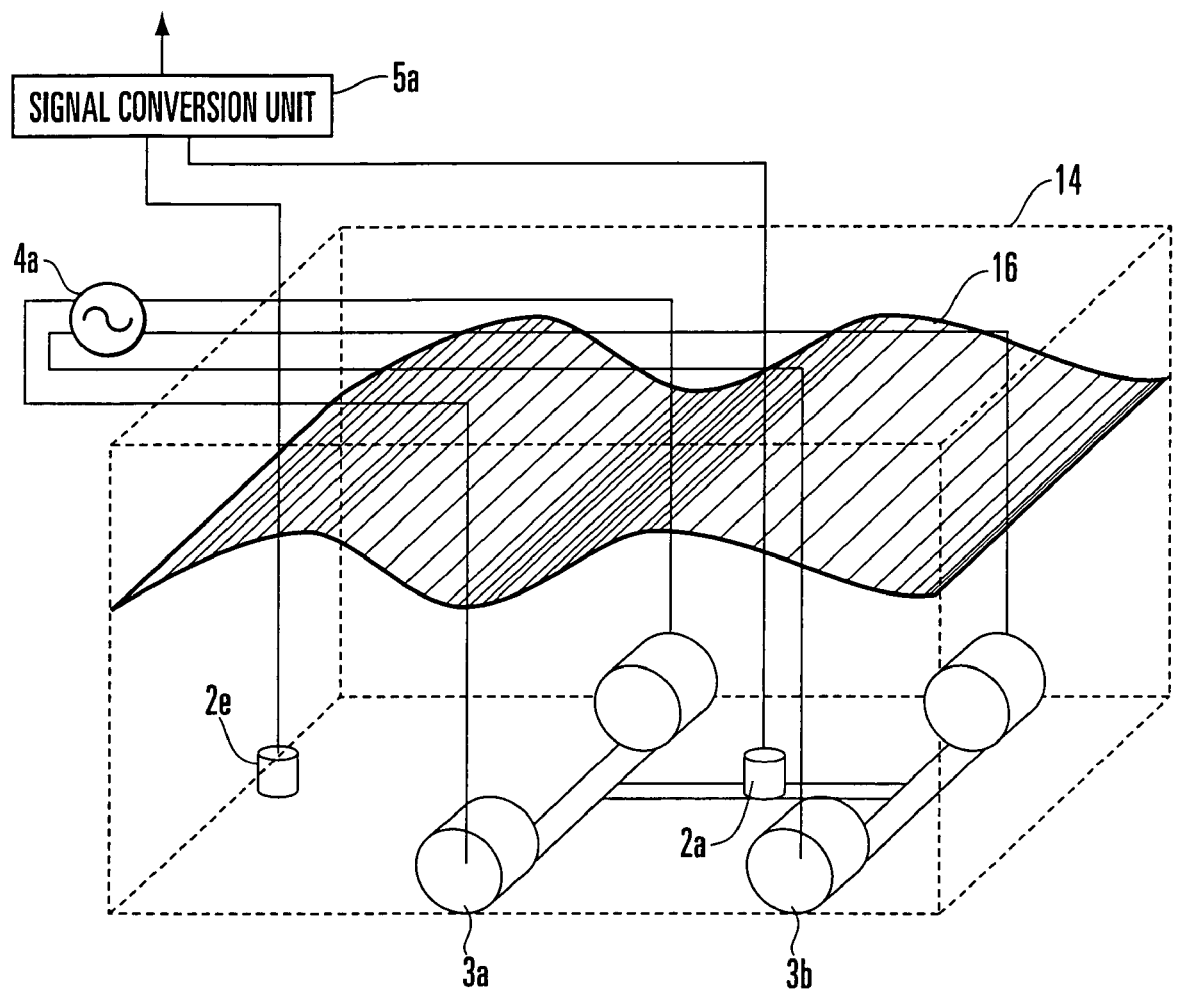
FIG. 32 is a view showing an arrangement in which the electromagnetic flowmeter according to the third to sixth embodiments is placed in an existing channel.
Figure 33:
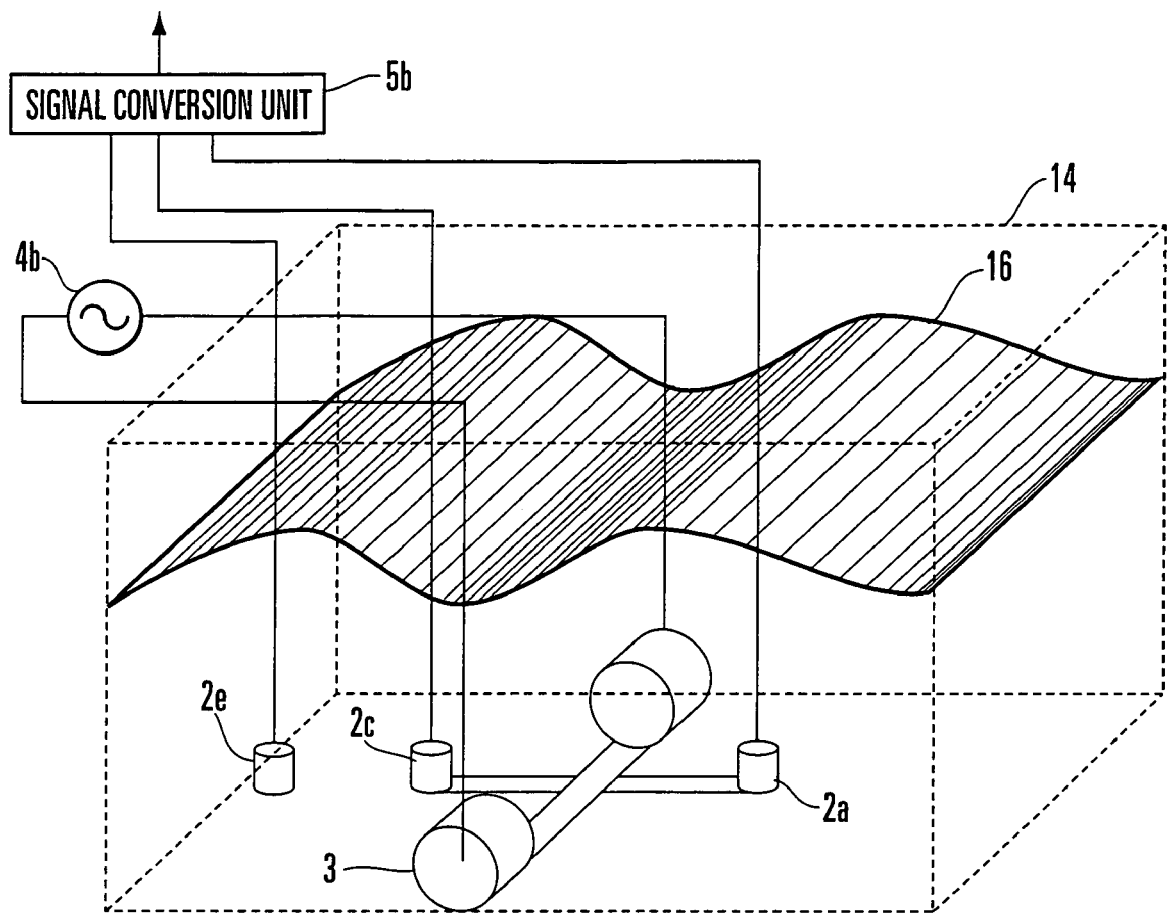
FIG. 33 is a view showing an arrangement in which the electromagnetic flowmeter according to the seventh to 10th embodiments is placed in an existing channel.

Note that the first to 10th embodiments have exemplified the electromagnetic flowmeter including the measuring tube 1. However, placing the arrangement from which the measuring tube 1 is omitted in an existing channel makes it possible to form the electromagnetic flowmeter of the present invention. FIG. 31 shows an arrangement in which the electromagnetic flowmeter according to the first and second embodiments is placed in an existing channel. FIG. 32 shows an arrangement in which the electromagnetic flowmeter according to the third to sixth embodiments is placed in an existing channel. FIG. 33 shows an arrangement in which the electromagnetic flowmeter according to the seventh to 10th embodiments is placed in an existing channel.

Referring to FIGS. 31 to 33, reference numeral 2e denotes a ground electrode; and 14, an existing channel. In each of the cases shown in FIGS. 31 and 32, it suffices if the signal conversion unit 5 or 5a detects the potential difference between the electrode 2a and the ground electrode 2e as an inter-electrode electromotive force. In the case shown in FIG. 33, it suffices if the signal conversion unit 5b detects the potential difference between the electrode 2a and the ground electrode 2e as the first inter-electrode electromotive force, and the potential difference between the electrode 2c and the ground electrode 2e as the second inter-electrode electromotive force.

In each of the first to 10th embodiments, the components of the signal conversion unit 5, 5a, or 5b and flow rate calculating unit 12, 12a, or 12b, except for the electromotive force detecting unit, can be implemented by a computer comprising a CPU, storage unit, and interface and programs which control the hardware resources. The CPU executes the above processing in accordance with the programs stored in the storage unit.

In addition, each of the first to 10th embodiments uses the sine wave excitation scheme using a sine wave as an exciting current. However, each embodiment may use the rectangular wave excitation scheme using a rectangular wave as an exciting current because a rectangular wave can be regarded as a combination of sine waves.

Figure 34:
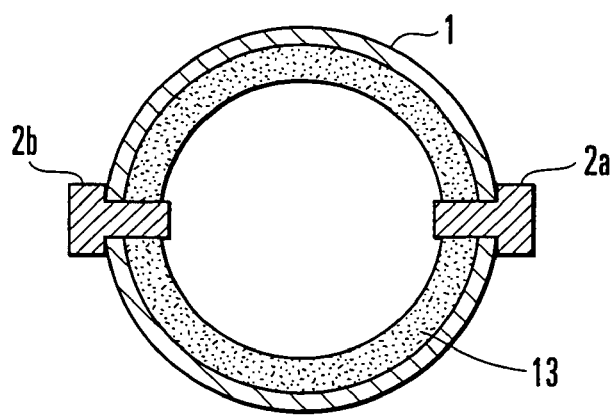
FIG. 34 is a sectional view showing an example of an electrode used in the electromagnetic flowmeter of the present invention.
Figure 35:
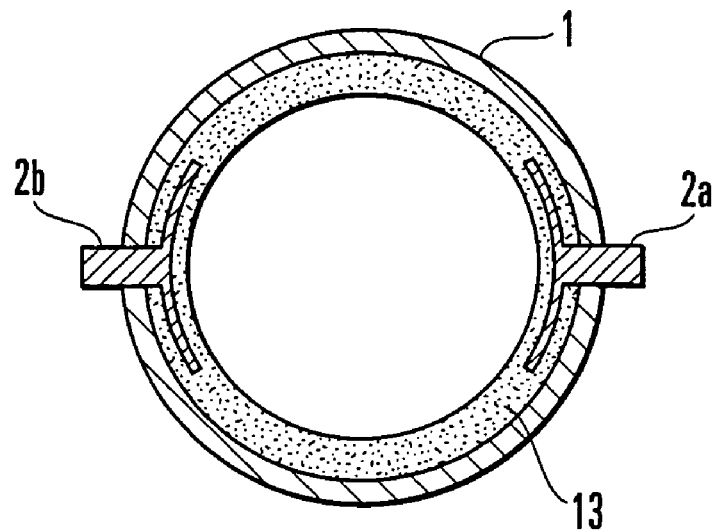
FIG. 35 is a sectional view showing another example of an electrode used in the electromagnetic flowmeter of the present invention.

As shown in FIG. 34, each of the first to 10th embodiments may use, as the electrodes 2a, 2b, 2c, and 2d, electrodes of a type which is exposed from the inner wall of the measuring tube 1 and comes into contact with a fluid to be measured or capacitive coupling type electrodes which do not come into contact with a fluid to be measured. When the electrodes 2a, 2b, 2c, and 2d are of the capacitive coupling type, they are coated with a lining 13 made of ceramic, Teflon, or the like formed on the inner wall of the measuring tube 1.

Furthermore, each of the first to 10th embodiments uses the pair of electrodes 2a and 2b as the first electrodes, and the pair of electrodes 2c and 2d as the second electrodes. However, the present invention is not limited to this, and may use one each of the first and second electrodes. If only one electrode is to be used, since a ground ring or a ground electrode for grounding the potential of a fluid to be measured is provided on the measuring tube 1, it suffices to detect an electromotive force (a potential difference from the ground potential) generated at the single electrode by using the signal conversion unit 5, 5a, or 5b. When a pair of electrodes are to be used, an electrode axis is defined as a straight line connecting the pair of electrodes. Assume that only one electrode is to be used. In this case, assuming that a virtual electrode is placed at a position to face the real electrode through the measuring tube axis PAX on the plane PLN including the single real electrode, the electrode axis is defined as a straight line connecting the real electrode and the virtual electrode.

According to the present invention, a ∂A/∂t component is extracted from the resultant vector of a v×B component dependent on the flow velocity of a fluid and a ∂A/∂t component independent of the flow velocity of the fluid. Using this extracted ∂A/∂t component makes it possible to detect a characteristic or state of the fluid or a state in the measuring tube regardless of the flow velocity. In addition, using the relationship between the ∂A/∂t component and the v×B component makes it possible to correct the flow rate of the fluid regardless of the flow velocity of the fluid even in a case wherein the ratio of variation components dependent on a characteristic or state of the fluid or a state in the measuring tube is not constant between the v×B component and the ∂A/∂t component or in a case wherein a characteristic or state of the fluid or a state in the measuring tube varies. As a consequence, the present invention can accurately measure the true flow rate of a fluid to be measured.

What is claimed is:

1. An electromagnetic flowmeter comprising:
   a measuring tube through which a fluid to be measured flows;
   an electrode which is placed in said measuring tube and detects an electromotive force generated by a magnetic field applied to the fluid and a flow of the fluid;
   an exciting unit which applies, to the fluid, a time-changing magnetic field asymmetrical to a first plane which includes said electrode and is perpendicular to an axial direction of said measuring tube;
   a signal conversion unit which extracts a ∂A/∂t component irrelevant to a flow velocity of the fluid and a v×B component originating from the flow velocity of the fluid, from a resultant electromotive force of an electromotive force based on the ∂A/∂t component and an electromotive force based on the v×B component, with A, t, v, and B respectively representing a vector potential, a time, a flow velocity, and a magnetic flux density; and
   a flow rate calculating unit which extracts a variation component dependent on a parameter from the ∂A/∂t component extracted by said signal conversion unit, corrects a span which is a coefficient applied to a magnitude V of the flow velocity of the v×B component input from said signal conversion unit on the basis of the variation component, and calculates the flow rate of the fluid from the v×B component whose span is corrected, the parameter being at least one of a characteristic and state of the fluid and a state in said measuring tube which are independent of the flow rate of the fluid.

2. A flowmeter according to claim 1, wherein said flow rate calculating unit comprises
   a state quantifying unit which extracts a variation component dependent on a parameter from the ∂A/∂t component extracted by said signal conversion unit, and quantifies the parameter on the basis of the variation component, and
   a flow rate correcting unit which corrects a span of the v×B component input from said signal conversion unit on the basis of the parameter quantified by the state quantifying unit, and calculates the flow rate of the fluid from the v×B component whose span is corrected.

3. A flowmeter according to claim 2, wherein
   the state quantifying unit comprises a state storage unit which stores in advance a relationship between a parameter and a variation component dependent on the parameter, and a state output unit which extracts a variation component dependent on the parameter from the ∂A/∂t component extracted by said signal conversion unit, and obtains the parameter corresponding to the extracted variation component on the basis of the relationship stored in the state storage unit, and
   said flow rate correcting unit comprises a span storage unit which stores in advance a relationship between a parameter and a variation component of a span of a v×B component, and a flow rate output unit which obtains a variation component of a span corresponding to the parameter obtained by the state output unit on the basis of the relationship stored in the span storage unit, corrects a span of the v×B component input from said signal conversion unit on the basis of the variation component of the span, and calculates the flow rate of the fluid from the v×B component whose span is corrected.

4. A flowmeter according to claim 3, wherein said signal conversion unit extracts a ∂A/∂t component and a v×B component from a resultant electromotive force detected by said electrode, obtains a v×B component obtained by normalizing the extracted v×B component with the extracted ∂A/∂t component, and outputs the normalized v×B component as a v×B component as a correction target to the flow rate output unit.

5. A flowmeter according to claim 3, wherein
   said exciting unit applies magnetic fields to the fluid to provide a plurality of exciting frequencies at one of a simultaneous timing and an alternative timing, and
   said signal conversion unit extracts a ∂A/∂t component and a v×B component by obtaining amplitudes and phases of a plurality of frequency components, of the resultant electromotive force detected by said electrode, which are obtained, at one of a simultaneous timing and an alternative timing.

6. A flowmeter according to claim 5, wherein
   said exciting unit comprises an exciting coil placed at a position spaced apart by an offset from a first plane which includes said electrode and is perpendicular to an axial direction of said measuring tube, and a power supply unit which supplies an exciting current to the exciting coil to provide two different exciting frequencies including a first frequency and a second frequency at one of a simultaneous timing and an alternative timing,
   said signal conversion unit obtains amplitudes and phases of two frequency components with the first frequency and the second frequency of the resultant electromotive force detected by said electrode, extracts an electromotive force difference between the two frequency components as a ∂A/∂t component on the basis of the amplitudes and the phases, and extracts a v×B component of the resultant electromotive force by removing the extracted ∂A/∂t component from the first frequency component of the resultant electromotive force,
   the state storage unit stores in advance a relationship between a parameter and one of a magnitude and phase of a variation component dependent on the parameter,
   the state output unit extracts one of a magnitude and phase of a variation component dependent on a parameter from the ∂A/∂t component extracted by said signal conversion unit, and obtains a parameter corresponding to one of the magnitude and phase of the extracted variation component on the basis of the relationship stored in the state storage unit, the span storage unit stores in advance a relationship between a parameter and a magnitude of a variation component of a span of a v×B component, and the flow rate output unit obtains a magnitude of a variation component of a span corresponding to the parameter obtained by the state output unit on the basis of the relationship stored in the span storage unit, corrects a span of a v×B component input from said signal conversion unit on the basis of the magnitude of the variation component of the span, and calculates the flow rate of the fluid from the v×B component whose span is corrected.

7. A flowmeter according to claim 5, wherein said exciting unit comprises an exciting coil placed at a position spaced apart by an offset from a first plane which includes said electrode and is perpendicular to an axial direction of said measuring tube, and a power supply unit which supplies an exciting current to the exciting coil to provide two different exciting frequencies including a first frequency and a second frequency at one of a simultaneous timing and an alternative timing, said signal conversion unit obtains amplitudes and phases of two frequency components with the first frequency and the second frequency of the resultant electromotive force detected by said electrode, extracts an electromotive force difference between the two frequency components as a ∂A/∂t component on the basis of the amplitudes and the phases, extracts a v×B component of the resultant electromotive force by removing the extracted ∂A/∂t component from the first frequency component of the resultant electromotive force, and obtains a v×B component as a correction target by normalizing the extracted v×B component with the extracted ∂A/∂t component, the state storage unit stores in advance a relationship between a parameter and one of a magnitude and phase of a variation component dependent on the parameter, the state output unit extracts one of a magnitude and phase of a variation component dependent on a parameter from the ∂A/∂t component extracted by said signal conversion unit, and obtains a parameter corresponding to one of the magnitude and phase of the extracted variation component on the basis of the relationship stored in the state storage unit, the span storage unit stores in advance a relationship between a parameter and a ratio between a magnitude of a variation component of a span of a v×B component and a magnitude of a variation component of a ∂A/∂t component, and the flow rate output unit obtains a ratio corresponding to the parameter obtained by the state output unit on the basis of the relationship stored in the span storage unit, corrects a span of the v×B component input from said signal conversion unit on the basis of the ratio, and calculates the flow rate of the fluid from the v×B component whose span is corrected.

8. A flowmeter according to claim 5, wherein said exciting unit comprises a first exciting coil placed at a position spaced apart by a first offset from the first plane which includes said electrode and is perpendicular to the axial direction of said measuring tube, a second exciting coil which is placed at a position spaced apart by a second offset from the first plane so as to face the first exciting coil through the first plane, and a power supply unit which supplies exciting currents to the first exciting coil and the second exciting coil to provide two different exciting frequencies including a first frequency and a second frequency at one of a simultaneous timing and an alternative timing while switching a phase difference between the exciting current supplied to the first exciting coil and the exciting current supplied to the second exciting coil, said signal conversion unit obtains amplitudes and phases of two frequency components with the first frequency and the second frequency of the resultant electromotive force detected by said electrode in an excitation state in which a phase difference between a first magnetic field generated by the first exciting coil and a second magnetic field generated by the second exciting coil is substantially p, extracts, as a first ∂A/∂t component, an electromotive force difference between the two frequency components in an excitation state in which the phase difference between the magnetic fields is substantially p on the basis of the amplitudes and the phases, obtains amplitudes and phases of the two frequency components in an excitation state in which the phase difference between the magnetic fields is substantially 0, extracts, as a second ∂A/∂t component, an electromotive force difference between the two frequency components in an excitation state in which the phase difference between the magnetic fields is substantially 0 on the basis of the amplitudes and the phases, and extracts a v×B component by removing the extracted second ∂A/∂t component from the first frequency of the resultant electromotive force detected by said electrode in an excitation state in which the phase difference between the magnetic fields is substantially 0, the state storage unit stores in advance a relationship between a parameter and one of a magnitude and phase of a variation component dependent on the parameter, the state output unit extracts one of a magnitude and phase of a variation component dependent on a parameter from the first ∂A/∂t component extracted by said signal conversion unit, and obtains a parameter corresponding to one of the magnitude and phase of the extracted variation component on the basis of the relationship stored in the state storage unit, the span storage unit stores in advance a relationship between a parameter and a magnitude of a variation component of a span of a v×B component, and the flow rate output unit obtains a magnitude of a variation component of a span corresponding to the parameter obtained by the state output unit on the basis of the relationship stored in the span storage unit, corrects a span of a v×B component input from said signal conversion unit on the basis of the magnitude of the variation component of the span, and calculates the flow rate of the fluid from the v×B component whose span is corrected.

9. A flowmeter according to claim 5, wherein said exciting unit comprises a first exciting coil placed at a position spaced apart by a first offset from the first plane which includes said electrode and is perpendicular to the axial direction of said measuring tube, a second exciting coil which is placed at a position spaced apart by a second offset from the first plane so as to face the first exciting coil through the first plane, and a power supply unit which supplies exciting currents to the first exciting coil and the second exciting coil to provide two different exciting frequencies including the first frequency and the second frequency at one of a simultaneous timing and an alternative timing while switching a phase difference between the exciting current supplied to the first exciting coil and the exciting current supplied to the second exciting coil, said signal conversion unit obtains amplitudes and phases of two frequency components with the first frequency and the second frequency of the resultant electromotive force detected by said electrode in an excitation state in which a phase difference between a first magnetic field generated by the first exciting coil and a second magnetic field generated by the second exciting coil is substantially p, extracts, as a first $\partial A/\partial t$ component, an electromotive force difference between the two frequency components in an excitation state in which the phase difference between the magnetic fields is substantially p on the basis of the amplitudes and the phases, obtains amplitudes and phases of the two frequency components in an excitation state in which the phase difference between the magnetic fields is substantially 0, extracts, as a second $\partial A/\partial t$ component, an electromotive force difference between the two frequency components in an excitation state in which the phase difference between the magnetic fields is substantially 0 on the basis of the amplitudes and the phases, extracts a v×B component by removing the extracted second $\partial A/\partial t$ component from the first frequency of the resultant electromotive force detected by said electrode in an excitation state in which the phase difference between the magnetic fields is substantially 0, and obtains a v×B component as a correction target by normalizing the extracted v×B component with the first $\partial A/\partial t$ component, the state storage unit stores in advance a relationship between a parameter and one of a magnitude and phase of a variation component dependent on the parameter, the state output unit extracts one of a magnitude and phase of a variation component dependent on a parameter from the first $\partial A/\partial t$ component extracted by said signal conversion unit, and obtains a parameter corresponding to one of the magnitude and phase of the extracted variation component on the basis of the relationship stored in the state storage unit, the span storage unit stores in advance a relationship between a parameter and a ratio between a magnitude of a variation component of a span of a v×B component and a magnitude of a variation component of a $\partial A/\partial t$ component, and the flow rate output unit obtains a ratio corresponding to the parameter obtained by the state output unit on the basis of the relationship stored in the span storage unit, corrects a span of the v×B component input from said signal conversion unit on the basis of the ratio, and calculates the flow rate of the fluid from the v×B component whose span is corrected.

10. A flowmeter according to claim 5, wherein said exciting unit comprises an exciting coil which applies a magnetic field to the fluid, and a power supply unit which supplies an exciting current to the exciting coil to provide two different exciting frequencies including a first frequency and a second frequency at one of a simultaneous timing and an alternative timing, said electrode comprises a first electrode placed at a position spaced apart by a first offset from a second plane which includes an axis of the exciting coil and is perpendicular to an axial direction of said measuring tube, and a second electrode placed at a position spaced apart by a second offset from the second plane so as to face the first electrode through the second plane, said signal conversion unit obtains amplitudes and phases of a first resultant electromotive force detected by the first electrode and a second resultant electromotive force detected by the second electrode, obtains an electromotive force difference between identical frequency components of the first resultant electromotive force and the second resultant electromotive force for each of the first frequency and the second frequency on the basis of the amplitudes and the phases, extracts a difference between the electromotive force difference at the first frequency and the electromotive force difference at the second frequency as a first $\partial A/\partial t$ component, obtains an electromotive force sum of identical frequency components of the first resultant electromotive force and the second resultant electromotive force for each of the first frequency and the second frequency, extracts a difference between the electromotive force sum at the first frequency and the electromotive force sum at the second frequency as a second $\partial A/\partial t$ component, and extracts a v×B component by removing the second $\partial A/\partial t$ component from the electromotive force sum at the first frequency, the state storage unit stores in advance a relationship between a parameter and one of a magnitude and phase of a variation component dependent on the parameter, the state output unit extracts one of a magnitude and phase of a variation component dependent on a parameter from the first $\partial A/\partial t$ component extracted by said signal conversion unit, and obtains a parameter corresponding to one of the magnitude and phase of the extracted variation component on the basis of the relationship stored in the state storage unit, the span storage unit stores in advance a relationship between a parameter and a magnitude of a variation component of a span of a v×B component, and the flow rate output unit obtains a magnitude of a variation component of a span corresponding to the parameter obtained by the state output unit on the basis of the relationship stored in said the span storage unit, corrects a span of a v×B component input from said signal conversion unit on the basis of the magnitude of the variation component of the span, and calculates the flow rate of the fluid from the v×B component whose span is corrected.

11. A flowmeter according to claim 5, wherein said exciting unit comprises an exciting coil which applies a magnetic field to the fluid, and a power supply unit which supplies an exciting current to the exciting coil to provide two different exciting frequencies including a first frequency and a second frequency at one of a simultaneous timing and an alternative timing, said electrode comprises a first electrode placed at a position spaced apart by a first offset from a second plane which includes an axis of the exciting coil and is perpendicular to an axial direction of said measuring tube, and a second electrode placed at a position spaced apart by a second offset from the second plane so as to face the first electrode through the second plane, said signal conversion unit obtains amplitudes and phases of a first resultant electromotive force detected by the first electrode and a second resultant electromotive force detected by the second electrode, obtains an electromotive force difference between identical frequency components of the first resultant electromotive force and the second resultant electromotive force for each of the first frequency and the second frequency on the basis of the amplitudes and the phases, extracts a difference between the electromotive force difference at the first frequency and the electromotive force difference at the second frequency as a first $\partial A/\partial t$ component, obtains an electromotive force sum of identical frequency components of the first resultant electromotive force and the second resultant electromotive force for each of the first frequency and the second frequency, extracts a difference between the electromotive force sum at the first frequency and the electromotive force sum at the second frequency as a second $\partial A/\partial t$ component, extracts a v×B component by removing the second $\partial A/\partial t$ component from the electromotive force sum at the first frequency, and obtains a v×B component as a correction target by normalizing the extracted v×B component with the extracted first $\partial A/\partial t$ component, the state storage unit stores in advance a relationship between a parameter and one of a magnitude and phase of a variation component dependent on the parameter, the state output unit extracts one of a magnitude and phase of a variation component dependent on a parameter from the first $\partial A/\partial t$ component extracted by said signal conversion unit, and obtains a parameter corresponding to one of the magnitude and phase of the extracted variation component on the basis of the relationship stored in the state storage unit, the span storage unit stores in advance a relationship between a parameter and a ratio between a magnitude of a variation component of a span of a v×B component and a magnitude of a variation component of a $\partial A/\partial t$ component, and the flow rate output unit obtains a ratio corresponding to the parameter obtained by the state output unit on the basis of the relationship stored in the span storage unit, corrects a span of the v×B component input from said signal conversion unit on the basis of the ratio, and calculates the flow rate of the fluid from the v×B component whose span is corrected.

12. An flowmeter according to claim 3, wherein said exciting unit comprises a first exciting coil placed at a position spaced apart by a first offset from the first plane which includes said electrode and is perpendicular to the axial direction of said measuring tube, a second exciting coil which is placed at a position spaced apart by a second offset from the first plane so as to face the first exciting coil through the first plane, and a power supply unit which supplies exciting currents to the first exciting coil and the second exciting coil to provide two excitation states in which phase differences between first magnetic fields generated by the first exciting coil and second magnetic fields generated by the second exciting coil differ from each other, and said signal conversion unit extracts a $\partial A/\partial t$ component by obtaining an amplitude and phase of the resultant electromotive force detected by said electrode in one of the excitation states, and extracts a v×B component on the basis of the extracted $\partial A/\partial t$ component and an amplitude and phase of the resultant electromotive force detected by said electrode in the other excitation state.

13. An flowmeter according to claim 12, wherein said signal conversion unit extracts a $\partial A/\partial t$ component by obtaining an amplitude and phase of a resultant electromotive force detected by said electrode in an excitation state in which a phase difference between the first magnetic field and the second magnetic field is substantially p, and extracts a v×B component by obtaining an amplitude and phase of a resultant electromotive force detected by said electrode in an excitation state in which the phase difference between the first magnetic field and the second magnetic field is substantially 0, the state storage unit stores in advance a relationship between a parameter and one of a magnitude and phase of a variation component dependent on the parameter, the state output unit extracts one of a magnitude and phase of a variation component dependent on a parameter from the $\partial A/\partial t$ component extracted by said signal conversion unit, and obtains a parameter corresponding to one of the magnitude and phase of the extracted variation component on the basis of the relationship stored in the state storage unit, the span storage unit stores in advance a relationship between a parameter and a magnitude of a variation component of a span of a v×B component, and the flow rate output unit obtains a magnitude of a variation component of a span corresponding to the parameter obtained by the state output unit on the basis of the relationship stored in the span storage unit, corrects a span of a v×B component input from said signal conversion unit on the basis of the magnitude of the variation component of the span, and calculates the flow rate of the fluid from the v×B component whose span is corrected.

14. An flowmeter according to claim 12, wherein said signal conversion unit extracts a $\partial A/\partial t$ component by obtaining an amplitude and phase of a resultant electromotive force detected by said electrode in an excitation state in which a phase difference between the first magnetic field and the second magnetic field is substantially p, extracts a v×B component by obtaining an amplitude and phase of a resultant electromotive force detected by said electrode in an excitation state in which the phase difference between the first magnetic field and the second magnetic field is substantially 0, and obtains a v×B component as a correction target by normalizing the extracted v×B component with the extracted $\partial A/\partial t$ component, the state storage unit stores in advance a relationship between a parameter and one of a magnitude and phase of a variation component dependent on the parameter, the state output unit extracts one of a magnitude and phase of a variation component dependent on a parameter from the $\partial A/\partial t$ component extracted by said signal conversion unit, and obtains a parameter corresponding to one of the magnitude and phase of the extracted variation component on the basis of the relationship stored in the state storage unit, the span storage unit stores in advance a relationship between a parameter and a ratio between a magnitude of a variation component of a span of a v×B component and a magnitude of a variation component of a $\partial A/\partial t$ component, and the flow rate output unit obtains a ratio corresponding to the parameter obtained by the state output unit on the basis of the relationship stored in the span storage unit, corrects a span of the v×B component input from said signal conversion unit on the basis of the ratio, and calculates the flow rate of the fluid from the v×B component whose span is corrected.

15. A flowmeter according to claim 3, wherein
said exciting unit comprises an exciting coil which applies a magnetic field to the fluid, and a power supply unit which supplies an exciting current to the exciting coil,
said electrode comprises a first electrode placed at a position spaced apart by a first offset from a second plane which includes an axis of the exciting coil and is perpendicular to an axial direction of said measuring tube, and a second electrode placed at a position spaced apart by a second offset from the second plane so as to face the first electrode through the second plane, and
said signal conversion unit obtains an amplitude and phase of each of a first resultant electromotive force detected by the first electrode and a second resultant electromotive force detected by the second electrode, extracts a ∂A/∂t component from an electromotive force difference between the first resultant electromotive force and the second resultant electromotive force on the basis of the amplitudes and the phases, and extracts a v×B component from an electromotive force sum of the first resultant electromotive force and the second resultant electromotive force.

16. A flowmeter according to claim 15, wherein
said signal conversion unit obtains an amplitude and phase of each of a first resultant electromotive force detected by the first electrode and a second resultant electromotive force detected by the second electrode, extracts a ∂A/∂t component from an electromotive force difference between the first resultant electromotive force and the second resultant electromotive force on the basis of the amplitudes and the phases, and extracts a v×B component from an electromotive force sum of the first resultant electromotive force and the second resultant electromotive force,
the state storage unit stores in advance a relationship between a parameter and one of a magnitude and phase of a variation component dependent on the parameter,
the state output unit extracts one of a magnitude and phase of a variation component dependent on a parameter from the ∂A/∂t component extracted by said signal conversion unit, and obtains a parameter corresponding to one of the magnitude and phase of the extracted variation component on the basis of the relationship stored in the state storage unit,
the span storage unit stores in advance a relationship between a parameter and a magnitude of a variation component of a span of a v×B component, and
the flow rate output unit obtains a magnitude of a variation component of a span corresponding to the parameter obtained by the state output unit on the basis of the relationship stored in said the span storage unit, corrects a span of a v×B component input from said signal conversion unit on the basis of the magnitude of the variation component of the span, and calculates the flow rate of the fluid from the v×B component whose span is corrected.

17. A flowmeter according to claim 15, wherein
said signal conversion unit obtains an amplitude and phase of each of a first resultant electromotive force detected by the first electrode and a second resultant electromotive force detected by the second electrode, extracts a ∂A/∂t component from an electromotive force difference between the first resultant electromotive force and the second resultant electromotive force on the basis of the amplitudes and the phases, extracts a v×B component from an electromotive force sum of the first resultant electromotive force and the second resultant electromotive force, and obtains a v×B component as a correction target by normalizing the extracted v×B component with the extracted ∂A/∂t component,
the state storage unit stores in advance a relationship between a parameter and one of a magnitude and phase of a variation component dependent on the parameter,
the state output unit extracts one of a magnitude and phase of a variation component dependent on a parameter from the ∂A/∂t component extracted by said signal conversion unit, and obtains a parameter corresponding to one of the magnitude and phase of the extracted variation component on the basis of the relationship stored in the state storage unit,
the span storage unit stores in advance a relationship between a parameter and a ratio between a magnitude of a variation component of a span of a v×B component and a magnitude of a variation component of a ∂A/∂t component, and
the flow rate output unit obtains a ratio corresponding to the parameter obtained by the state output unit on the basis of the relationship stored in the span storage unit, corrects a span of the v×B component on the basis of the ratio, and calculates the flow rate of the fluid from the v×B component whose span is corrected.

* * * * *